United States Patent
Kanai et al.

[11] Patent Number: 5,835,164
[45] Date of Patent: Nov. 10, 1998

[54] VIDEO SIGNAL PROCESSOR

[75] Inventors: Akira Kanai, Amagasaki; Masaki Yamakawa, Nagaokakyo; Shoichi Sugihara, Nagaokakyo; Akiko Maeno, Nagaokakyo, all of Japan

[73] Assignee: Mitsubishi Denki Kabushiki Kaisha, Tokyo, Japan

[21] Appl. No.: 464,100

[22] Filed: Jun. 5, 1995

Related U.S. Application Data

[62] Division of Ser. No. 87,384, Jul. 8, 1993, Pat. No. 5,574,561.

[30] Foreign Application Priority Data

| Jul. 8, 1992 | [JP] | Japan | 4-180993 |
| Jul. 17, 1992 | [JP] | Japan | 4-190955 |
| Aug. 27, 1992 | [JP] | Japan | 4-228428 |
| Nov. 25, 1992 | [JP] | Japan | 4-314691 |
| Dec. 4, 1992 | [JP] | Japan | 4-325318 |
| Mar. 22, 1993 | [JP] | Japan | 5-061834 |

[51] Int. Cl.⁶ .................. H04N 9/31; H04N 9/12
[52] U.S. Cl. .................. 348/742; 348/743; 348/575; 348/715; 348/718
[58] Field of Search .................. 348/65, 71, 714, 348/715, 716, 717, 718, 575, 618, 619, 621, 622, 623, 624, 625, 630, 231, 268, 270, 742, 443, 222; H04N 7/18, 9/31, 9/12

[56] References Cited

U.S. PATENT DOCUMENTS

| 3,935,590 | 1/1976 | Kaji et al. | 348/656 |
| 4,305,092 | 12/1981 | Katzfey . | |
| 4,679,084 | 7/1987 | Topper et al. | 348/448 |
| 4,823,190 | 4/1989 | Yamamoto | 348/625 |
| 4,845,553 | 7/1989 | Konomura et al. | 348/71 |
| 4,882,619 | 11/1989 | Hasegawa et al. | 348/65 |
| 4,907,862 | 3/1990 | Suntoler . | |
| 5,081,524 | 1/1992 | Tsuruoka et al. | 348/65 |
| 5,172,221 | 12/1992 | Ko . | |
| 5,359,366 | 10/1994 | Ubukata et al. | 348/715 |
| 5,459,520 | 10/1995 | Sasaki | 348/443 |
| 5,574,516 | 11/1996 | Kanai et al. | 348/742 |

FOREIGN PATENT DOCUMENTS 2538203  6/1984  France .

OTHER PUBLICATIONS

Television, by Kerkhof, et al., An Introduction to the Physical and . . . , Philips Technical Library, pp. 376–383, 1952.
Television Technology, by Yuzawa et al., "What is a color adapter?" May, 1964.
IBM Technical Disclosure Bulletin, Brinson et al., Liquid Crystal Apparatus for . . . , pp. 1769–1771, vol. 22, No. 5, Oct. 1979.

Primary Examiner—Michael H. Lee

[57] ABSTRACT

In a color image display system formed of a monochromatic CRT or like image display device (102) having a screen (103) for display of images and a rotary filter (106) comprising color filter sections (106R, 106G and 106B) of a plurality of colors; image signals are read from memories (130R, 130G, 130B) at a rate higher than they are written in the memories, so as to reduce flickers. The problem of passing of the reading address over the writing address is solved by reading the image signal of prominent color taking a period in which the passing over occurs. High frequency components of other color image signals are extracted and added to the image signal of each color to thereby enhance the definition of the picture.

43 Claims, 87 Drawing Sheets

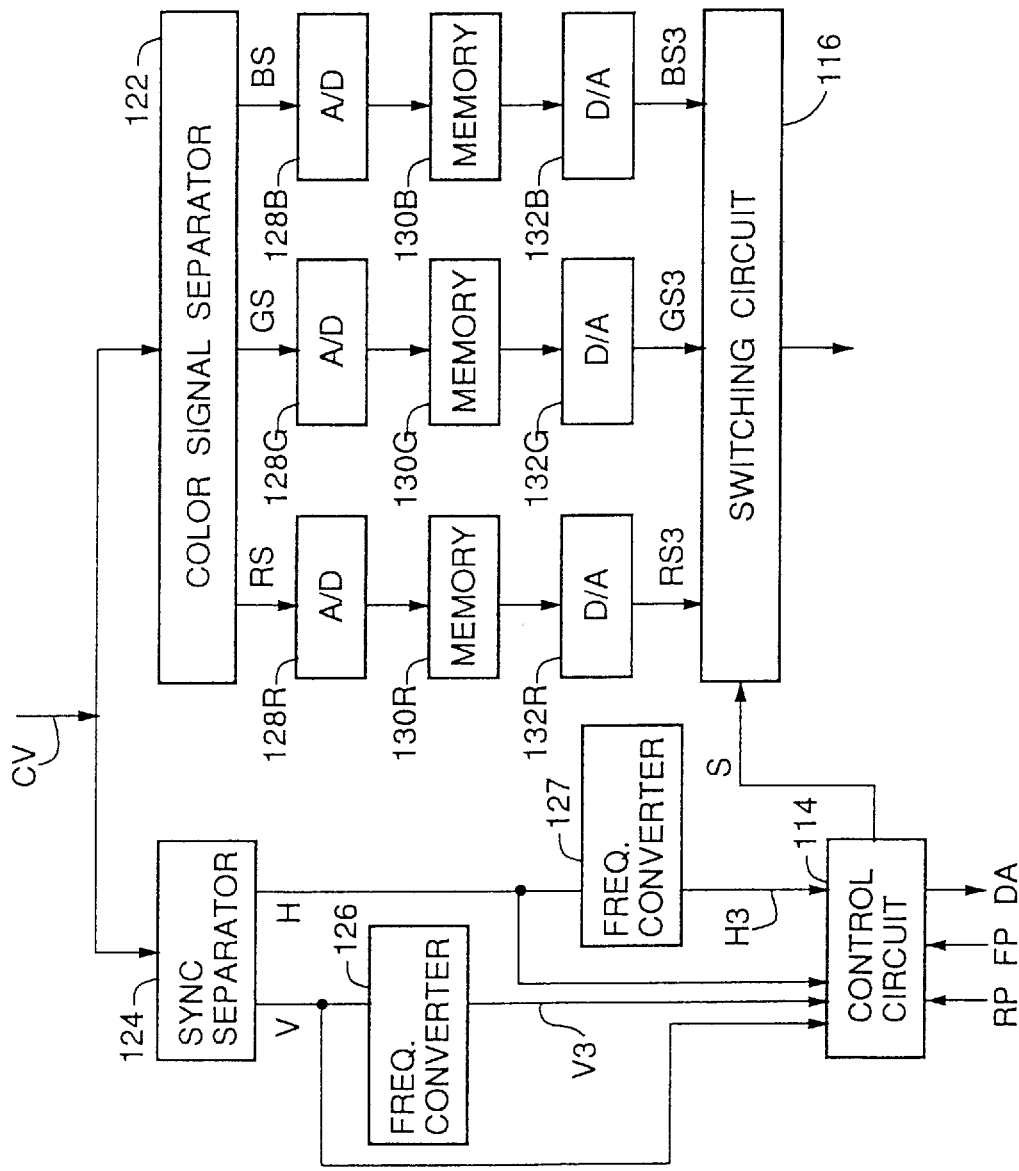

FIG.5A RS 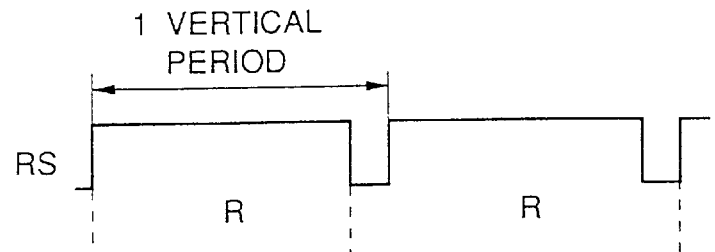
FIG.5B GS 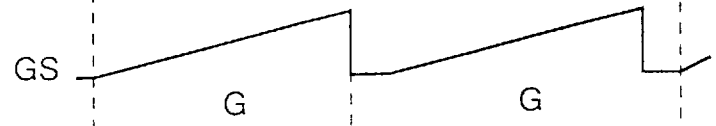
FIG.5C BS 
FIG.5D RS3 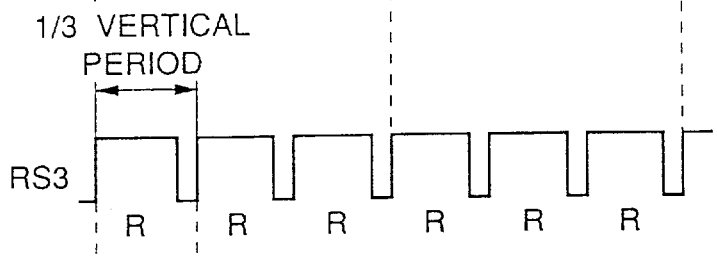
FIG.5E GS3 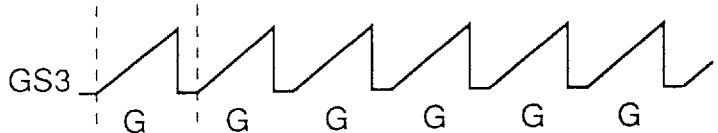
FIG.5F BS3 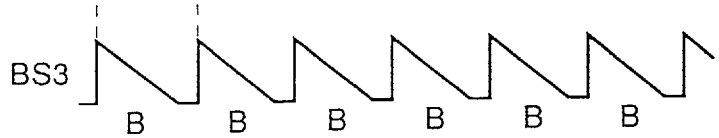

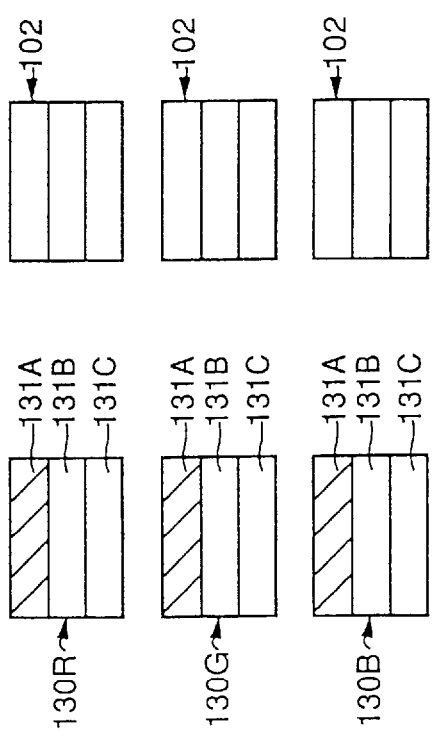
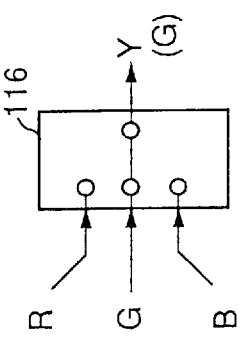
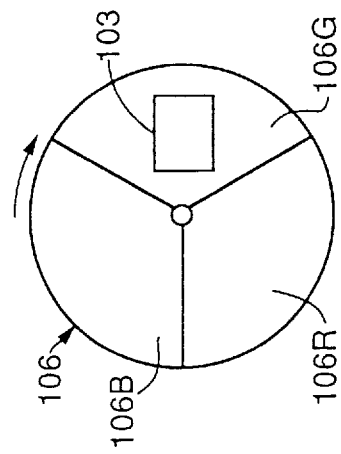
FIG.6A  FIG.6B  FIG.6C  FIG.6D

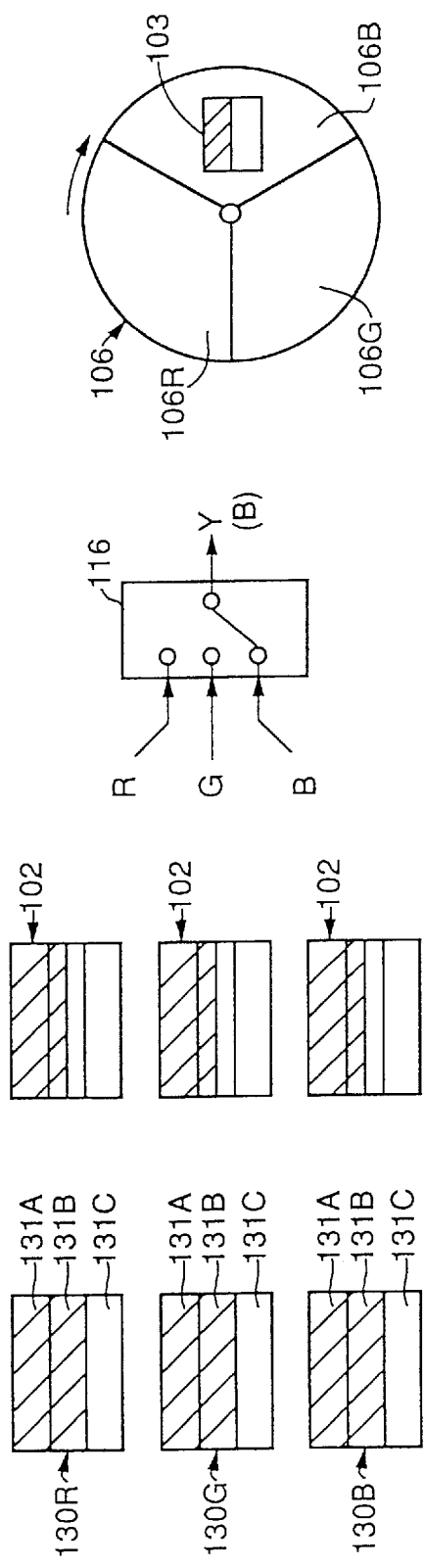

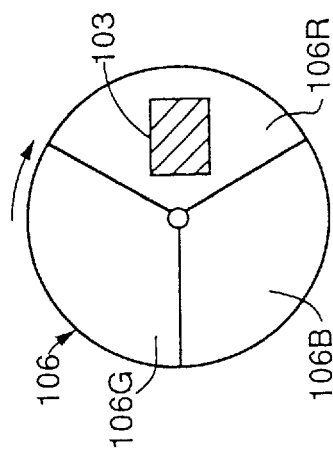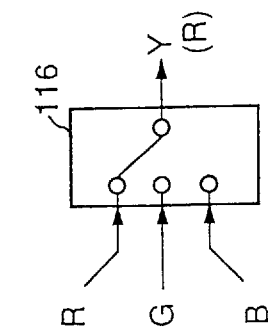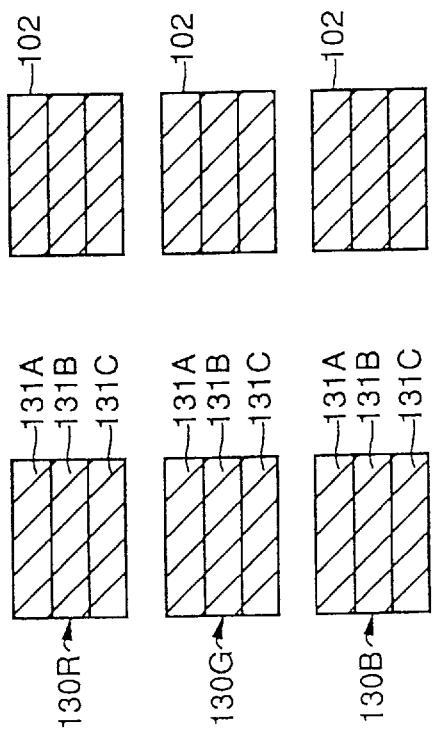

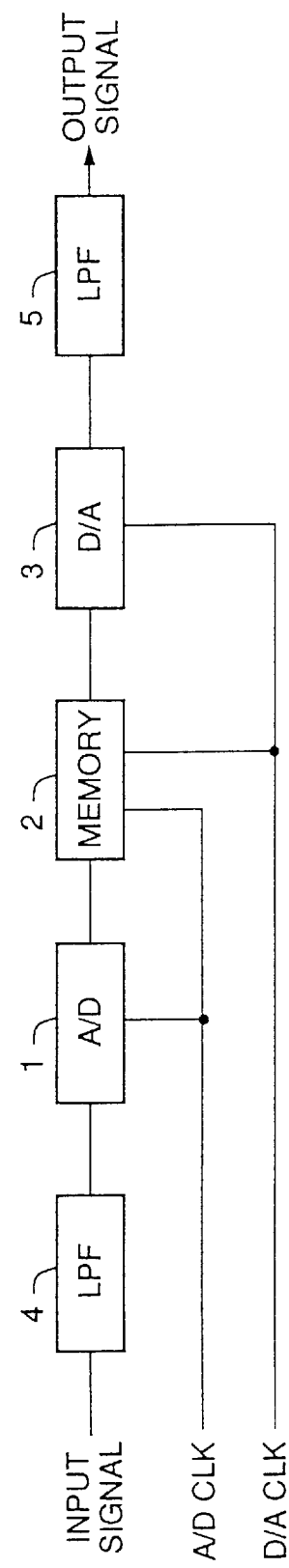

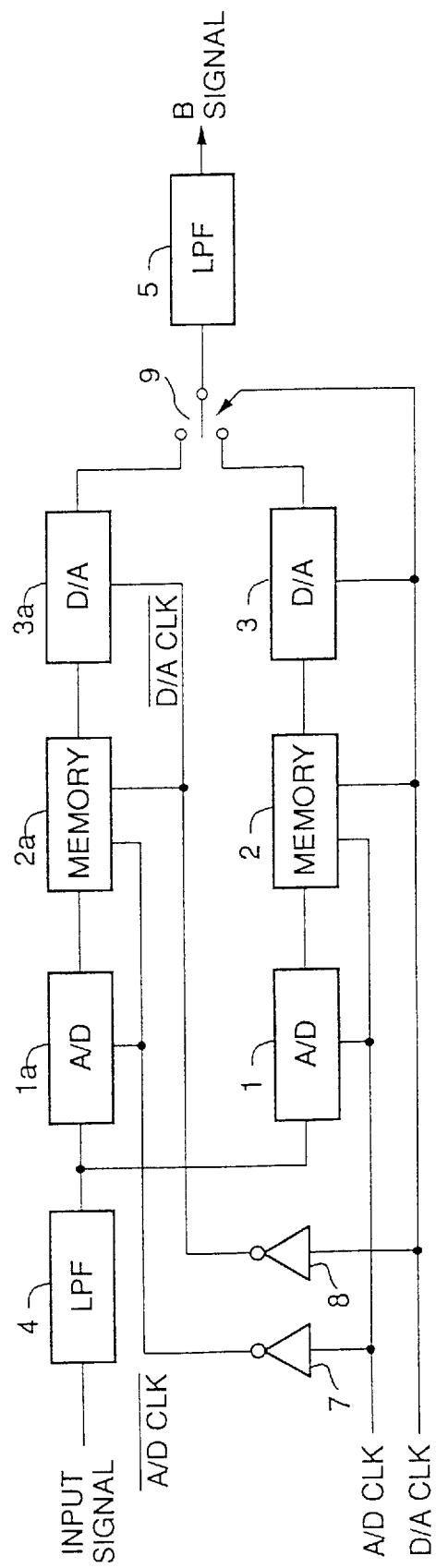

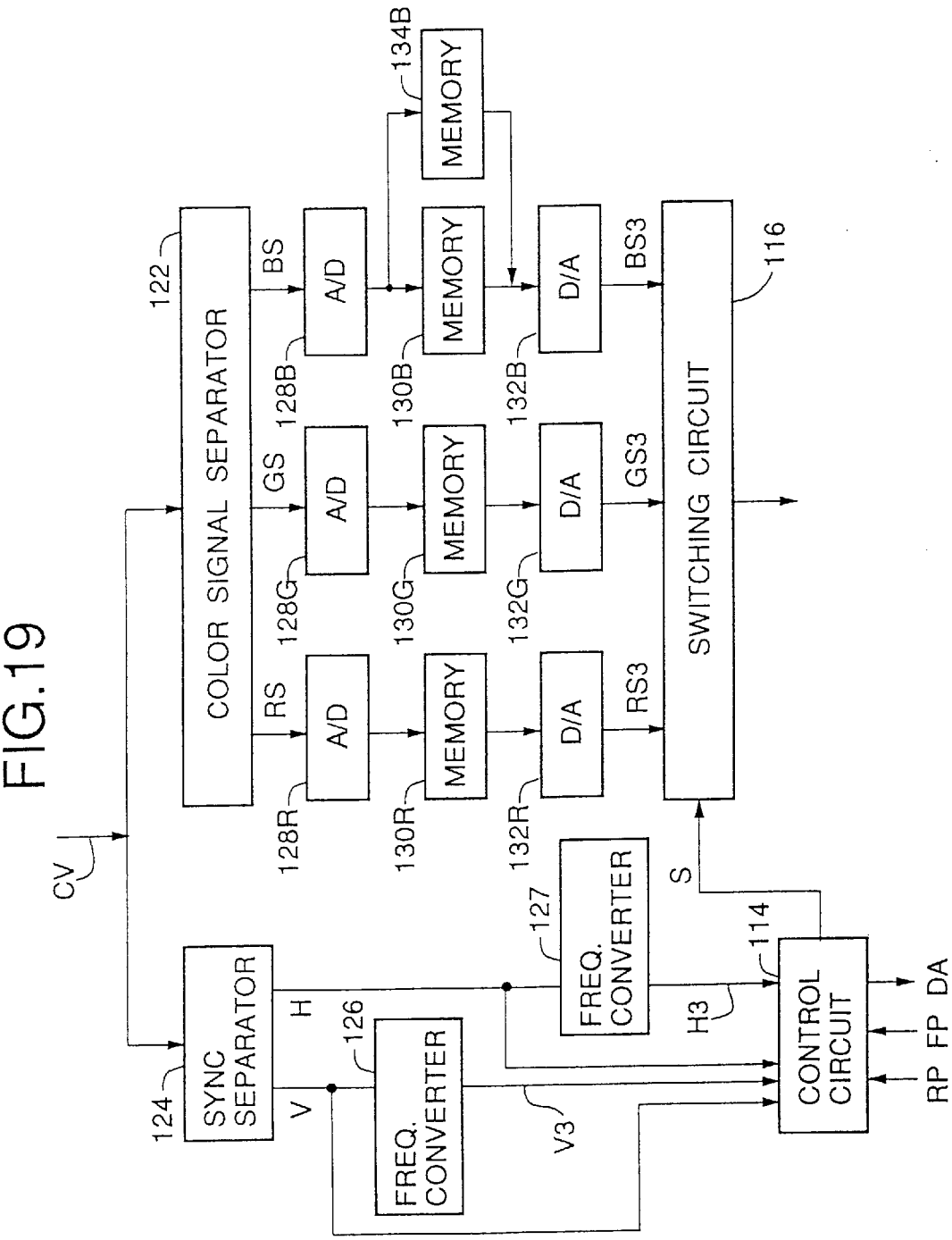

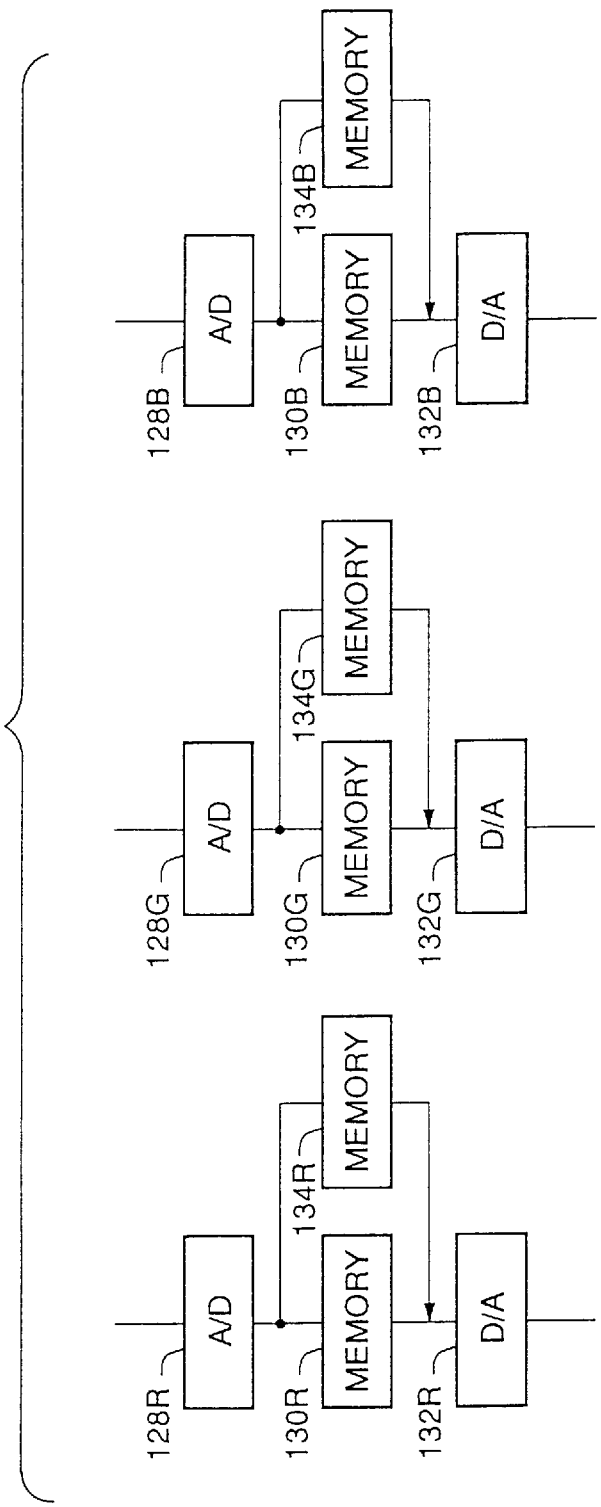

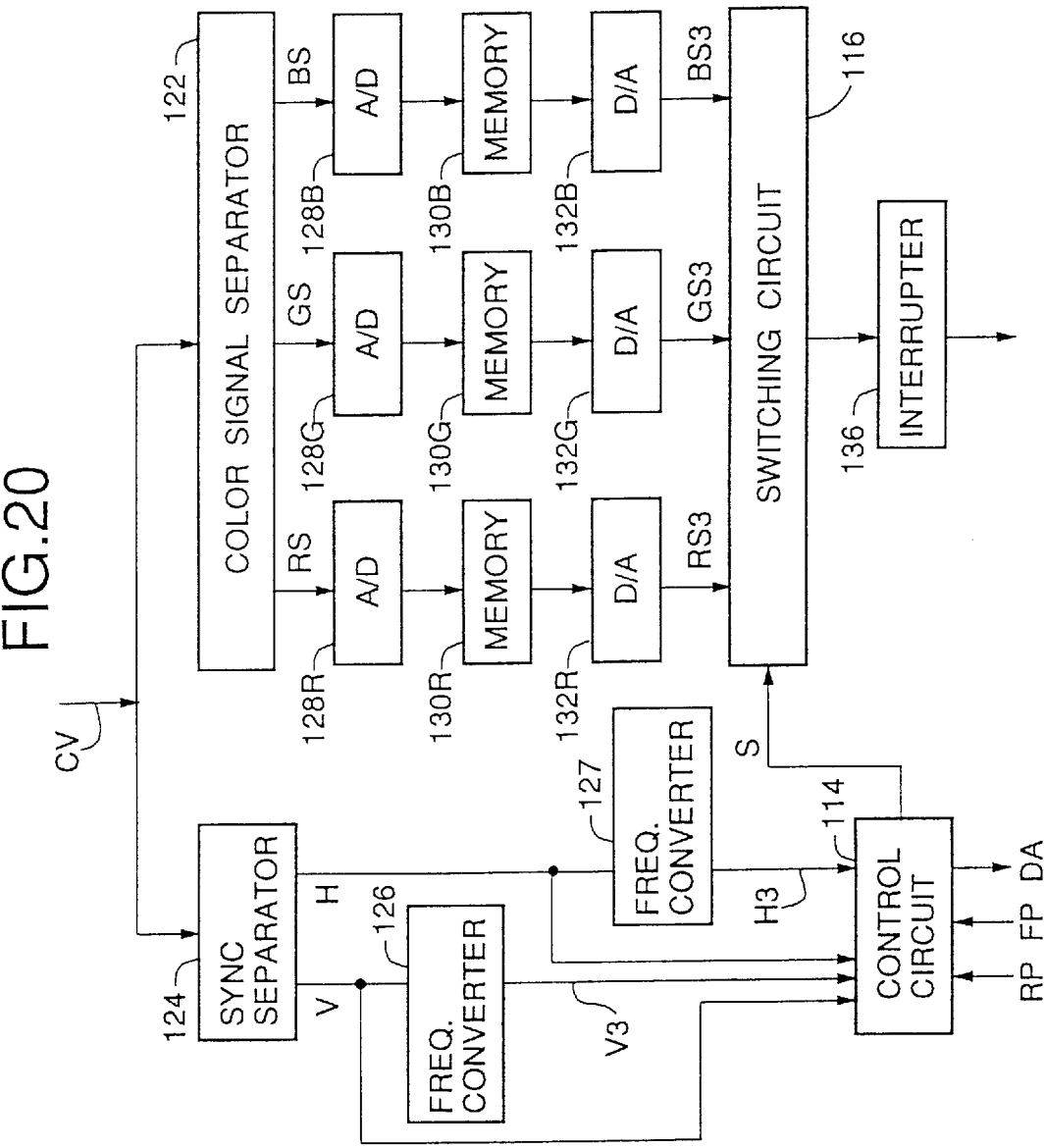

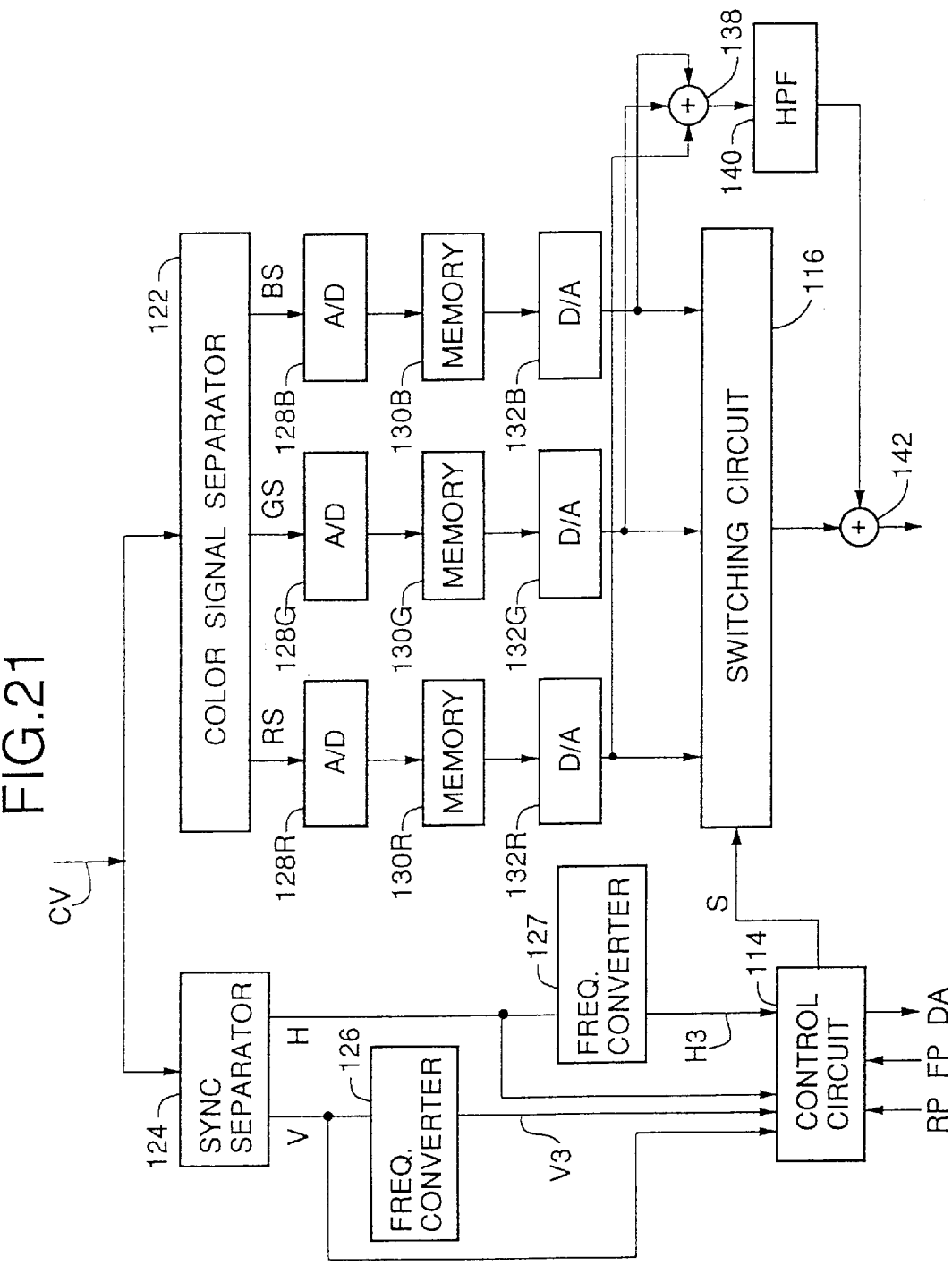

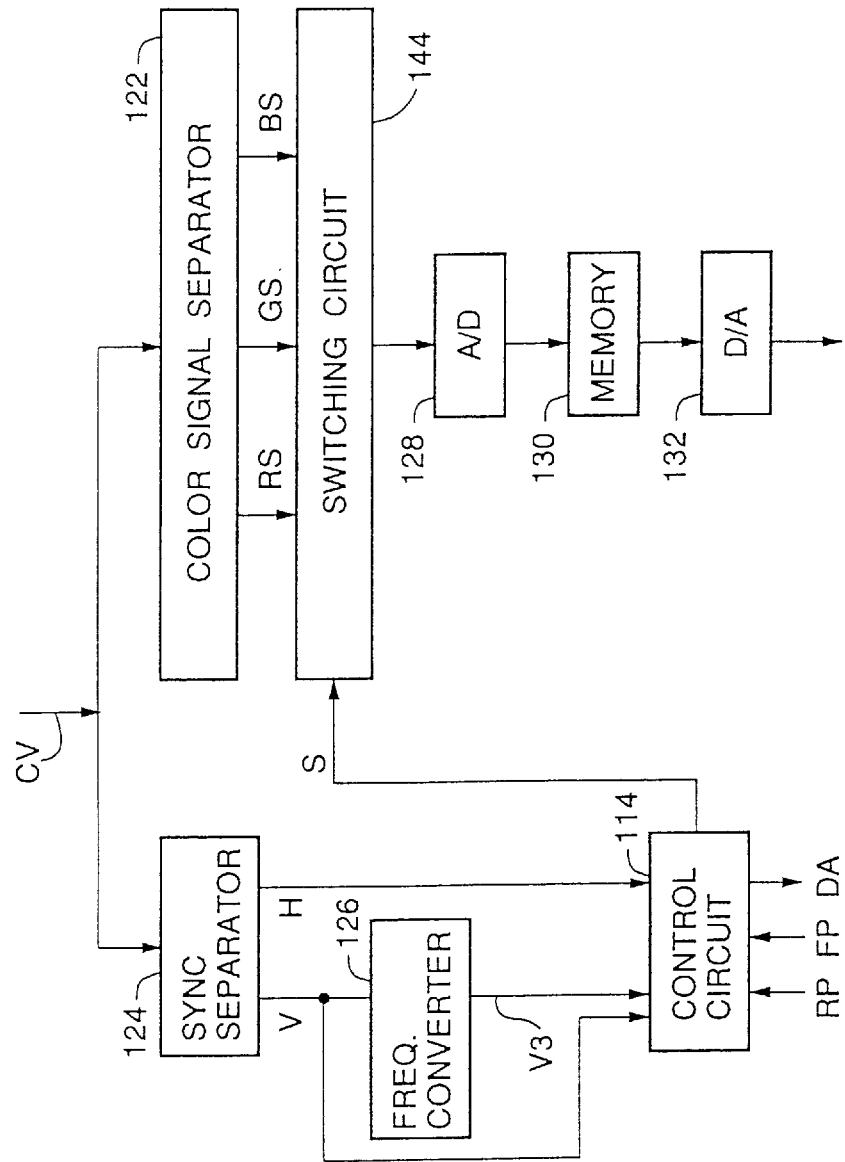

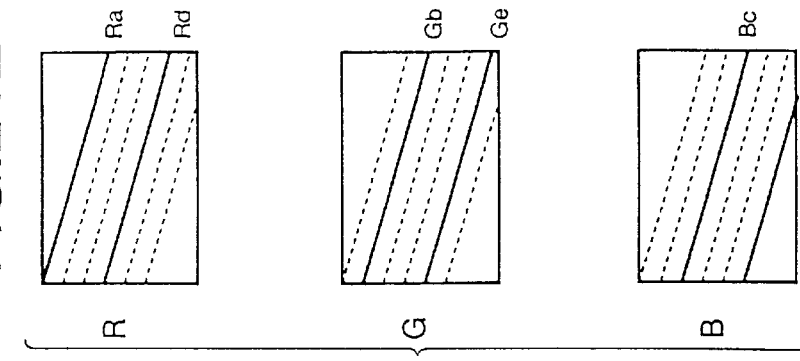
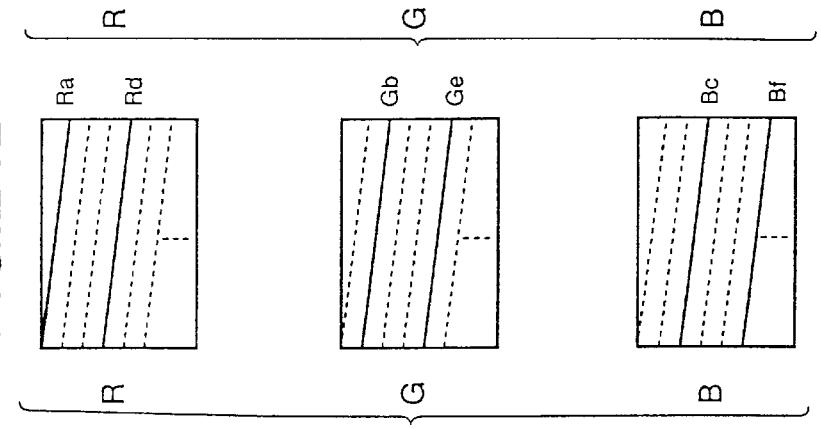
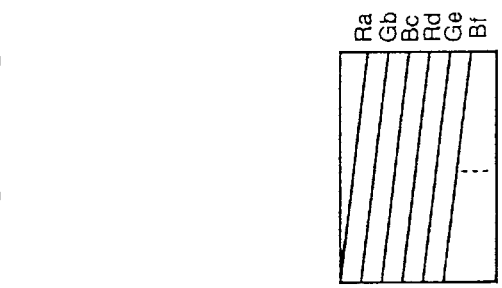
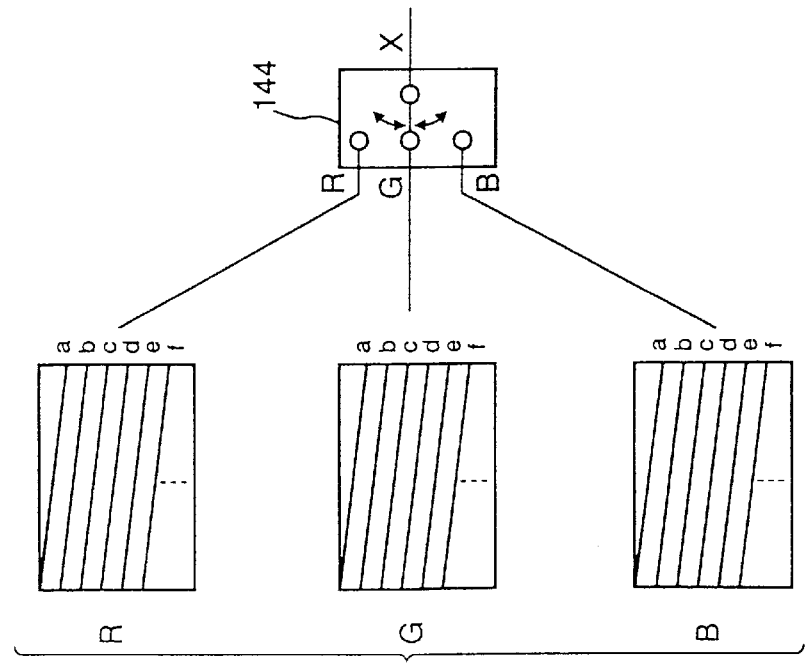

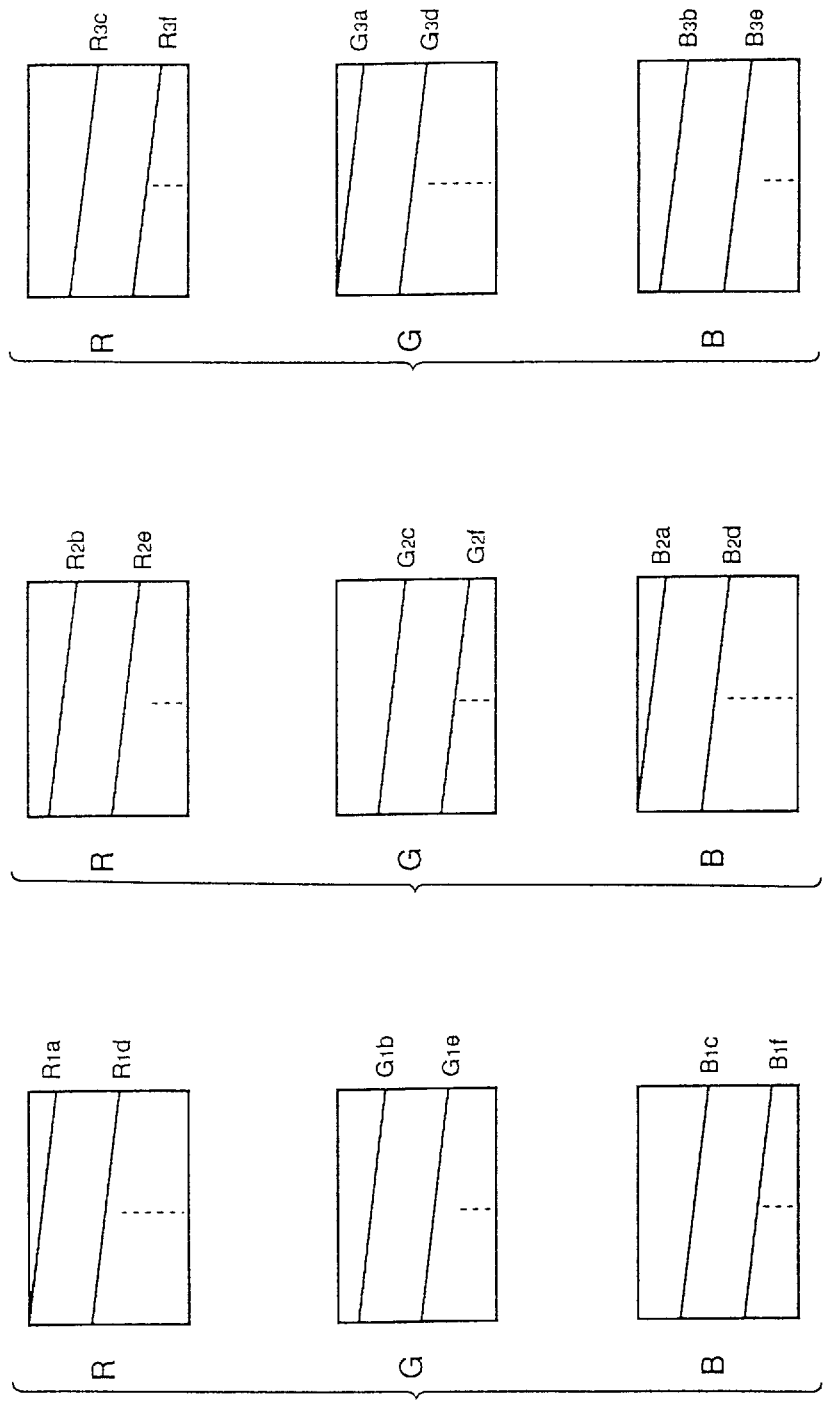

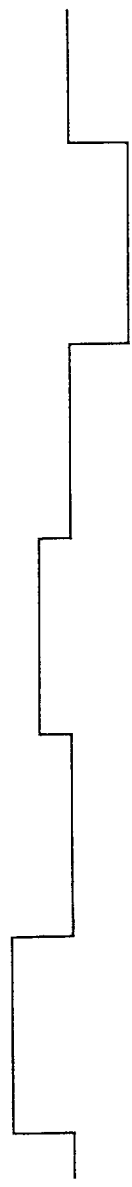
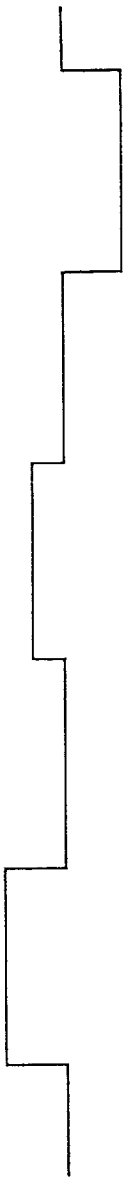
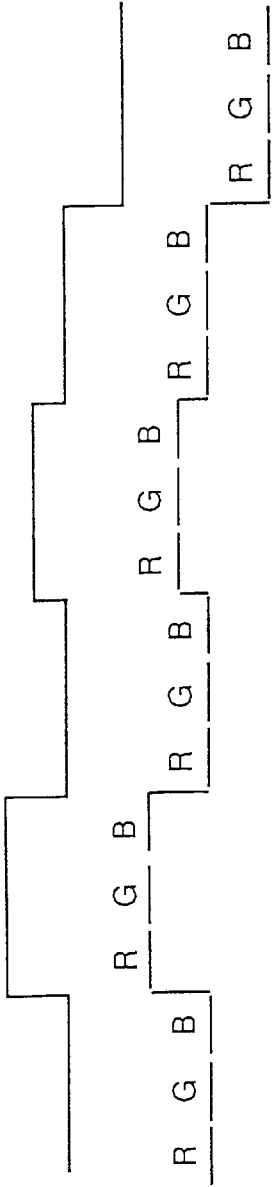
FIG.27A  OUTPUT OF 146R
FIG.27B  OUTPUT OF 146G
FIG.27C  OUTPUT OF 146B
FIG.27D  OUTPUT OF 144
FIG.27E  OUTPUT OF 128

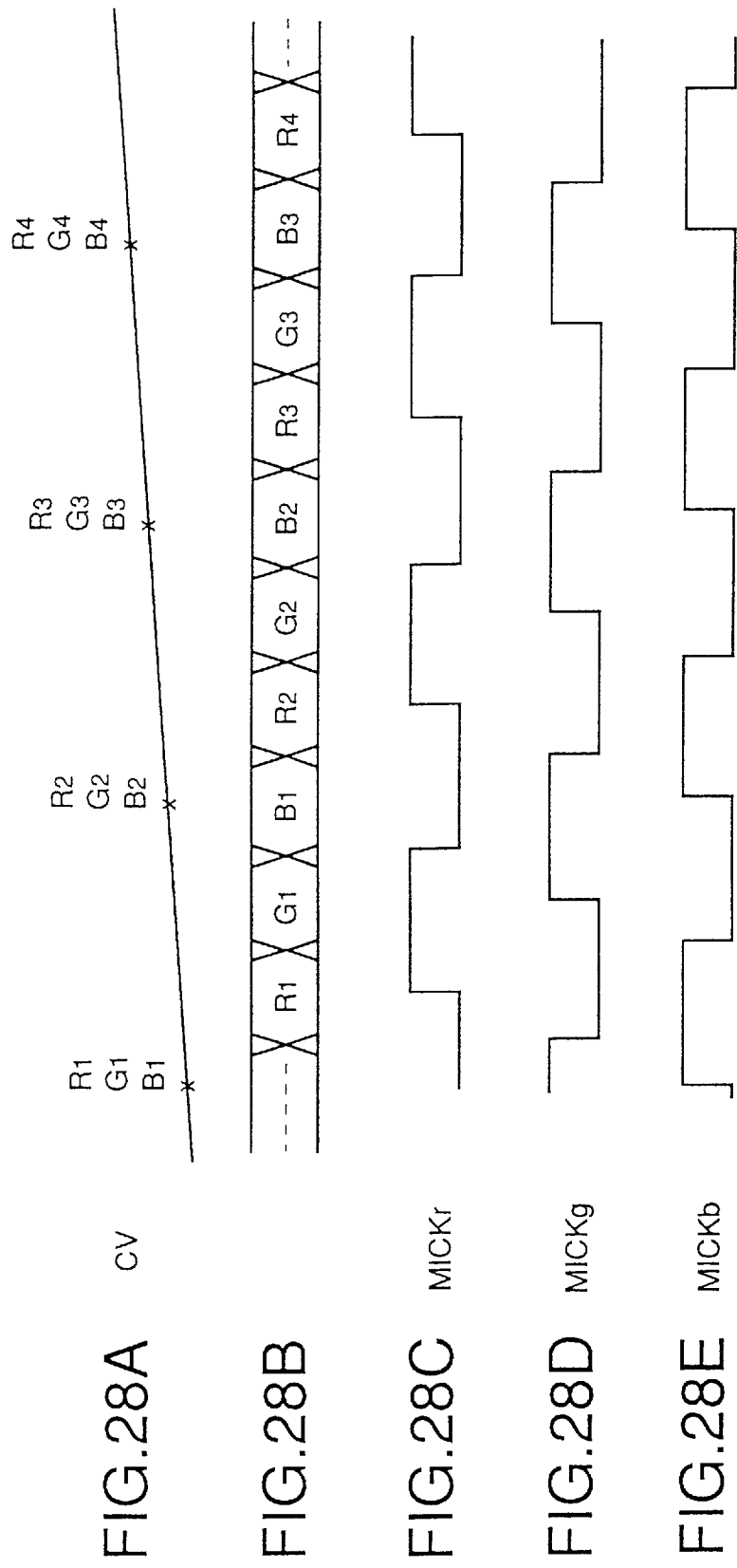

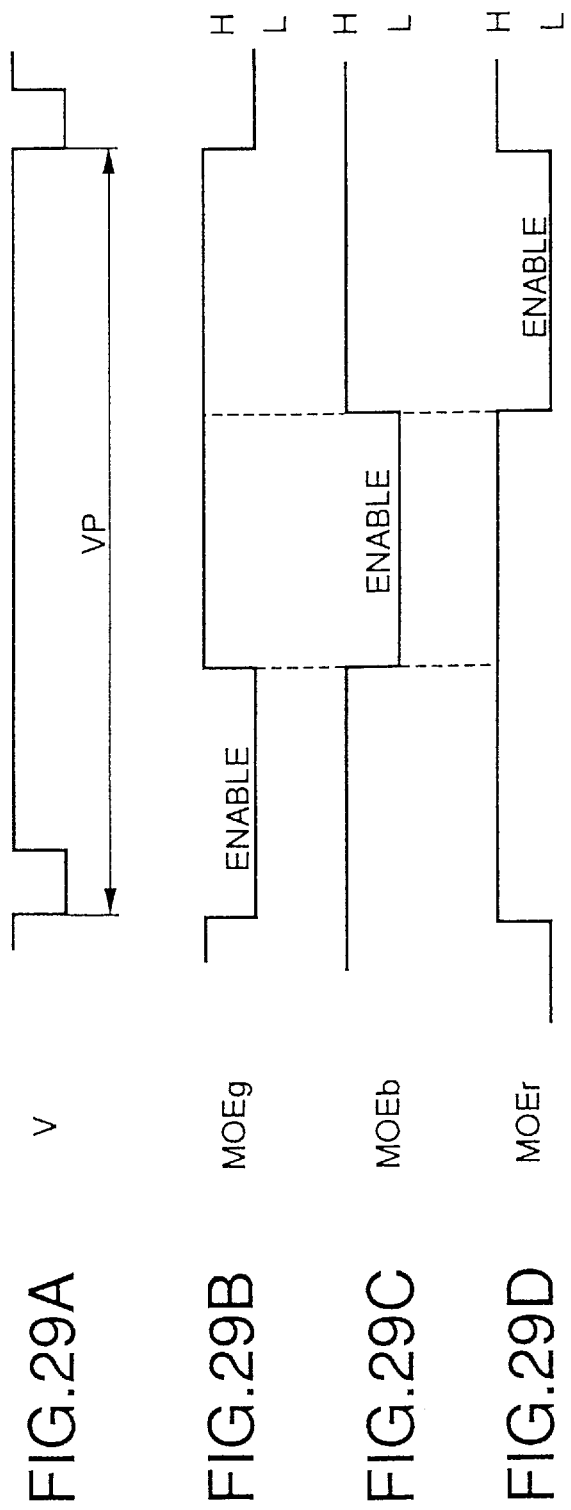

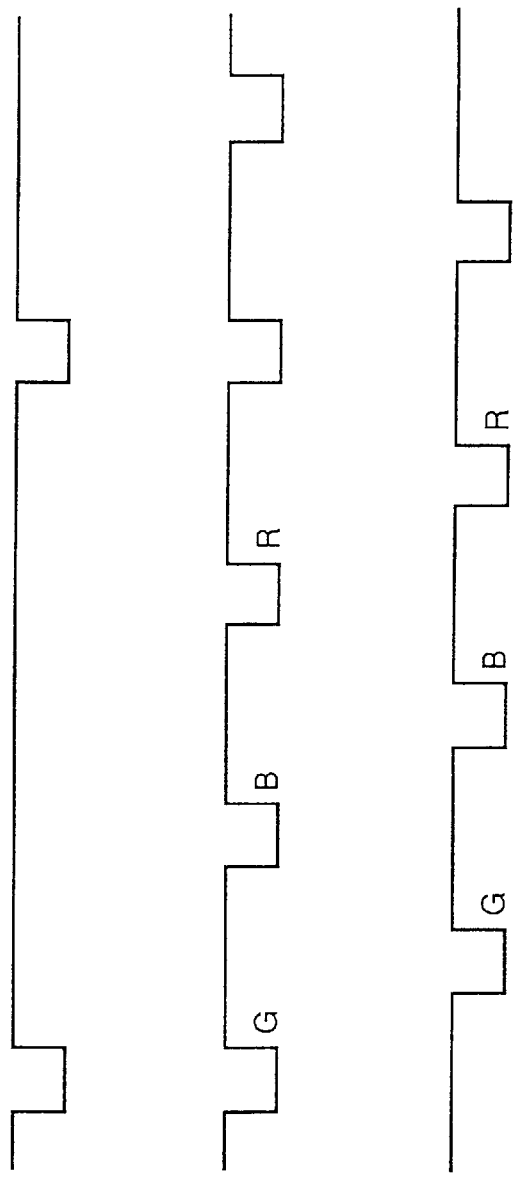

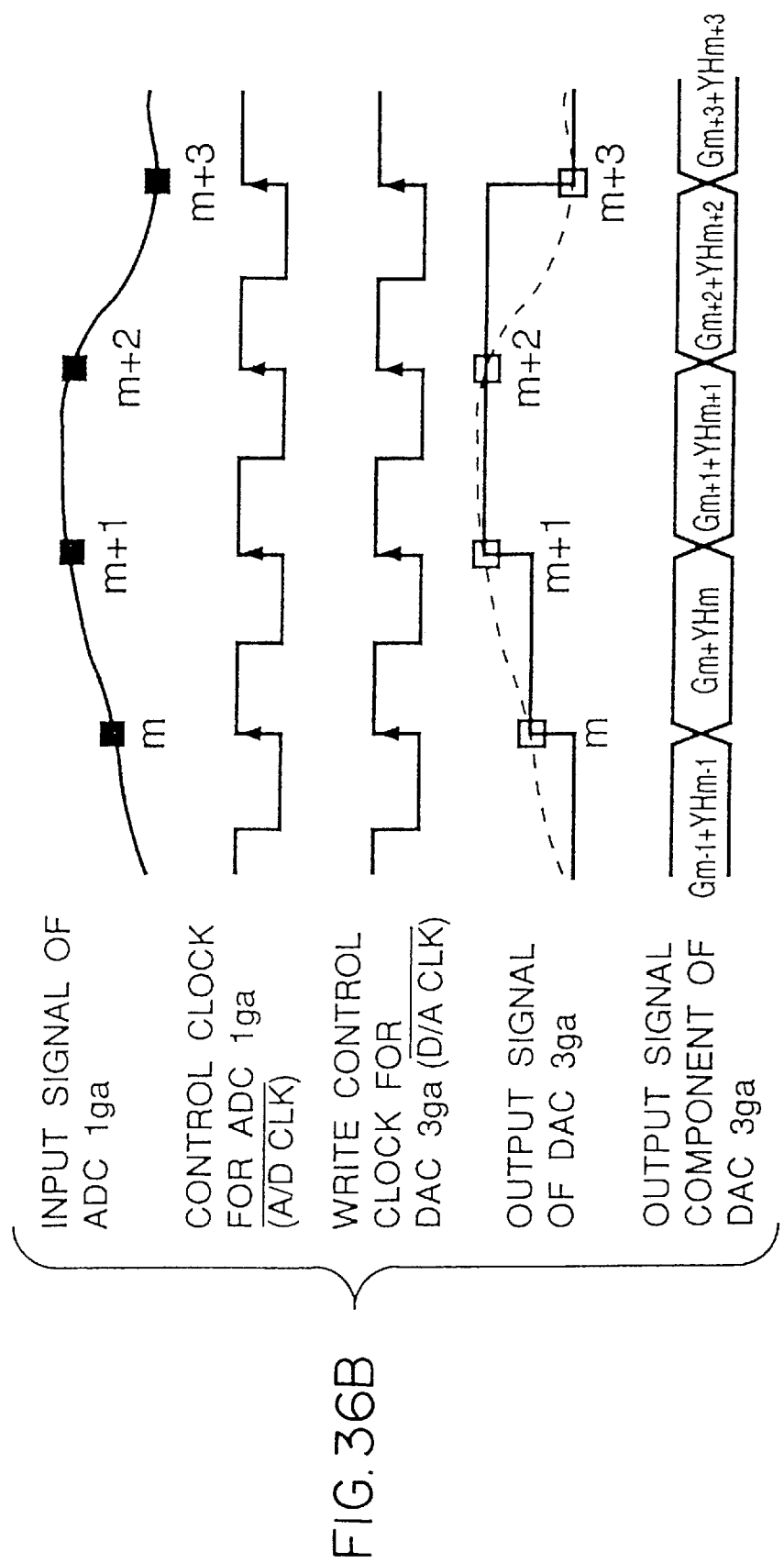

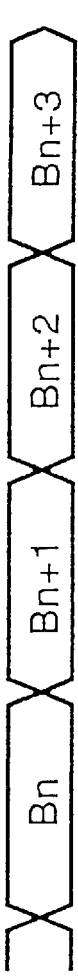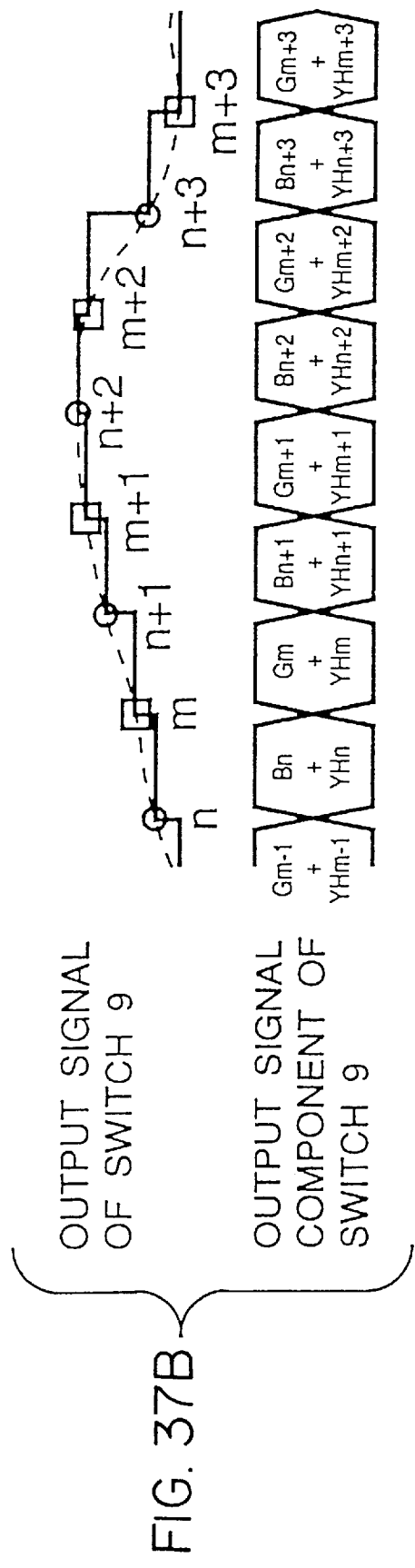
FIG. 37A
FIG. 37B

FIG.38E
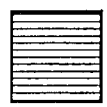 COLOR SIGNAL COMPONENT
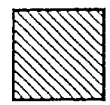 LUMINANCE SIGNAL COMPONENT
 ALIASING NOISE OF COLOR SIGNAL COMPONENT
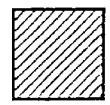 ALIASING NOISE OF LUMINANCE SIGNAL COMPONENT

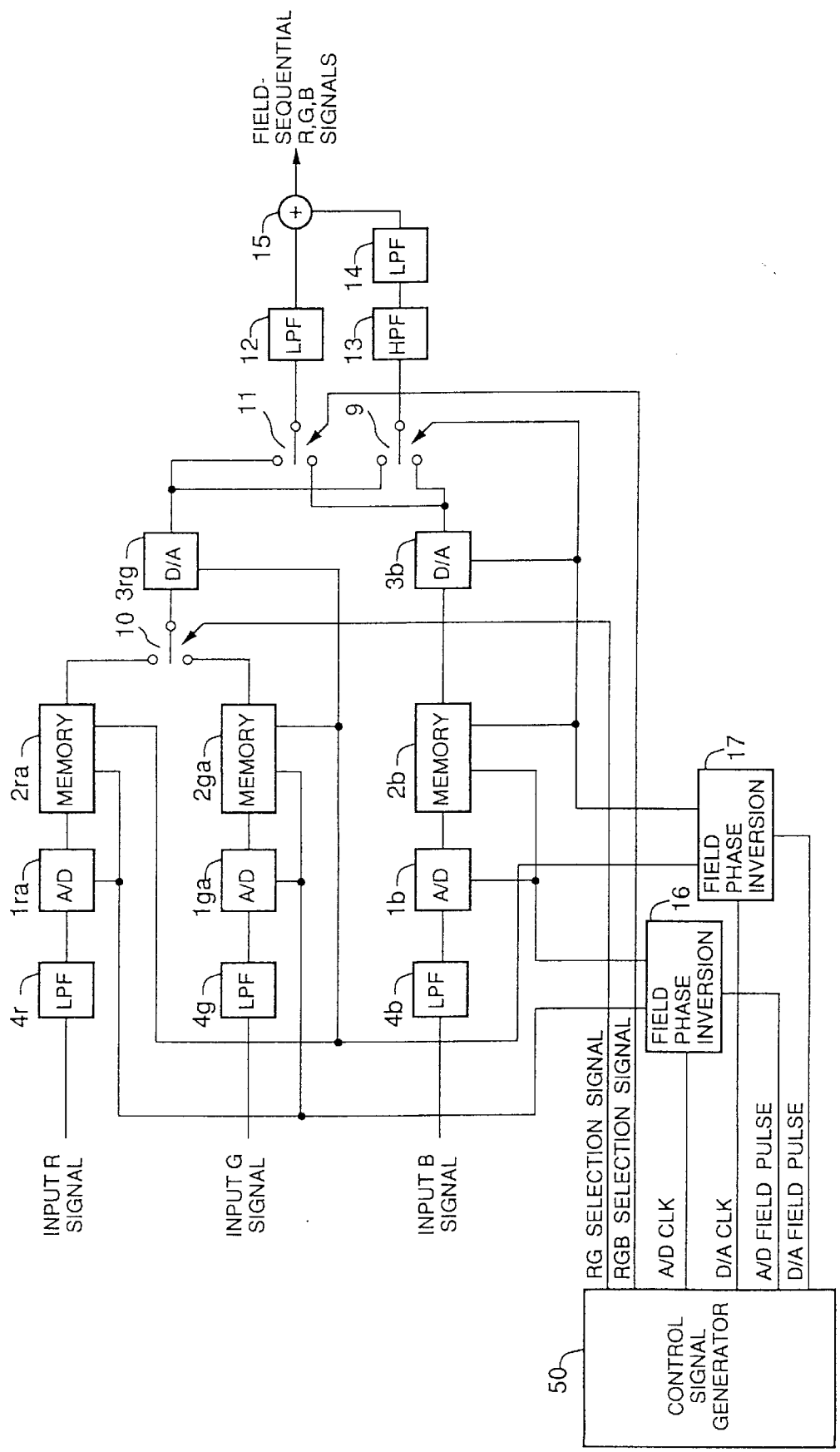

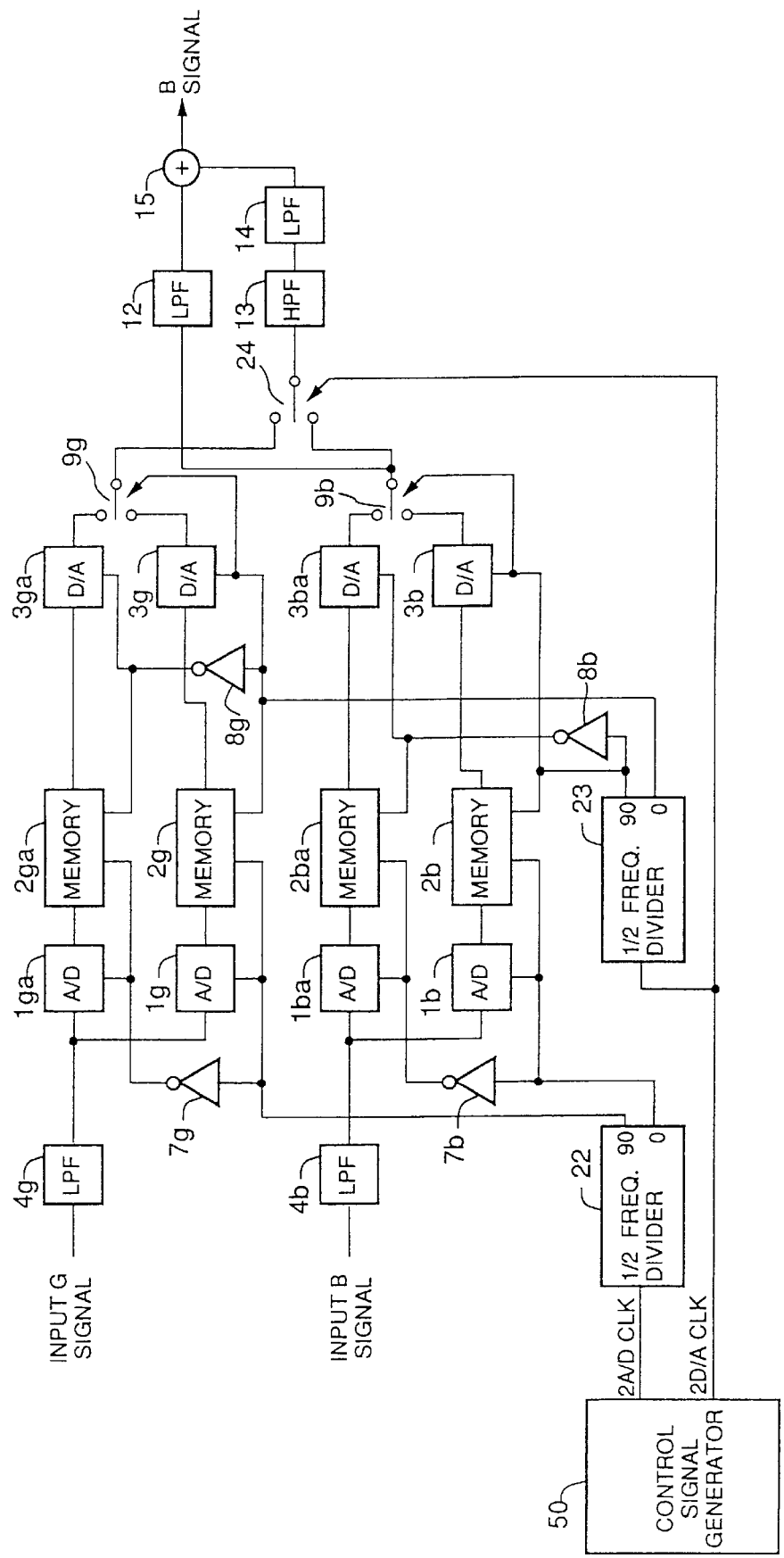

FIG.49G
 COLOR SIGNAL COMPONENT
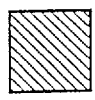 LUMINANCE SIGNAL COMPONENT
 ALIASING NOISE OF COLOR SIGNAL COMPONENT
 ALIASING NOISE OF LUMINANCE SIGNAL COMPONENT

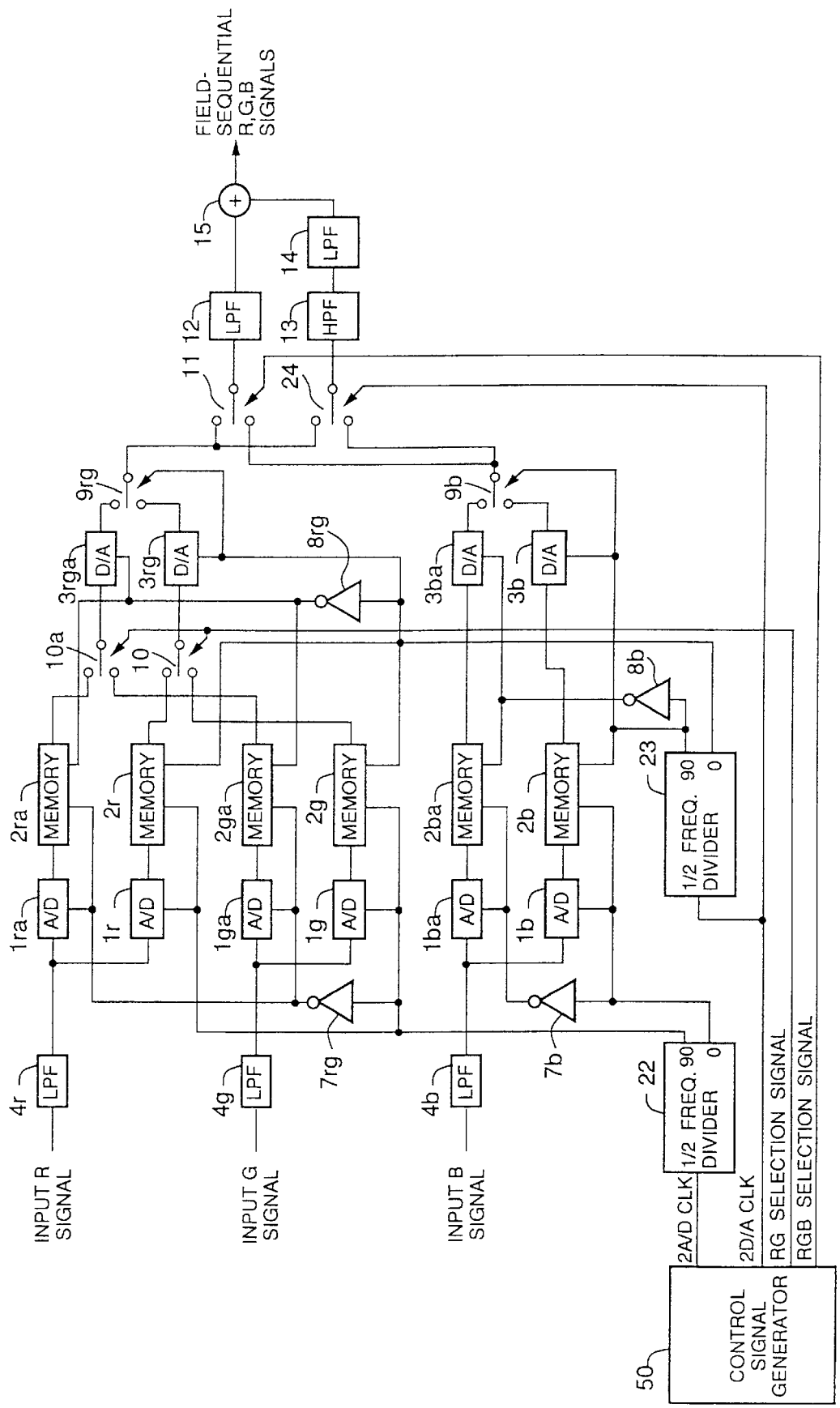

FIG.57G
 COLOR SIGNAL COMPONENT
 LUMINANCE SIGNAL COMPONENT
 ALIASING NOISE OF COLOR SIGNAL COMPONENT
 ALIASING NOISE OF LUMINANCE SIGNAL COMPONENT

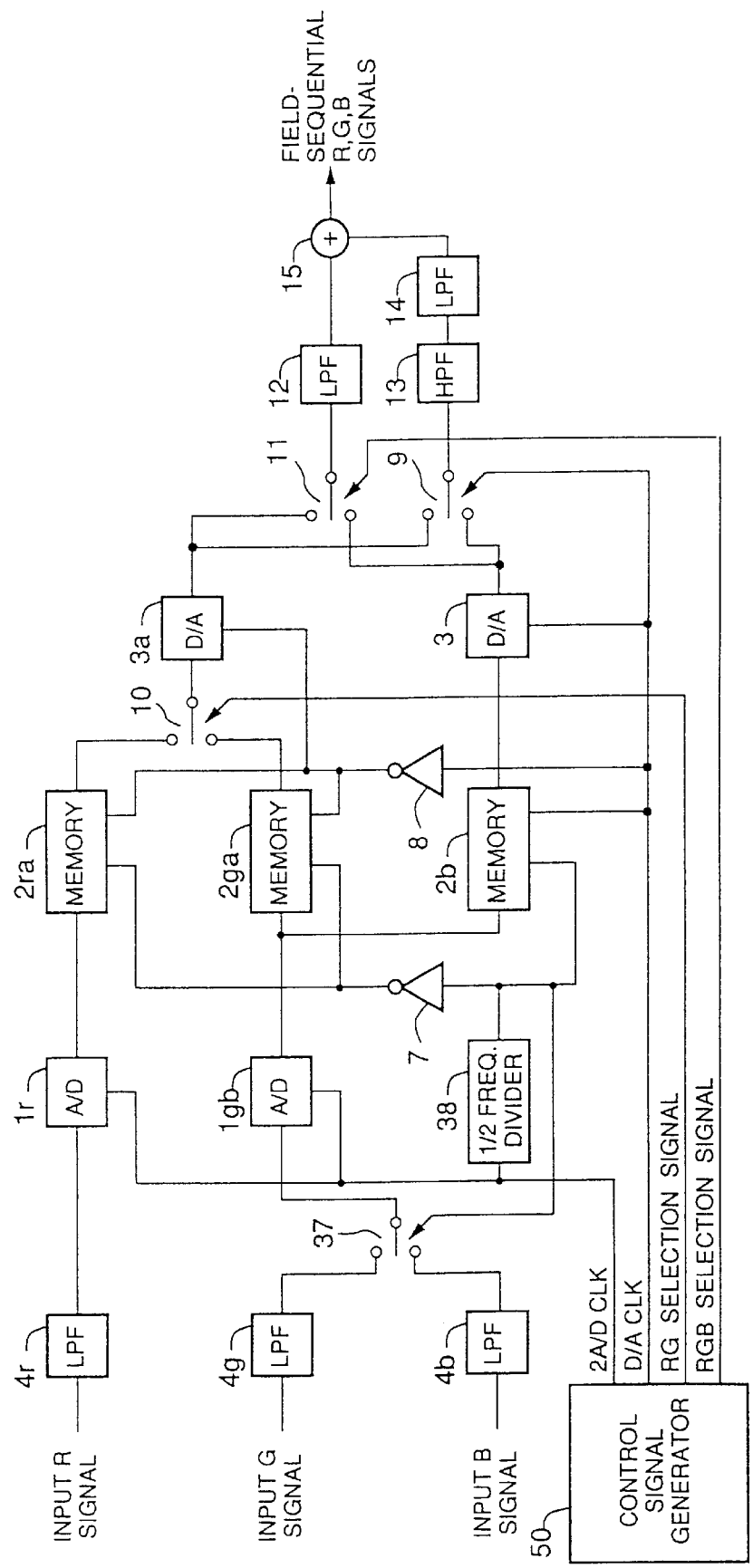

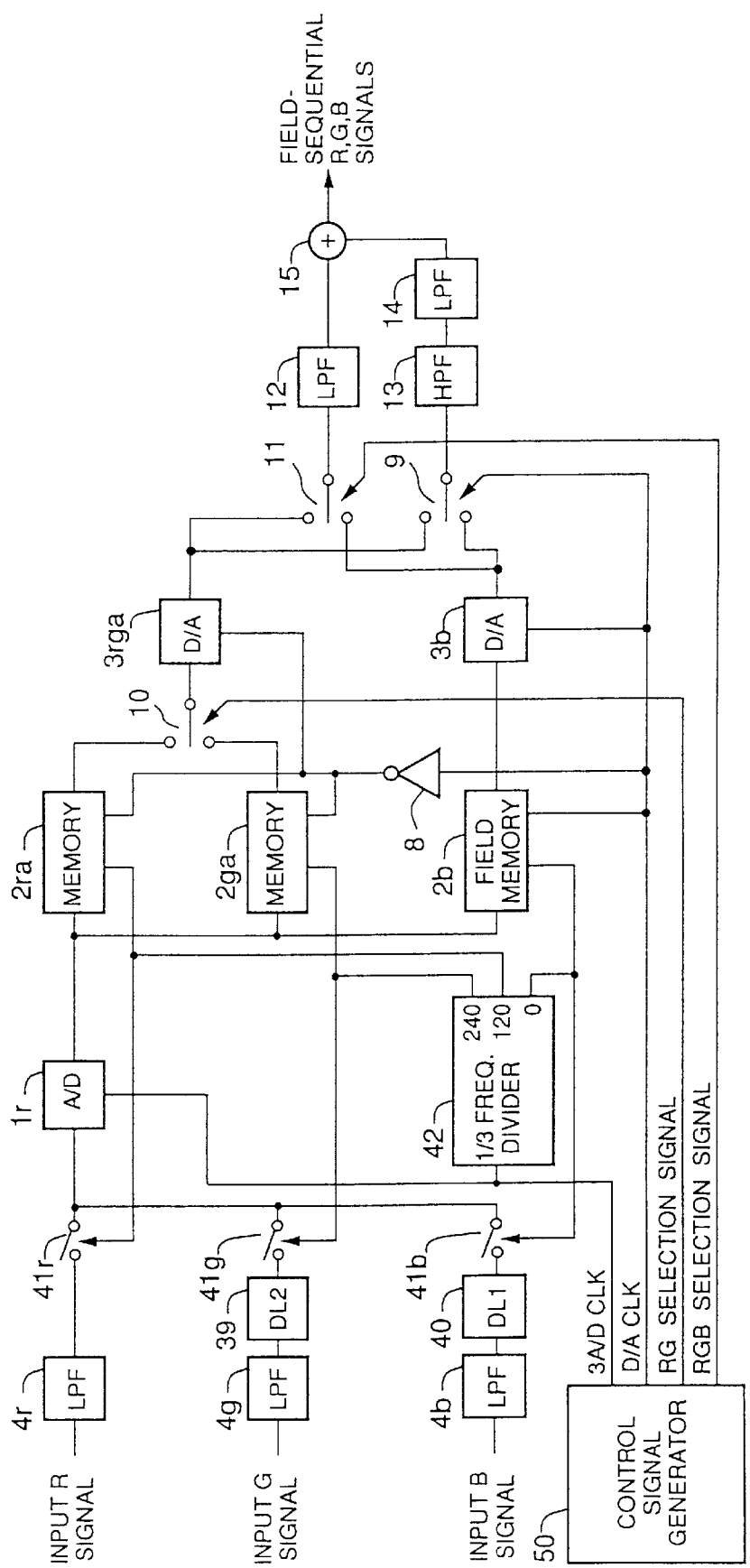

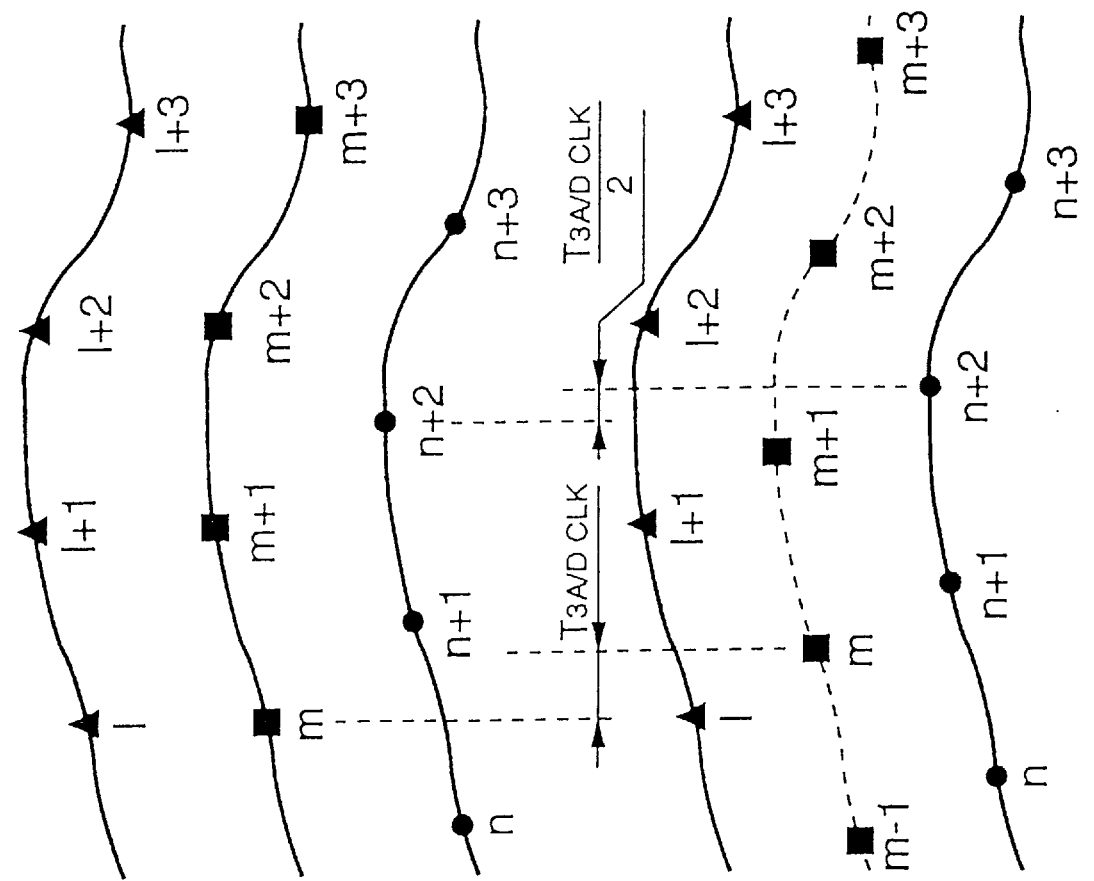

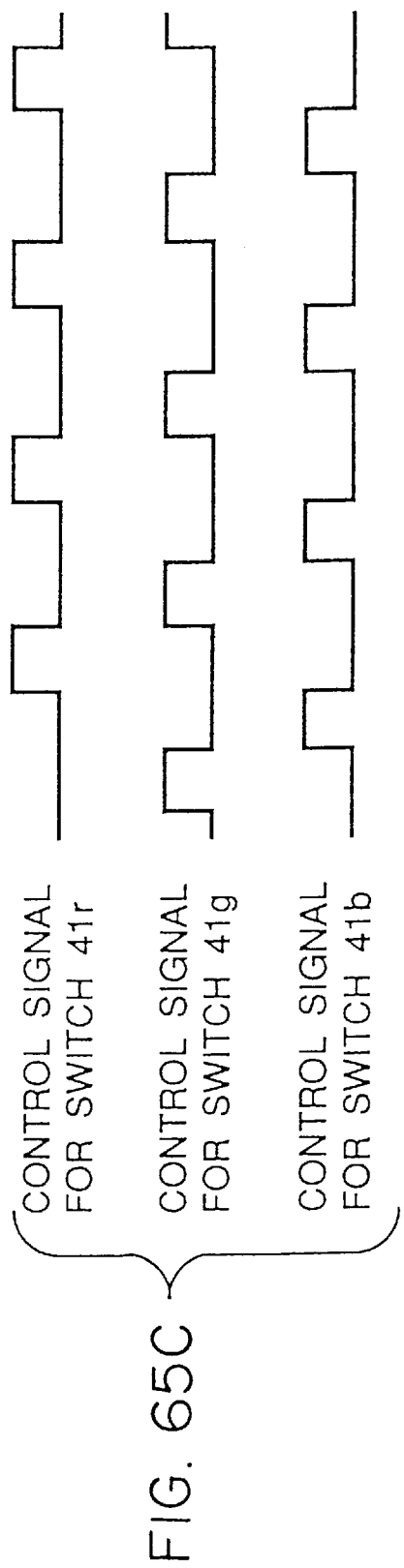

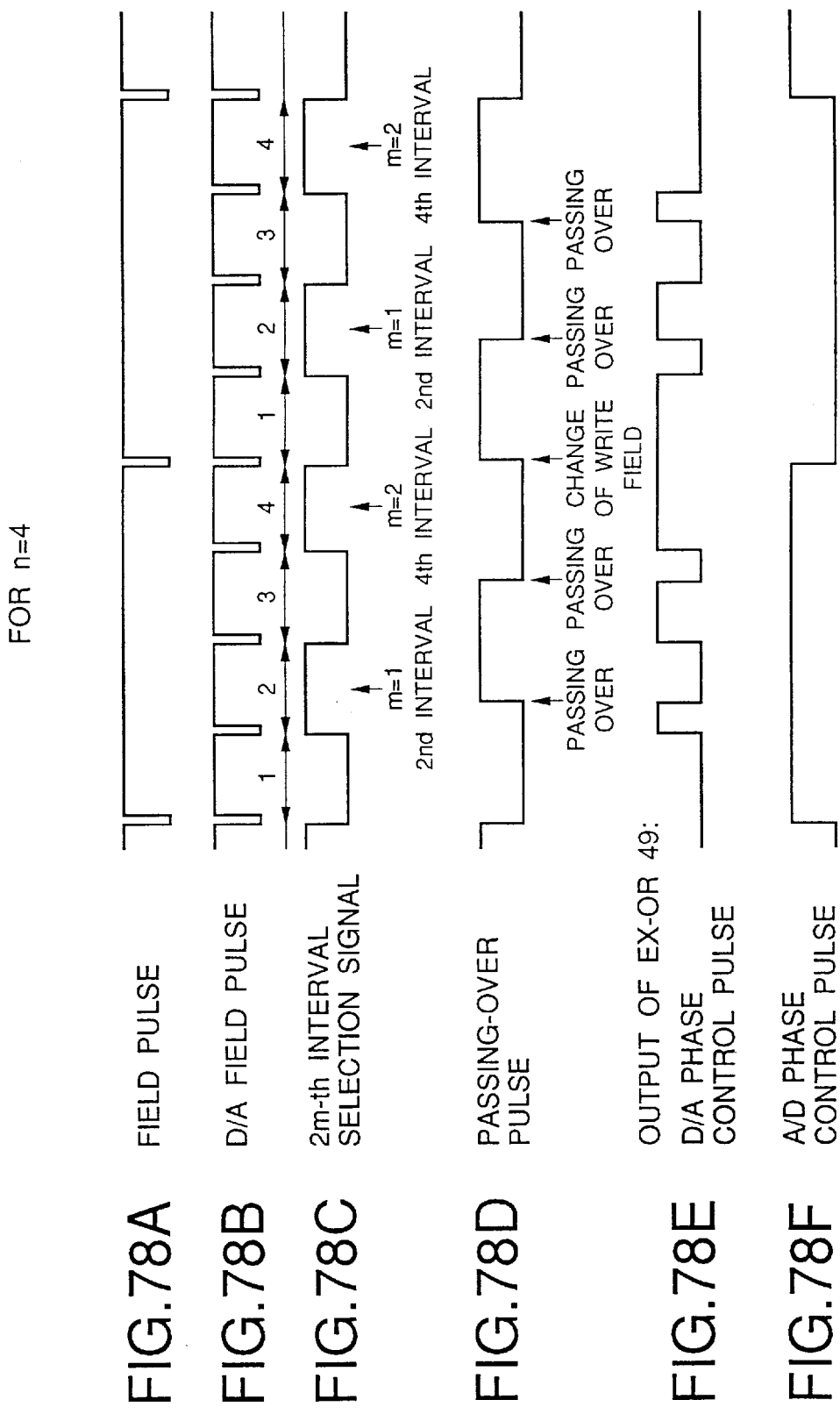

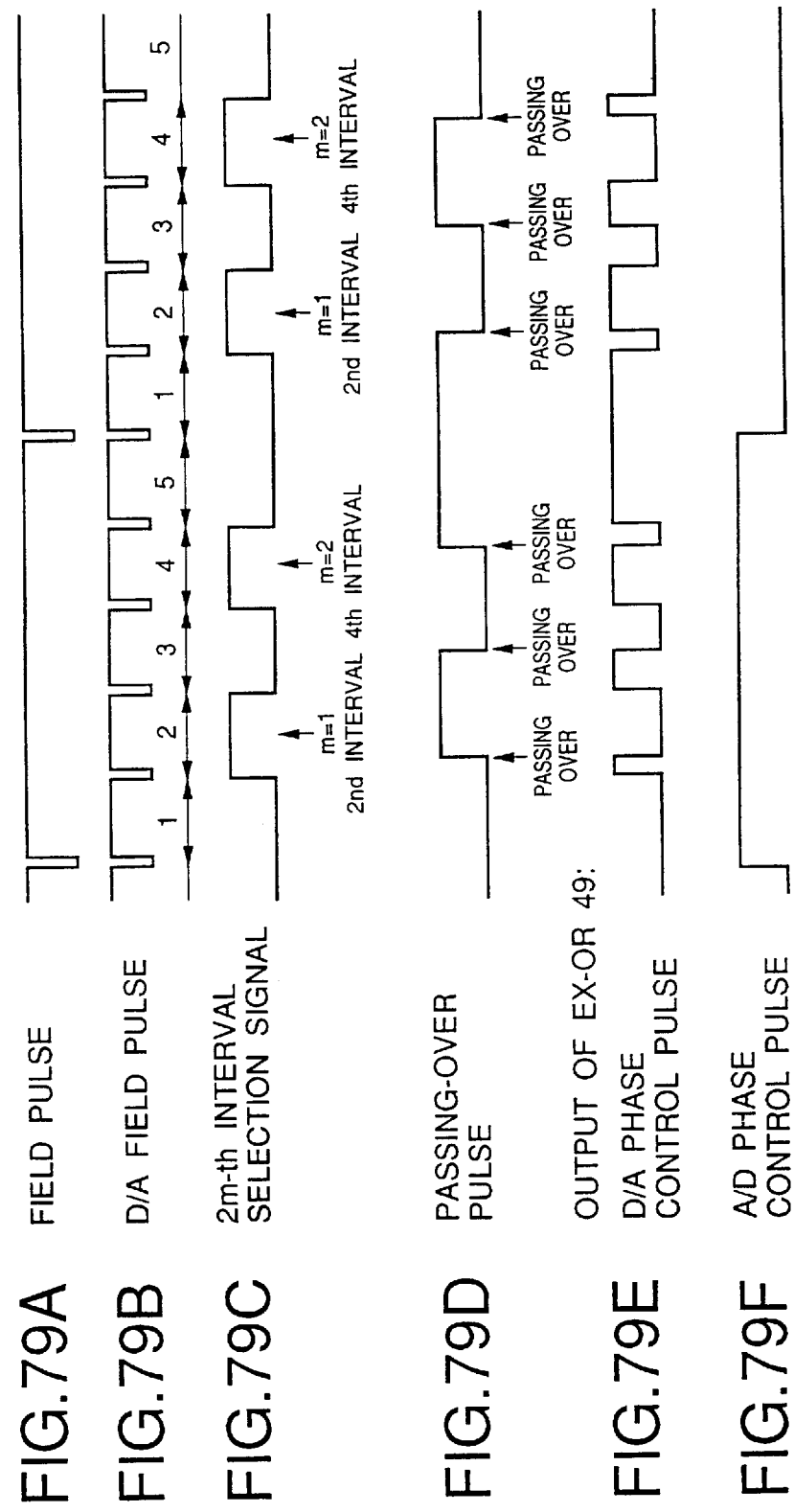

VIDEO SIGNAL PROCESSOR

This application is a divisional of copending application Ser. No. 08/087,384, filed on Jul. 8, 1993, the entire contents of which are hereby Incorporated by reference, now U.S. Pat. No. 5,574,561.

BACKGROUND OF THE INVENTION

The present invention relates to a color image display device comprising a monochromatic display device in combination with a coloring device.

The present invention also relates to a video signal processor and a phase inversion control pulse generator used therein.

Prior Art Example 1

FIG. 1 shows a conventional color image display device using a monochromatic image display means, such as a black-and-white CRT (cathode-ray tube) in combination with a coloring device.

As illustrated, it comprises a black-and-white CRT 102 and a coloring device 104 including a disk-shaped rotary filter 106 and a D.C. (direct current) rotary motor 108. The disk-shaped rotary filter 106 is formed of color filter sections 106R, 106G and 106B permitting transmission of light of red (R), green (G) and blue (B) and each extending over an angular range of 120°, as illustrated in FIG. 2. In other words, the disk-shaped rotary filter 106 is divided by radially extending lines 106rg, 106gb and 106br into three equal sectors 106R, 106G and 106B each having a vertex angle of 120° and respectively serving as color filters for red (R), green (G) and blue (B). The rotary filter 106 is fixed to a shaft 108 of the motor 110, and is rotated by the motor 110.

As the motor 110 rotates, the filter sections 106R, 106G and 106B sequentially pass over a screen 103 of the CRT 102.

A rotation sensor 112, which may comprise a Hall element, detects the rotation phase of the rotary filter 106. A magnet 113 is attached to the motor shaft 108 and serves as a detection member (member to be detected by the rotation sensor 112). That is, each time the motor shaft 108 rotates, the magnet 113 passes by the sensor 112, which thereby detects the passage of the magnet 113, on the basis of the magnetic flux emanating from the magnet 113, and generates a rotation sync pulse RP.

The rotation sync pulse RP is supplied to a control circuit 114, which also receives a vertical sync signal V, and supplies the motor 110 with a drive signal. The rotation of the motor 110 is controlled such that the rotary filter 106 rotates once per three vertical periods, and the rotation sync pulse RP is produced at a constant phase angle relative to the vertical sync signal V. The rotation of the rotary filter 106 is such that any given part of the filter passes from the upper part to the lower part of the screen 103 of the CRT 102. For instance, the boundary 106br between the filter sections 106b and 106r first comes to overlie the upper part of the screen 103, and then scans toward the lower part of the screen 103, in the same way as the horizontal scanning lines shifts from the upper edge to the lower edge of the screen 103 and at about the same speed as the vertical scanning (i.e., the shifting of the horizontal scanning lines 103 from the upper edge to the lower edge).

A switching circuit 116 receives the color image signals RS, GS and BS, and, being controlled by a selection signal S produced at the control circuit 114 in synchronism with the vertical sync signal V, sequentially and repeatedly selects the color image signals RS, GS and BS. The switching from one of the color image signals RS, GS and BS to another is made every vertical period.

The output of the switching circuit 116 is a sequence of color image signals RS, GS and BS each of which last for one vertical period and which are repeatedly altered from one to another every vertical period. The output of the switching circuit 116 is supplied as the luminance signal to the CRT 102. The CRT 102 also receives deflection currents from deflection circuits 118 and 120, which are controlled by the vertical and horizontal sync signals V and H, and displays an image corresponding to the signal supplied thereto.

The selection of the color image signals RS, GS and BS is made in time with the rotation of the rotary filter 106. That is, one of the color image signals RS, BS and BS corresponding to the filter section 106R, 106G or 106B which is overlying or passing over the screen 103 of the CRT 102 is supplied from the switching circuit 116 to the CRT 102. This is achieved by control of the control circuit 114, which also detects the rotation of the rotary filter 106 by means of the pulses RP from the rotation sensor 112.

FIG. 3A to FIG. 3D show the relationship between the rotation phase of the rotary filter 106, the scan line 103s of the CRT 102 and the switching of the switching circuit 116.

The switching circuit 116 is controlled by the selection signal S which is in synchronism with the vertical sync signal V as described above, and is made to select the color image signals corresponding to the filter section that is passing over the screen 103 of the CRT 102, in accordance with the rotation sync pulse RP. The switching is so made that when the front part (as seen in the direction of rotation) of one of the filter sections, e.g., the filter section 106R comes to overlie the upper part of the screen 103 of the CRT 102, supply of the blue color image signal BS to the CRT 102 for one field is terminated and supply of the red color image signal RS to the CRT 102 for one field is commenced (FIG. 3A). Similarly, when the front part of the green filter section 106G comes to overlie the upper part of the screen 103, one vertical period later, supply of the red color image signal RS for one field is terminated and supply of the green color image signal GS for one field is commenced (FIG. 3D). Similarly, when the front part of the blue filter section 106B comes to overlie the upper part of the screen 103, one vertical period later, supply of the green color image signal GS for one field is terminated and supply of the blue color image signal BS for one field is commenced (not illustrated).

With the above configuration, the color image signals RS, GS and BS are sequentially supplied from the switching circuit 116 to the CRT 102, while the vertical and horizontal deflection scans are conducted by means of the deflection circuits 118 and 120 in accordance with the vertical and horizontal sync signals V and H, so black-and-white images due to the color image signals RS, GS and BS are sequentially displayed on the screen 103, each in one vertical period.

As described above, the selection between the color image signals RS, GS and BS is made in conformity with the filter sections 106R, 106G and 106B of the rotary filter 106 which is passing over the screen 103 of the CRT 102, so that as the image due to the color image signal RS, GS or BS is displayed on the screen 103, the corresponding filter section 106R, 106G or 106B is positioned over the screen 103 of the CRT 102.

Accordingly, red, green and blue images by virtue of the color image signals RS, GS and BS are obtained through the filter sections 106R, 106G and 106B of the rotary filter 106, at the vertical period. The net effect is that a color image is seen to the viewer observing the image through the filter sections 106R, 106G and 106B.

Problems of the color image display device in the prior art as follows:

For displaying one complete color image, video signals of three fields are required. Where the picture contains an area where the image (part of the image) consists solely of one of the three colors, the image signal is of a high (or relatively high) level only during one of the three consecutive fields, and is at a low level during two other fields. This causes flicker, which is objectionable to the viewer.

When there occurs a phase discrepancy between the supply of the image signals and the rotation of the rotary filter, the images as seen through the filter have colors different from those of the original image. This may occur at the time of starting the motor 110, or when the video signal supplied to the image display device is switched from one to another.

Conventional Art Example

FIG. 4 shows the configuration of a color image display device of another prior art example (Conventional Art Example). The components or parts identical or corresponding to those in FIG. 1 are given identical reference numerals. The coloring device 104 and the CRT 102 are omitted.

As illustrated, it comprises a black-and-white CRT 102 with deflection circuits 118 and 120, a rotary filter 106, a motor 110 with a shaft 108 and a magnet 113 attached on it, a rotation sensor 112, and a control circuit 114, which are similar to those described with reference to FIG. 1, FIG. 2 and FIG. 3A to FIG. 3D. The functions of the control circuit 114 are partly similar to those described with reference to the Prior Art Example 1, but are partly different, as will be understood from the following description.

FIG. 4 also shows a color signal separator 122 and a sync separator 124 both of which receive a composite video signal which comprises luminance and chrominance components, and vertical and horizontal sync signals. The color signal separator 122 receives the composite video signal CV, and produces from the composite video signal, the R, G and B image signals of red, green and blue respectively representing red, green and blue components of a color image. The sync separator 124 extracts vertical and horizontal sync signals V and H from the composite video signal CV.

A frequency converter 126 receives the vertical sync signal V and produces therefrom a triple-frequency vertical sync signal V3 having a frequency three times that of the vertical sync signal V. The triple-frequency sync signal V3 is in synchronism with the original vertical sync signal V, and one out of every three sync pulses forming the triple-frequency vertical sync signal V3 are concurrent with the sync pulses of the original vertical sync signal V. Another frequency converter 127 receives the horizontal sync signal H, and produces therefrom a triple-frequency horizontal sync signal H3 having a frequency three times that of the horizontal sync signal H. The triple-frequency vertical sync signal V3 from the frequency converter 126 is in synchronism with the triple-frequency horizontal sync signal H3 from the frequency converter 127.

The control circuit 114 of this Convenitonal art example receives the rotation sync pulse RP and the vertical sync signal, as well as the triple-frequency vertical sync signal V3 from the frequency converter 126. The control circuit 114 of this conventional art example further receives rotation frequency pulses FP from the motor 110, and controls the motor 110 by providing a drive current DA, such that the rotary filter 106 rotates once per vertical period, and in synchronism with the vertical sync signal, i.e., such that the rotation sync pulse RP is produced at a constant phase angle relative to the vertical sync signal V. The control circuit 114 produces control signals and clocks used for control over various circuits in the color image display device.

Analog-to-digital (A/D) converters 128R, 128G and 128B receive the color image signals RS, GS and BS from analog to digital form. The resultant digital color image signals, each of which consists of a sequence of digital signals representing the samples, are also denoted by RS, GS and BS. The color image signals RS, GS and BS are illustrated in FIG. 5A, FIG. 5B and FIG. 5C.

Image memories 130R, 130G and 130B receive and store color image signals RS, GS and BS. Each of the image memories 130R, 130G and 130B has a capacity of storing one field of corresponding image signals RS, GS and BS, and is formed of a dual port memory capable of concurrent writing and reading.

The memories 130R, 130G and 130B are supplied with signals and clocks produced at the control circuit 114 in synchronism with the vertical sync signal V and the horizontal sync signal H, such that the writing of the image signals into the memories 130R, 130G and 130B is made in synchronism with the vertical sync signal V and horizontal sync signal H. The memories 130R, 130G and 130B are also supplied with signals and clocks produced at the control circuit 114 and in synchronism with the triple-frequency vertical sync signal V3 and the triple-frequency horizontal sync signal H3 such that the reading of the image signals from the memories 130R, 130G and 130B is made in synchronism with the triple-frequency vertical sync signal V3 and the triple-frequency horizontal sync signal H3.

One out of every three read field periods (each of "read field period" is a period for which a field of image signals of each color is read) is commenced in time with the commencement of the write field period (for which a field image signal of each color is written).

The writing of the image signals of each color of each field is achieved by designating writing addresses in succession and supplying data representing the samples of the color image signal to the memory to thereby write the sample data in the respective designated writing addresses. The reading of the color image signal from each memory is achieved by designating the reading addresses in succession and reading the data representing the samples of the color image signal from the designated reading addresses to thereby obtain a sequence of the sample data of the color image signal.

The color image signals RS, GS and BS are sequentially written in the memories 130R, 130G and 130B as the video signal is supplied from outside of the device and at a rate or interval identical to the rate or interval at which the signals are sampled and digitized by the A/D converters 128R, 128G and 128B. It is noted that the rate of sampling (or A/D conversion) and the rate of writing in a memory, as well as the rate of reading and the rate of D/A conversion which will be mentioned later, are expressed in terms of samples per unit time (e.g., samples per second). As a new field of image signals are written, they are written over the old image signals (of the preceding field). The color image signals RS, GS and BS stored in the memories are repeatedly read. The writing and the reading of the image signals are carried out concurrently. The reading is conducted at a rate or speed three times that of the writing. During a period (one vertical period) which is taken to write one field of signals, the same amount of signals (one field of signals) are read three times. Thus, color image signals RS3, GS3 and BS3 of a triple rate are produced from the memories 130R, 130G and 130B, as shown in FIG. 5D, FIG. 5E and FIG. 5F.

The triple-rate color image signals RS3, GS3 and BS3 read out from the memories 130R, 130G and 130B are D/A-converted by D/A converters 132R, 132G and 132B, and the analog color image signals, also denoted by RS3, GS3 and BS3 are supplied to the switching circuit 116, which is controlled by the selection signal S supplied in synchronism with the signal V3. As a result, a time-division multiplexed image signals VS3 are output in sequence and in turn, in which switching of the image signal of one color to the image signal of another color is effected every read field, that is one field of image signal of one color is consecutively output before being taken over by image signal of another color, as illustrated in FIG. 5G. The output of the switching circuit 116 is supplied, via an amplifier not illustrated, to the CRT 102.

The triple-frequency signal V3 is supplied from the frequency converter 126 to the vertical deflection circuit 118, and the triple-frequency signal H3 is supplied from the frequency converter 127 to the horizontal deflection circuit 120. Vertical and horizontal deflection currents are supplied from the deflection circuits 118 and 120 to vertical and horizontal deflection coils (not shown) in the CRT 102. The CRT 102 therefore conducts vertical and horizontal deflection scanning at a rate three times that of ordinary scanning.

The relationship between the rotation phase of the rotary filter 106, the scan line 103s of the CRT 102 and the switching of the switching circuit 116 is identical to that described with reference to FIG. 3A to FIG. 3D. However, it should be noted that the rotary filter 106 of this prior art example rotates at a rate three times higher than that described in connection with Prior Art Example 1.

With the above configuration, the triple-frequency image signals RS3, GS3 and BS3 are sequentially supplied to the CRT 102, while the vertical and horizontal deflection scans are conducted at a triple rate, so black-and-white images due to the color image signals RS3, GS3 and BS3 are sequentially displayed on the screen 103, each in a period one third that of the vertical period.

As described above, the selection between the color image signals RS3, GS3 and BS3 is made in conformity with the filter sections 106R, 106G and 106B which is passing over the screen 103 of the CRT 102, so that as the image due to the color image signal RS3, GS3 or BS3 is displayed on the screen 103, the corresponding filter section 106R, 106G or 106B is positioned over the screen 103 of the CRT 102.

Accordingly, red, green and blue images by virtue of the color image signals RS3, GS3 and BS3 are obtained through the filter sections 106R, 106G and 106B of the rotary filter 106, at the one-third vertical period. The net effect is that a color image is seen to the viewer observing the image through the filter sections 106R, 106G and 106B.

An advantage of The Conventional Art Example over Prior Art Example 1 is that the images of the respective colors are displayed at a rate three times that of the prior art example. The flicker is therefore much reduced.

In Conventional Art Example, writing into the memories 130R, 130G and 130B reading therefrom are conducted simultaneously, and the reading is performed at a rate three times higher than the rate of writing. As a result, passing-over, i.e., passing of the reading address over the writing address, occurs. This will be explained in further detail with reference to FIG. 6A to FIG. 6B, FIG. 7A to FIG. 7B, and FIG. 8A to FIG. 8B. It is assumed that one of every three read fields is commenced in time with the commencement of the write field, as was also described in connection with Prior Art Example 1.

FIG. 6A shows the color image signals RS, GS and BS stored at the end of the first one-third of the write field period, or the period taken for writing one field of signals. FIG. 7A shows the color image signals RS, GS and BS stored at the end of the second one-third of the write field period. FIG. 8A shows the color image signals RS, GS and BS stored at the end of the entire write field period.

The areas of the memories are shown in a form corresponding to the image displayed on a display device. The memory area into which the writing with the present field of data has been effected is indicated by hatching, while the area into which the writing of data of the present field has not been effected and therefore still storing the data of the preceding field is unhatched. As will be readily understood, such area is one third (131A) of the entire area for one field (130R, 130G or 130B) at the end of the one-third field period; two third (131A and 131B) at the end of the two-third field period; and the entirety at the end of the entire field.

FIG. 6B shows the data read from each of the memories during the first read field period (first cycle of reading operation). FIG. 7B shows the data read from each of the memories during the second read field period. FIG. 8B shows the data read from each of the memories during the third or last read field period. The assembly or set of data read from each memory are shown in a form corresponding to the image on a display device.

The region of the image formed of the data of the present write field are indicated by hatching, while the region formed of data of the preceding write field are unhatched. As shown the data read in the first read field period consists of the data of the preceding data. The data read in the third (last) field period consists of the data of the present write field. The first half of the data in the second read field consists of the data of the present write field, while the second half of the data consists of the data of the preceding write field.

At the beginning of the first one-third write field period, the writing and reading start with the beginning (starting address) of the field. Since the address for the reading varies or is incremented at a faster rate, the address used for reading is always ahead of the address of the writing. Thus, the data read during this period is of the preceding write field from the beginning to the end, as indicated in FIG. 6B (entire region being unhatched).

At the end of the first one-third field period (when the address for the reading is at the end of the entire memory area), the address for the writing is at one third of the full memory area (as counted from the starting address), as indicated by hatching in FIG. 6A. With the writing address at such a position, the second read field starts.

In the beginning, the reading address is behind the writing address. But because the reading address advances three times faster than the writing address, the reading address passes over the writing address at the middle of the second read field, which also is the middle of the write field. Thereafter, the reading address is ahead of the writing address. Accordingly, the data read during the first half of the second read field consists of the data of the present field (as indicated by hatching), while the data read during the second half of the second read field consists of the data of the preceding field (as indicated by unhatching).

At the end of the second one-third field period (when the reading address is at the end of the entire memory area), the writing address is at two third of the full memory area (as counted from the starting address), as indicated by hatching in FIG. 6B. With the writing address at such a position, the third read field starts.

During the third read field, the reading address for reading is maintained behind the writing address and only at the end of the field period, the former catches up with the latter. Accordingly, the data read during the third read field consists of the data of the present field (as indicated by hatching).

If the image formed by the data of the present field and the preceding field differs, due to motion of the picture for example, as illustrated in FIG. 9A showing the image of the preceding field, and FIG. 9B showing the image of the present field, the data read during the second one-third write field period will result in an image shown in FIG. 9C. The problem of passing-over will also be described later with reference to FIG. 67, FIG. 68 and FIG. 74.

Thus, there is a discontinuity or discrepancy between the upper and lower halves of the picture. The discontinuity or discrepancy of the picture occurs only one out of three images, and where motion occurs.

Further prior art examples and their problems are discussed with reference to FIG. 10 to FIG. 18.

Prior Art Example 2

FIG. 10 is a block diagram showing a part of a video signal processor for converting video signal of three primary colors red (R), green (G) and blue (B) into field-sequential signals, used in a display device for displaying the video signals of the three primary colors. FIG. 10 shows that part of the video signal processor which relates to one of the three primary colors.

In such field sequential display, the rate of scanning may be higher than the rate of scanning used when the images of the three primary colors are displayed concurrently, e.g., by the use of three beams.

FIG. 11A and FIG. 11B are waveform diagrams for illustrating the operation of the circuit of FIG. 10. FIG. 12A to FIG. 12D show the frequency distributions of the signals at various nodes of the video signal processor of FIG. 10.

Referring to FIG. 10, the video signal processor comprises an analog-to-digital (A/D converter) 1, a field memory 2, a digital-to-analog (D/A converter) 3, a low-pass filter (LPF) 4 for band-limiting the input signal to thereby preventing occurrence of aliasing noises in the frequency band of the video signal, and another LPF 5 for removing aliasing noises from the output signals.

In the following description, controls over the A/D converter 1, the field memory 2 and the D/A converter 3 are all effected at the rising edges of the control clock, and although in practice it is necessary to consider the timing delays of operation due to response delays of the circuit components within each cycle, this is not discussed in the following description. That is, it is assumed that the circuit components operates without delays (except where such delays are specifically mentioned).

Discrete time signals obtained by sampling continuous time signals contain signal components of the frequency distribution of the original continuous time signals, and signal components extending, both upward and downward, from the sampling frequency and its multiples, and having a bandwidth equal to the band-width of the original continuous time signals. If the sampling frequency is less than twice the maximum frequency of the original continuous time signals, the discrete time signal components having a frequency band extending downward from the sampling frequency overlaps the frequency band of the original continuous time signals, separating them from each other by means of a low-pass filter is not possible. To enable separation, the frequency band of the original continuous time signals must be limited to not higher than one half the sampling frequency. This is known as Nyquist's theorem. One half of the sampling frequency is called a Nyquist frequency.

In the following description, the discrete time signal components having a frequency band extending downward from the sampling frequency are called the aliasing noises. It is also assumed that the frequency $f_{A/D}$ of the control clock of the A/D converter 1 and the frequency $f_{D/A}$ of the control clock of the D/A converter converter 3 are identical to each other.

In the video signal processor of FIG. 10, the LPF 4 band-limits the input signal having a frequency distribution shown in FIG. 12A to produce a signal having a frequency distribution shown in FIG. 12B.

The A/D converter 1 samples the input signal at the rising edges of the A/D converter control clock, as shown in FIG. 11A, and performs A/D conversion at the sample points n, n+1, n+2, . . . indicated by dots (solid circles).

The field memory 2 stores the data from the A/D converter 1 at the rising edges of the memory write control clock. The stored data are output at the memory read control clock.

The D/A converter 3 D/A converts the data from the field memory 2 at the rising edges of the D/A converter control clock, and produces a signal indicated by blank circles in FIG. 11B. The output of the D/A converter 3 is maintained until the next rising edge of the D/A converter control clock. The output signal of the D/A converter 3 contains aliasing noises as shown in FIG. 12C.

The LPF 5 band-limits the output signal from the D/A converter 3 to a frequency band of not higher than one half the frequency of the D/A converter control clock in order to remove the aliasing noises from the D/A converter control clock frequency $f_{D/A}$. The output of the LPF 5 has a frequency distribution as shown in FIG. 12D.

The signal band-width of the video signal processor described above is not more than the one half the frequency of the A/D converter control clock, i.e., not more than the pass-band of the LPF 4.

FIG. 13 is a block diagram showing a video signal processor for converting the video signal of three primary colors of red, green and blue into field sequential signals used in a display device for performing field sequential display of video signals of the three primary colors. In FIG. 13, members identical or corresponding to those in FIG. 10 are denoted by identical reference numerals, with or without suffixes r, g or b, which indicate that the circuit is provided for the red, green or blue video signal.

That is, LPFs 4r, 4g and 4b, A/D converters 1r, 1g and 1b, and field memories 2r, 2g and 2b, respectively similar to the LPF 4, the A/D converter 1 and the field memory 2 in FIG. 10 are provided for the input R, G and B signals of red, green and blue. A switch 6 selects the output data from the field memories 2r, 2g and 2b in sequence, for one field period each. The selection is made in accordance with an RGB selection signal.

The output of the switch 6 is a sequence of R, G and B signals in cyclic succession, with each of the R, G and B signals continuing for one field.

The D/A converter 3 D/A converts the output of the switch 6 and outputs field sequential R, G and B signals.

The signal band-width of the video signal processor described above is not higher than one half the control clocks for the A/D converters 1r, 1g and 1b, which is the passband of the LPFs 4r, 4g and 4b.

Prior Art Example 3

FIG. 14 is a block diagram showing a part of another conventional video signal processor for converting the video signals of three primary colors, used in a display device for performing field-sequential display of R, G and B video signals. That part which relates to production of the decoded color signal of one color is illustrated. In FIG. 14, members identical or corresponding to those shown in FIG. 10 and FIG. 13 are denoted by identical reference numerals.

An inverter 7 inverts the phase of the A/D control clock. Another inverter 8 inverts the phase of the D/A control clock. A switch 9 selects one of the output signals from the D/A converters 3 and 3a. FIG. 15A, FIG. 15B, and FIG. 16A to FIG. 16C show operation of the circuit of FIG. 14. FIG. 17A to FIG. 17F show the frequency distributions at various nodes of the circuit of FIG. 14.

It is again assumed that the frequency $f_{A/D}$ of the control clock for the A/D converters 1 and 1a and the frequency $f_{D/A}$ of the control clock for the D/A converter 3 and 3a are identical to each other.

The input signal has the frequency distribution shown in FIG. 17A. The LPF 4 band-limits the input signal to a band-width of not higher than the frequency of the control clock for the A/D converters 1 and 1a to produce a signal having a frequency distribution shown in FIG. 17B. The A/D converter 1, the field memory 2 and the D/A converter 3 are similar to those described with reference to FIG. 10. The time points at which the input signal is sampled and A/D-converted by the A/D converter 1 are indicated by solid circles, n, n+1, n+2, n+3, ..., is indicated by output of the A/D converter 1 is shown in FIG. 15A. The output data from the A/D converter 1 and the data written in the field memory 2 are also shown in FIG. 15A. The output data from the field memory 2 and the output signal from the D/A converter 3 are shown in FIG. 16A. The output signal from the D/A converter 3 are indicated by blank circles. The frequency distributions of the output signals of the LPF 4, the A/D converter 1, the D/A converter 3 are also shown in FIG. 17A to FIG. 17C.

The A/D converter 1a, the field memory 2a and the D/A converter 3a are similar to the A/D converter 1, the field memory 2 and the D/A converter 3, respectively, but they operate responsive to the control clocks having 180° phase difference from the control clocks for the A/D converter 1, the field memory 2 and the D/A converter 3.

The A/D converter 1a therefore samples the input signal at time points indicated by squares, at m, m+1, m+2, m+3, ..., and performs A/D conversion, as shown in FIG. 15B. The output data from the A/D converter 1a and the data written in the field memory 2a are also shown in FIG. 15B. The output data from the field memory 2a and the output signal from the D/A converter 3a are shown in FIG. 16B. The output signal from the D/A converter 3 are indicated by blank squares. The frequency distributions of the output signals of the A/D converter 1a and the D/A converter 3a are shown in FIG. 17B and FIG. 17D.

As illustrated, the output signals of the D/A converters 3 and 3a contain aliasing noises from the control clock frequency $f_{D/A}$ for the D/A converters 3 and 3a. The phases of the aliasing noises contained in the output signals of the D/A converters 3 and 3a have a phase difference of 180° from each other, because of the phase difference of 180° in the sampling timing.

The switch 9 selects one of the output signals from the D/A converters 3 and 3a in accordance with the control clock for the D/A converter 3, and produces a signal having twice the sampling points or sampling frequency as shown in FIG. 16C. The aliasing noises contained in the outputs D/A converters 3 and 3a cancel each other because the phase difference between them is 180°. On the other hand, the output of the switch 9 contains aliasing noises from the frequency twice the frequency of the control clock, i.e., from $2f_{D/A}$.

As a result, the frequency distribution of the output of the switch is as shown in FIG. 17E.

The LPF 5 removes the aliasing noise from the frequency twice the control clock frequency $f_{D/A}$ by limiting the output signal to the control clock frequency $f_{D/A}$, to thereby outputting the signal having a frequency distribution shown in FIG. 17F.

The video signal processor of the Prior Art Example 3 described above has a signal having a bandwidth which extends to the control clock frequency $f_{A/D}$. However, two A/D converters and two field memories are required, as opposed to one A/D converter and one field memory in the Prior Art Example 1.

FIG. 18 shows a video signal processor for converting video signals of the three primary colors into field sequential signals used for a display device performing field sequential display of the video signals of the three primary colors. Members identical or corresponding to those in FIG. 13 are denoted by identical reference numerals.

The LPFs 4r, the A/D converters 1r and 1ra, and field memories 2r and 2ra are similar to the LPF 4, the A/D converters 1 and 1a, and the field memories 2 and 2a, but are used for processing the R video signal. The LPFs 4g, the A/D converters 1g and 1ga, and field memories 2g and 2ga are similar to the LPF 4, the A/D converters 1 and 1a, and the field memories 2 and 2a, but are used for processing the G video signal. The LPFs 4b, the A/D converters 1b and 1ba, and field memories 2b and 2ba are similar to the LPF 4, the A/D converters 1 and 1a, and the field memories 2 and 2a, but are used for processing the B video signal.

The switch 6 sequentially selects the output from the field memories 2r, 2g and 2b, each for a period of one field, to produce field sequential signals. The switch 6a sequentially selects the output from the field memories 2ra, 2ga and 2ba, each for a period of one field, to produce field sequential signals.

The D/A converter 3 D/A converts the output of the switch 6, to produce field sequential signals. The D/A converter 3a D/A converts the output of the switch 6a, to produce field sequential signals. The switch 9 alternately selects the output of the D/A converters 3 and 3a to produce field sequential signals having an extended bandwidth.

Thus, the bandwidth of the output signal of the video signal processor can be extended to the frequency of the control clock frequency $f_{A/D}$. But twice as many A/D converters and field memories are required.

In summary, with the video signal processor of the Prior Art Example 2, the input video signal must be limited to one half the control clock frequency. For expanding the bandwidth, it is necessary to increase the control clock frequency, but it is difficult or impossible to provide an A/D converter, a field memory, and a D/A converter capable of operating at such a high frequency. Moreover, the use of the control clocks with higher frequency can cause interference with other circuits.

With the video signal processor of the Prior Art Example 3, two A/D converters, two field memories and two D/A converters are required for the video signal of each color, and the size and cost of the overall circuit is increased.

SUMMARY OF THE INVENTION

An object of the invention is to prevent flicker in the image.

Another object of the invention is to prevent display of images having different colors from the original video signals.

Another object of the invention is to minimize the capacity of the memory for storing the image signals.

A further object of the invention is to extend the signal bandwidth of a video signal processor while minimizing the number of A/D converters, field memories and D/A converters.

According to one aspect of the invention, there is provided a color image display system comprising:

a monochromatic image display means (102) having a screen (103) for display of images;

a rotary filter (106) comprising color filter sections (106R, 106G and 106B) of a plurality of colors;

said filter sections being provided to be interposed in an optical path from said screen to a predefined viewing position in turn as the rotary filter rotates;

memories (130R, 130G, 130B) for respective color image signals; and a control circuit (114) for writing the color image signals of the respective colors into said memories at a first rate, for reading the color image signals of the respective colors from said memories at a second rate higher than said first rate and supplying the color image signals of the respective colors in sequence to said display means (102), and for controlling the rotation of the rotary filter (106) such that the filter section (106R, 106G, 106B) of the color corresponding to the color image signal which is being supplied to the display means (102) is interposed in said optical path;

wherein the color image signal of each color is in the form a sequence of samples, the writing of the color image signal of one field in each of said memories is achieved by designating writing addresses in succession and supplying said samples of the color image signal to said memory to thereby write said samples of the color image signal at the designated writing addresses, and the reading of the color image signal from each of said memories is achieved by designating writing addresses in succession and reading the samples of the color image signal from the designated reading addresses to thereby obtain a sequence of said samples of the color image signal, and said control circuit (114) controls the supply of the image signals from the memories to the display means in a sequence in which the image signals of the color or colors which are less prominent than others are supplied to the display means taking a period in which passing of the reading address over the writing address occurs, said passing of the reading address over the writing address occurring due to the higher rate of reading than the rate of writing.

According to another aspect of the invention, there is provided a color image display system comprising:

a monochromatic image display means (102) having a screen (103) for display of images;

a rotary filter (106) comprising color filter sections (106R, 106G and 106B) of a plurality of colors;

said filter sections being provided to be interposed in an optical path from said screen to a predefined viewing position in turn as the rotary filter rotates;

memories (130R, 130G, 130B) for respective color image signals; and a control circuit (114) for writing the color image signals of the respective colors into said memories at a first rate, for reading the color image signals of the respective colors from said memories at a second rate higher than said first rate and supplying the color image signals of the respective colors in sequence to said display means (102), and for controlling the rotation of the rotary filter (106) such that the filter section (106R, 106G, 106B) of the color corresponding to the color image signal which is being supplied to the display means (102) is interposed in said optical path;

wherein the color image signal of each color is in the form a sequence of samples, the writing of the color image signal of one field in each of said memories is achieved by designating writing addresses in succession and supplying said samples of the color image signal to said memory to thereby write said samples of the color image signal at the designated writing addresses, and the reading of the color image signal in each of said memories is achieved by designating writing addresses in succession and reading the samples of the color image signal from the designated reading addresses to thereby obtain a sequence of said samples of the color image signal;

said color image display system further comprises an additional memory (134) provided for the colors, the image signals of which are supplied to the display means taking a period in which passing of the reading address over the writing address would occur if said additional memory were not provided;

said passing of the reading address over the writing address occurring due to the higher rate of reading than the rate of writing;

said additional memory (134) and said first-mentioned memory (130B) being selected alternately for writing, and alternately for reading such that, at least during the above-mentioned period in which said passing occurs, the reading is made from the memory which is different from the memory into which the writing is being made.

According to another aspect of the invention, there is provided a color image display system comprising:

a monochromatic image display means (102) having a screen (103) for display of images;

a rotary filter (106) comprising color filter sections (106R, 106G and 106B) of a plurality of colors;

said filter sections being provided to be interposed in an optical path from said screen to a predefined viewing position in turn as the rotary filter rotates;

memories (130R, 130G, 130B) for respective color image signals;

a control circuit (114) for writing the color image signals of the respective colors into said memories at a first rate, for reading the color image signals of the respective colors from said memories at a second rate higher than said first rate and supplying the color image signals of the respective colors in sequence to said display means (102), and for controlling the rotation of the rotary filter (106) such that the filter section (106R, 106G, 106B) of the color corresponding to the color image signal which is being supplied to the display means (102) is interposed in said optical path;

an interrupter (136) for interrupting supply of the image signal to the display device when such interruption is desired.

According to another aspect of the invention, there is provided a color image display system comprising:

a monochromatic image display means (102) having a screen (103) for display of images;

a rotary filter (106) comprising color filter sections (106R, 106G and 106B) of a plurality of colors;

said filter sections being provided to be interposed in an optical path from said screen to a predefined viewing position in turn as the rotary filter rotates;

memories (130R, 130G, 130B) for respective color image signals;

a control circuit (114) for writing the color image signals of the respective colors into said memories at a first rate, for reading the color image signals of the respective colors from said memories at a second rate higher than said first rate and supplying the color image signals of the respective colors in sequence to said display means (102), and for controlling the rotation of the rotary filter (106) such that the filter section (106R, 106G, 106B) of the color corresponding to the color image signal which is being supplied to the display means (102) is interposed in said optical path;

A/D converters (128R, 128G, 128B) provided for the respective colors and sampling and digitizing the color image signals; and a switching means (116) for receiving the outputs of the memories and selecting the outputs of the memories in a sequence in which switching of the image signal from one color to another color is made every read field; wherein said control circuit (114) controls the A/D converters (128R, 128G, 128B) to effect the sampling at timings shifted from each other;

said control circuit (114) controls the reading of the stored image signals to be effected at timings shifted from each other; and said color image display system further comprises:

a first adder (138) adding the image signals from the memories (130R, 130G, 130B);

a high-pass filter (140) for receiving the output of the first adder and extracting the high-frequency component from the output of the first adder (138); and a second adder (142) for adding the output of the high-pass filter (140) to the output of the switching circuit (116).

According to another aspect of the invention, there is provided a color image display system comprising:

a monochromatic image display means (102) having a screen (103) for display of images;

a rotary filter (106) comprising color filter sections (106R, 106G, 106B) of a plurality of colors;

said filter sections being provided to be interposed in an optical path from said screen to a predefined viewing position in turn as the rotary filter rotates;

a switching circuit (144) receiving color image signals of respective colors and selecting them in a sequence in which switching of the image signal from one color to another is effected every horizontal scanning line to produce a time-division multiplexed color image signal;

a memory (130) for storing the time-division multiplexed color image signal;

a control circuit (114) for reading the color image signals of the respective colors in turn in which the switching of the image signal from one color to another is made every read field, and supplying the color image signals of the respective colors in sequence to said display means (102), and controlling the rotation of the rotary filter (106) such that the filter section (106R, 106G, 106B) of the color corresponding to the color image signal which is being supplied to the display means (102) is interposed in said optical path.

According to another aspect of the invention, there is provided a color image display system comprising:

a monochromatic image display means (102) having a screen (103) for display of images;

a rotary filter (106) comprising color filter sections (106R, 106G and 106B) of a plurality of colors;

said filter sections being provided to be interposed in an optical path from said screen to a predefined viewing position in turn as the rotary filter rotates;

memories (130R, 130G, 130B) for respective color image signals;

a control circuit (114) for writing the color image signals of the respective colors into said memories at a first rate, for reading the color image signals of the respective colors from said memories at a second rate higher than said first rate and supplying the color image signals of the respective colors in sequence to said display means (102), and for controlling the rotation of the rotary filter (106) such that the filter section (106R, 106G, 106B) of the color corresponding to the color image signal which is being supplied to the display means (102) is interposed in said optical path;

a color signal separator (122) receiving a composite video signal comprising luminance and chrominance signals, and vertical and horizontal sync signals, and producing, from the composite video signal, said the color image signals; and a sync signal separator (124) receiving the composite video signal and extracting a vertical sync signal from the composite video signal;

wherein said control circuit (114) controls the writing to be performed in synchronism with said vertical sync signal; and said control circuit comprises a drive controller (67) for controlling the rotation of said rotary filter to be in synchronism with the vertical sync signal.

According to another aspect of the invention, there is provided a color image display system comprising:

a monochromatic image display means (102) having a screen (103) for display of images;

a rotary filter (106) comprising color filter sections (106R, 106G and 106B) of a plurality of colors;

said filter sections being provided to be interposed in an optical path from said screen to a predefined viewing position in turn as the rotary filter rotates;

memories (130R, 130G, 130B) for respective color image signals;

a control circuit (114) for writing the color image signals of the respective colors into said memories at a first rate, for reading the color image signals of the respective colors from said memories at a second rate higher than said first rate and supplying the color image signals of the respective colors in sequence to said display means (102), and for controlling the rotation of the rotary filter (106) such that the filter section (106R, 106G, 106B) of the color corresponding to the color image signal which is being supplied to the display means (102) is interposed in said optical path;

means (146R, 146G, 146B) for introducing a phase difference between the image signals of the respective colors;

a switching means (144) for selecting the image signals in turn; and an A/D converter (128) for sampling and digitizing the image signals from said switching circuit (144); and said switching means (144) selecting the image signals in a sequence in which switching of the image signals from one color to another is made every sampling period;

wherein said control circuit (114) controls the writing of the image signals of the respective colors such that they are written in the respective memories.

According to another aspect of the invention, there is provided a video signal processor comprising a plurality of signal processing circuits for sampling and A/D-converting respective ones of a plurality of input color signals representing respective color components of a video signal, to produce digital data corresponding to the input color signals, writing the data in respective memories (2b, 2ba, 2bt, 2g, 2ga, 2gt, 2r, 2ra, 2-1 to 2-n), reading the data from the respective memories, and D/A-converting the data to produce decoded signals of the respective colors, said video signal processor comprising:

means (7, 8, 8b, 8g, 8rg, 7b, 7g, 7rg, 16, 17, 22, 23, 25, 26, 27, 28, 31, 32, 38, 42, 43, 44, 45-1 to 45-n, 46-1 to 46-n, 50) for controlling the operation of the respective signal processing circuits using control clocks having different phases to vary the phases of the sampling points of the input color signals; and means (15) for adding, to the decoded signal of one of the signal processing circuits, a high-frequency component of the decoded signal of another of the signal processing circuits.

According to another aspect of the invention, there is provided a video signal processor comprising a plurality of signal processing circuits for sampling and A/D-converting respective ones of a plurality of input color signals representing respective color components of a video signal, to produce digital data corresponding to the input color signals, writing the data in respective memories, reading the data from the respective memories (2b, 2ba, 2bt, 2g, 2ga, 2gt, 2r, 2ra, 2-1 to 2-n), and D/A-converting the data to produce decoded signals of the respective colors, said video signal processor comprising:

a common A/D converter (1, 1gb) for a plurality of input color signals;

means (37, 41r, 41g, 41b) for alternately or sequentially selecting said plurality of input color signals and supplying the selected signals to said common A/D converter;

said common A/D converter converting the selected input color signals into said digital data;

means (7, 7b, 7g, 7rg, 16, 22, 25, 27, 31, 38, 42, 43, 45-1 to 45-n, 50) for writing the digital data for the respective input color signals into memories for the respective input color signals;

means (8, 8b, 8g, 8rg, 17, 23, 26, 28, 32, 44, 46-1 to 46-n, 50) for reading encoded data from the memories and supplying the digital data to D/A converters for the respective color signals to produce said decoded signals; and means (15, 15b, 15g, 15r) for adding, to the decoded signal of one of the signal processing circuits, a high-frequency component of the decoded signal of another of the signal processing circuits.

According to another aspect of the invention, there is provided a video signal processor comprising a plurality of signal processing circuits and comprising:

A/D-converting means (1b, 1ba, 1g, 1ga, 1r, 1ra, 1gb, 1, 1-1 to 1-n) for sampling and A/D-converting respective ones of a plurality of input color signals representing respective color components of a video signal, to produce digital data corresponding to the input color signals;

memories (2b, 2ba, 2bt, 2g, 2ga, 2gt, 2r, 2ra, 2-1 to 2-n) for the respective color signals;

means (7, 7b, 7g, 7rg, 16, 22, 25, 27, 31, 38, 42, 43, 45-1 to 45-n, 50) for writing said digital data in the respective memories;

means (8, 8b, 8g, 8rg, 17, 23, 26, 28, 32, 44, 46-1 to 46-n, 50) for reading the data from the respective memories; and D/A-converting means (3b, 3ba, 3g, 3ga, 3r, 3rg, 3rga, 3-1 to 3-n) for D/A-converting the data read from the memories to produce decoded signals of the respective colors;

means (15, 15b, 15g, 15r) for adding, to the decoded signal of one color, a high-frequency component of the decoded signal of another color.

According to another aspect of the invention, there is provided a video signal processor for A/D-converting an input signal using a control clock which is phase-shifted every field by a predetermined phase, to produce digital data, and writing the digital data into a memory (2b, 2ba, 2bt, 2g, 2ga, 2gt, 2r, 2ra, 2-1 to 2-n), and reading the digital data from the memory at a rate n times (n>1) the rate of writing;

said reading of one field being performed repeatedly while writing of one field is performed once; wherein said memory for each of the color signals has first and second areas, each having a capacity of one field of said digital data;

wherein said color signal processor comprises:

means (7, 7b, 7g, 7rg, 16, 22, 25, 27, 31, 38, 42, 43, 45-1 to 45-n, 50) for writing the digital data of respective fields alternately into the first area and the second area; and means (7, 8, 8b, 8g, 8rg, 7b, 7g, 7rg, 16, 17, 22, 23, 25, 26, 27, 28, 31, 32, 38, 42, 43, 44, 45-1 to 45-n, 46-1 to 46-n, 50) for controlling the reading from the memory such that the digital data read in one field of reading operation consist of digital data written in one field of writing operation.

According to another aspect of the invention, there is provided a video signal processor for A/D-converting an input signal using a control clock which is phase-shifted every field by a predetermined phase, to produce digital data, and writing the digital data into a memory, and reading the digital data from the memory at a rate n times (n>1) the rate of writing;

said reading of one field being performed repeatedly while writing of one field is performed once;

wherein said video signal processor comprises:

means (7, 8, 8b, 8g, 8rg, 7b, 7g, 7rg, 16, 17, 22, 23, 25, 26, 27, 28, 31, 32, 38, 42, 43, 44, 45-1 to 45-n, 46-1 to 46-n, 50) for shifting the phases of the control clocks for the reading and the D/A conversion so as to be identical to the phase of the control clock for the A/D conversion, during a period in which the digital data of one field is being read and in which the writing of the digital data of the same field is also written.

According to another aspect of the invention, there is provided a phase inversion control pulse generating circuit comprising an exclusive OR gate (49) receiving a passing-over pulse which is inverted each time an address of a memory from which data is read passes over an address of the memory into which data is written, and a signal which is Active during any of even-numbered ones of intervals into which one write field is divided.

BRIEF DESCRIPTION OF THE DRAWINGS

FIG. 4 is a schematic diagram showing a color image display device of another prior art example.

FIG. 5A to FIG. 5G are schematic time chart showing the color image signals written into memories and color image signals read from the memories and supplied to the CRT.

FIG. 6A to FIG. 6B, FIG. 7A to FIG. 7B, and FIG. 8A to FIG. 8B are diagrams showing the progress of writing of data into the memories, in relation to reading of the data from the memories for explaining the passing of the reading address over the writing address.

FIG. 6C to FIG. 6D, FIG. 7C to FIG. 7D, and FIG. 8C to FIG. 8D are diagrams showing, switching of the read signals and rotation of the rotary filter, according to an embodiment of the present invention.

FIG. 10 is a block diagram showing a part of a video signal processor in the prior art.

FIG. 14 is a block diagram showing a part of a video signal processor of another prior art example.

FIG. 19 is a block diagram showing a part of a color image display device of another embodiment of the invention.

FIG. 19A is a block diagram showing a part of a color image display device of another embodiment of the invention.

FIG. 20 is a block diagram showing a part of a color image display device of another embodiment of the invention.

FIG. 21 is a block diagram showing a part of a color image display device of another embodiment of the invention.

FIG. 23 is a block diagram showing a part of a color image display device of another embodiment of the invention.

FIG. 24A to FIG. 24E are diagrams showing the positions of the scanning lines of the original image signals, cyclic selection of the scanning lines, the scanning lines of the respective image signals stored in the memory, and the scanning lines of the image signals supplied to the CRT.

FIG. 25A to FIG. 25C are diagrams showing cyclic alteration of the scanning lines designated to the respective colors.

FIG. 27A to FIG. 27E are time charts showing the image signals of the respective colors, a time-division multiplexed signal, and the sequence of data obtained from the time-division multiplexed signal.

FIG. 28A to FIG. 28E are time charts showing the relationship between the sampling points of the composite video signal, the time division-multiplexed signal and the writing of the time-division multiplexed signal into the respective memories.

FIG. 29A to FIG. 29D are time charts showing the periods for which the output from the respective memories are enabled.

FIG. 31A to FIG. 31C are time charts showing the horizontal sync signal, the triple-frequency horizontal sync signal and the phase-shifted triple-frequency horizontal sync signal.

FIG. 36A and FIG. 36B are time charts showing the waveforms and values of the signals at various points in the video signal processor of FIG. 35.

FIG. 37A to FIG. 37D are time charts showing the values of the signals at various points in the circuit of FIG. 35.

FIG. 38E is a diagram explaining the meaning of each type of hatching in FIG. 38A to FIG. 38D.

FIG. 46 is a block diagram showing a video signal processor of another embodiment of the invention.

FIG. 47 is a block diagram showing a part of the video signal processor of another embodiment.

FIG. 49G is a diagram explaining the meaning of each type of hatching in FIG. 49A to FIG. 49F.

FIG. 50 is a block diagram showing a video signal processor of another embodiment of the invention.

FIG. 57A to FIG. 56F are diagrams showing the frequency distributions at various points in the video signal processor of FIG. 56.

FIG. 57G is a diagram explaining the meaning of each type of hatching in FIG. 57A to FIG. 57F.

FIG. 62 is a block diagram showing a video signal processor of another embodiment of the invention.

FIG. 64 is a block diagram showing a video signal processor of another embodiment of the invention.

FIG. 65A to FIG. 65D are time charts showing the waveforms and values of the signals at various points in the video signal processor of FIG. 65.

FIG. 78A to FIG. 78F and FIG. 79A to FIG. 79F are time charts showing the operation of the phase inversion control pulse generator of FIG. 76.

DETAILED DESCRIPTION OF THE EMBODIMENTS

Embodiment A1

Figure 1:
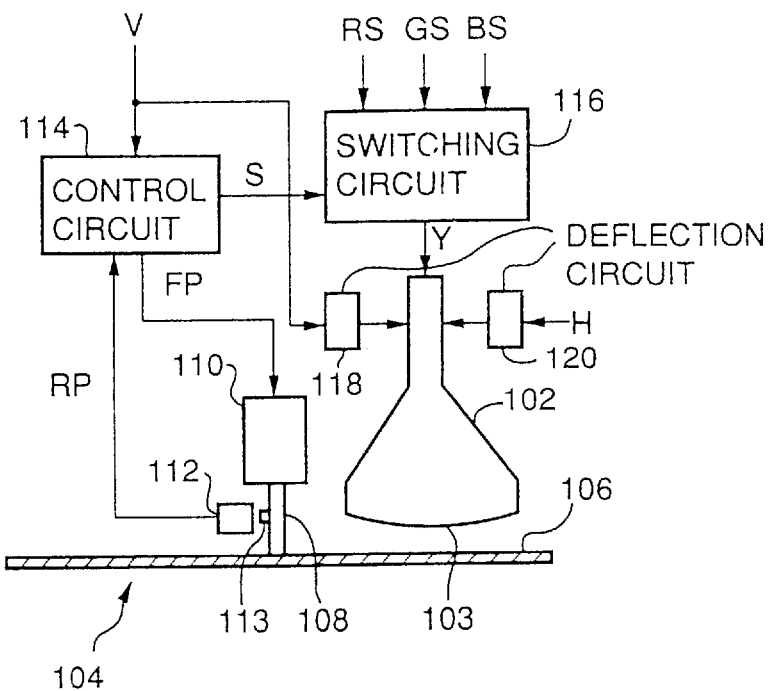
FIG. 1 is a schematic diagram sowing a conventional color image display device using a black-and-white CRT in combination with a coloring device.

The configuration of the color image display device of this embodiment is also as shown in FIG. 4. This embodiment is directed to the problem of the discontinuity or discrepancy of the picture due to the passing of the read address over the write address, as discussed in the description of Prior Art Example 2. The embodiment is featured by the control, made by the control circuit 114, over the sequence of cyclic selection of the color image signals and the filters such that the second read field is assigned to blue color image signals. That is, at the second read field, the blue image signal BS is selected as shown in FIG. 7C and the B filter section 106B is made to overlie the screen 103 as shown in FIG. 7D. At the first read field, green image signal GS is selected as shown in FIG. 6C and the C filter section 106G is made to overlie the screen 103 as shown in FIG. 6D. At the third read field, the red image signal RS is selected as shown in FIG. 8C and the R filter section 106R is made to overlie the screen 103 as shown in FIG. 8D.

The reason for such arrangement is that the blue color is least prominent, and the discontinuity or discrepancy, which may occur, is least objectionable to the human eyes. Stated inversely, the image signals of red and green, which are the two most prominent colors of the three colors, are supplied within the first and the last read fields within each write field.

Although not illustrated, it is advantageous if the memories 130R, 130G and 130B are so configured as to use, as a time reference, a horizontal sync signal next to each vertical sync signal V for the writing of the data of each field.

Moreover, where the input video signal of an interlaced scanning type, it is advantageous if the output of the frequency converter 126 is shifted by one half of the horizontal period every three fields, the color image signals of three consecutive read fields and the color image signals of the next three consecutive read fields can be offset in the vertical direction on the screen and an effect similar to the interlacing is obtained.

Embodiment A2

In Embodiment A1 described above, the discontinuity or discrepancy is made less prominent, but is not completely eliminated. FIG. 19 shows another embodiment of the invention. It illustrates part only of the entire circuit. In FIG. 19, the circuits identical to those in the previous drawings are denoted by identical reference numerals. The overall circuit configuration and the arrangement of the CRT and the coloring device are similar to those described with reference to FIG. 4. However, the embodiment of FIG. 19 is provided with an additional memory 134B. The successive fields of B signals from the color signal separator 122 are alternately supplied to and written into the memories 130B and 134B. That is, one (first) field of B signals are written in the memory 130B, and a next (second) field of B signals are written in the memory 134B, and a third field of B signals are written in the memory 130B, and so on. While a field of B signals are written in one of the memories 130B and 134B, the B signals (stored previously) are read from the other memory. That is, during the writing of the first field of the signals into the memory 130B, reading is made from the memory 134B. During writing of the second field of the signals into the memory 134B, reading is made from the memory 130B. During writing of the third field of the signals into the memory 130B, reading is made from the memory 134B. Such a process continues.

With the above arrangement, passing of the reading address over the writing address does not occur because reading and writing are on different memories, and reading is effected from a memory which is not being rewritten. Thus, there is no discontinuity or discrepancy in the image. The B signals read are always of the preceding field. When the reading is in the order of the G, B and R signals, the G and B signals are of the preceding field, while the R signals are of the present field. This R signals match with the G and B signals of the next read field. The selection between the memories 130B and 134B for writing and for reading is made by the control circuit 114, which also controls the rotation of the rotary filter 106.

In the above embodiment, the additional memory 134B was provided for the B signals only. It is also possible to provide additional memories 134G and 134R, as shown in FIG. 19A, for G and R signals as well. In such a case, selection for writing and reading between the memories 130G and 134G, and 130R and 134R is made in the same way as described above for the memories 130B and 134B. With the configuration shown in FIG. 19A in which the additional memories (134R, 134G and 134B) are provided for all the colors, control over switching is easier, particularly where interlaced scanning is performed. Moreover, memories having a port used both for writing and reading, which are less expensive than the dual port memories, can be used.

A modification applicable to the configuration of FIG. 19A is that the memories 130R, 130G, 130B, 134R, 134G and 134G may be so controlled that reading from the memories into which writing is also made can be commenced when the writing over two third of the entire memory area of each of such memories is completed. This is because the passing-over does not occur during the last one-third period.

With the arrangement of Embodiment A2, the problem of the passing over of the address is solved and discontinuity or discrepancy in the displayed picture is eliminated.

Embodiment A3

FIG. 20 shows another embodiment of the invention. Like FIG. 19, it illustrates part only of the entire circuit. In FIG. 20, the circuits identical to those in the previous drawings are denoted by identical reference numerals. The overall circuit configuration and the arrangement of the CRT and the coloring device are similar to those described with reference to FIG. 4. However, the embodiment of is additionally provided with an interrupter 136 inserted between the switching circuit 116 and the CRT 102.

The function of the interrupter 136 is to interrupt the supply of the color image signal VS3 from the switching circuit 116 to the CRT 102. Specifically, the amplitude of the image signal VS3 is made to be zero, while the amplitude of the sync signals are kept unchanged. The interruption operation of the interrupter is controlled in accordance with an interruption control signal MUTE from the control circuit 114. The interruption control signal MUTE is generated when it is found that the difference in phase between the rotation of the rotary filter 106 and the output of the switching circuit 116 is beyond a predefined allowable range. The phase difference can be detected on the basis of the rotation sync pulse RP from the rotation sensor 112 and the vertical sync signal from the sync signal separator 124.

With the use of the interrupter 136, it is ensured that pictures having colors different from the original pictures are not displayed or seen to the viewer.

In the embodiment described, the interruption is effected when the detected phase difference exceeds a certain-predefined range. However, it is also possible to effect the interruption during a period when it is expected that the phase difference will be (or will often be) beyond permissible range. For instance, the interruption may be commanded for a certain period after starting the drive motor 110, or until the speed of the motor reaches a certain predefined value.

The interruption may be effected where interruption is desired for any other reason.

Embodiment A4

FIG. 21 shows another embodiment of the invention. Like FIG. 19, it illustrates part only of the entire circuit. In FIG. 21, the circuits identical to those in the previous drawings are denoted by identical reference numerals. The overall circuit configuration and the arrangement of the CRT and the coloring device are similar to those described with reference to FIG. 4. The embodiment of is additionally provided with an adder 138, an HPF (high-pass filter) 140, and another adder 142. The adder 138 adds the outputs of the D/A converters 132R, 132G and 132B. The HPF 140 band-limits the output of the adder 138 to a high-frequency component. The adder 142 adds the output of the HPF 140 to the output of the switching circuit 116.

Figure 22A:
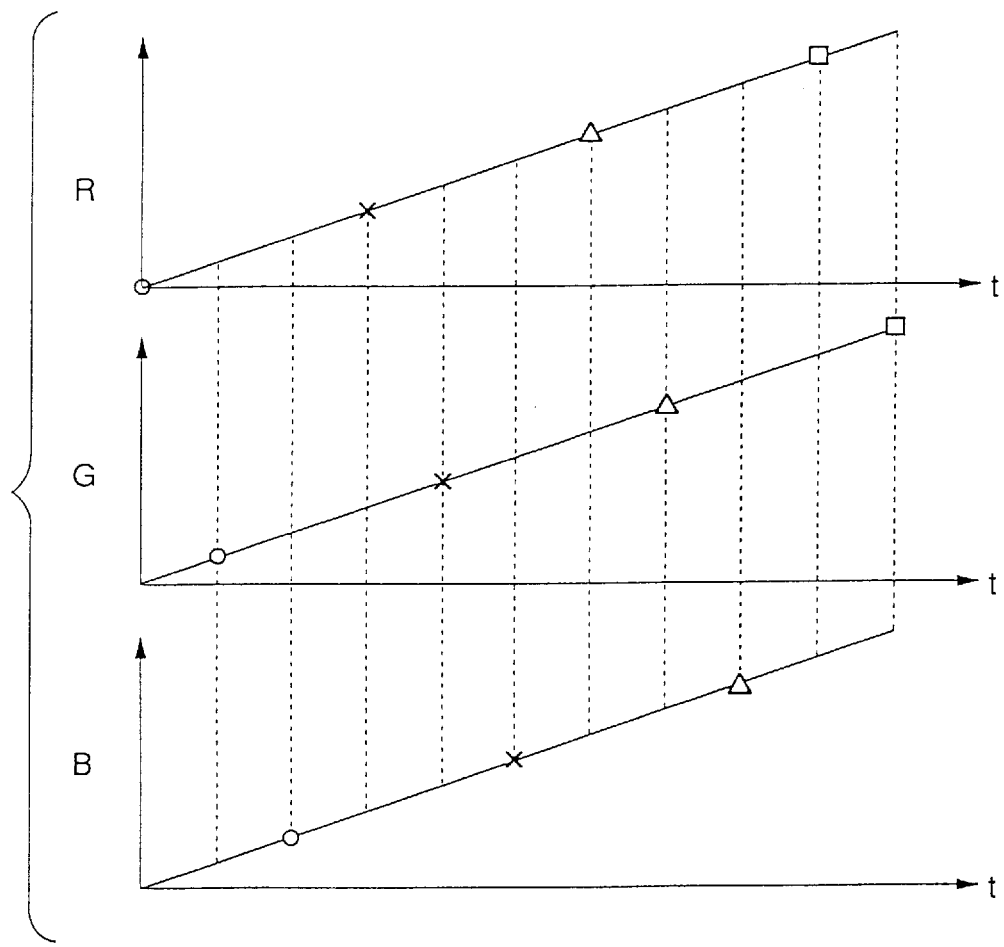
FIG. 22A and FIG. 22B are time charts showing the sampling time points and the waveforms of the resultant signals.

The A/D converters 128R, 128G and 128G are controlled by the control circuit 114 such that they sample and digitize the respective input at timings shifted from each other. The amount of shift is 120° or one third of the sampling interval for each of the color image signals. FIG. 22A illustrates such shifting in the sampling timings. Identical curves (slope lines of a fixed gradient) are shown for all of the R. G and B signals. The sampling points are indicated by circles, crosses, triangles and squares. The sampling points of G signal are delayed from the sampling points of the R signal by one third of the sampling interval Ts. The sampling points of B signal are delayed from the sampling points of the G signal by one third of the sampling interval Ts.

The R, G and B signals sampled and digitized at different timings are written in the respective memories 130R, 130G and 130B at the same interval as the sampling.

Figure 22B:
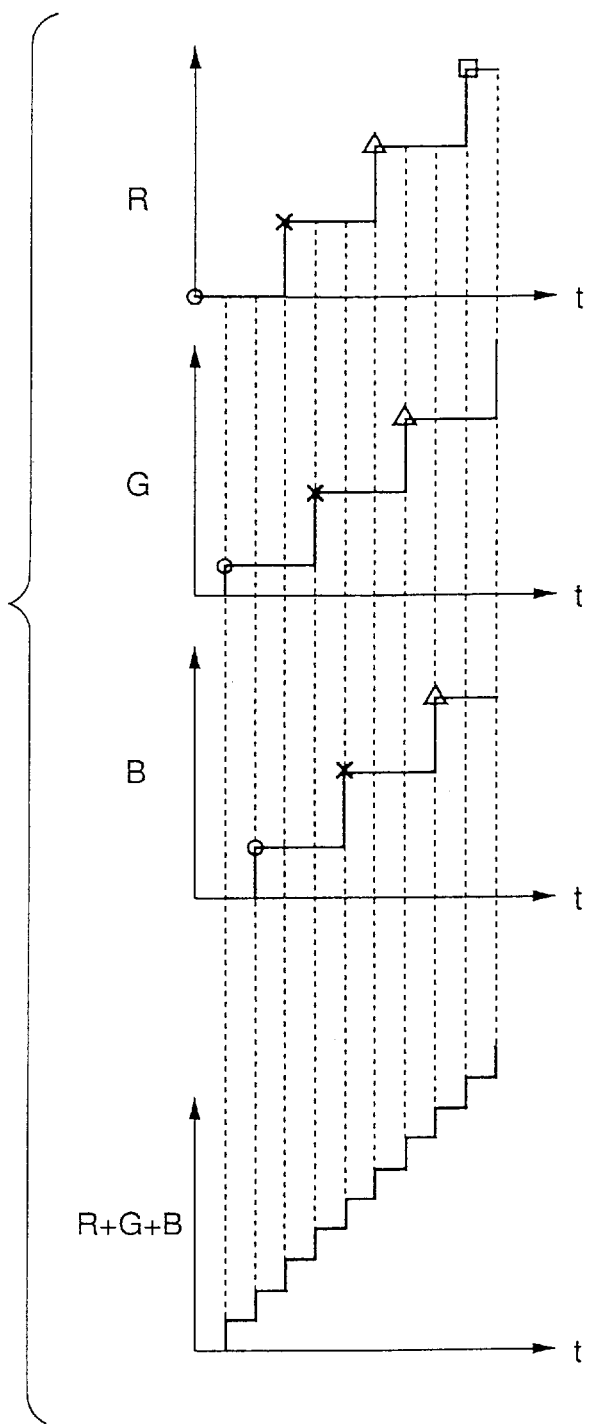

The R, G and B signals are read from the memories 130R, 130G and 130B and D/A-converted by the D/A converters 132R, 132G and 132B, at a rate three times the rate of sampling and writing, and also at timings shifted from each other, by one third of the interval of reading and D/A-converting operations. FIG. 22B illustrates such shifting in the D/A conversion timings. The D/A conversion timings are indicated by circles, crosses, triangles and squares. It is noted that the values or magnitudes of the D/A-converted signals are not changed until the next D/A conversion. The D/A conversion timings of G signal are delayed from the D/A conversion timings of the R signal by one third of the D/A conversion interval Tr. The D/A conversion timings of B signal are delayed from the D/A conversion timings of the G signal by one third of the D/A conversion interval Tr. The D/A conversion interval Tr is one third of the sampling interval Ts, so the shift between successive D/A conversion operations is one ninth of the sampling interval.

The adder 138 adds the outputs of the D/A converters 132R, 132G and 132B. The output of the adder 138 is shown at the bottom of FIG. 22B.

Comparison of the three diagrams for the R, G and B signals and the diagram at the bottom in FIG. 22B, it will be observed that the signal obtained by adding the R, G and B signals which are read and D/A-converted at timings shifted from each other has a horizontal definition (resolution) three times higher than the definition of each of the R, G and B signals. This will be understood by comparing the intervals of the step-wise change of the signals and the height of each of the steps.

The output of the adder 138 is passed through the HPF 140 to remove the color components which are below about 1.5 MHz. The output of the HPF 140 therefore consists only or mainly of the luminance signal components. By adding the output of the HPF 140 to the output of the switching circuit 116, signals having a higher horizontal definition are obtained. The output of the adder 142 is supplied via an amplifier, not shown, to the CRT 102.

The rest of the operation is similar to that described with reference to FIG. 4 in connectionn with Prior Art Example 2.

Embodiment A5

FIG. 23 shows another embodiment of the invention. It illustrates part only of the entire circuit. In FIG. 23, the circuits identical to those in the previous drawings are denoted by identical reference numerals. The overall circuit configuration and the arrangement of the CRT and the coloring device are similar to those described with reference to FIG. 4. However, the embodiment of FIG. 23 has a single memory 130 instead of the three memories 130R, 130G and 130B. The memory 130 has a capacity for one field, identical to one of the memories 130R, 130G and 130B. A switching circuit 144 similar to the switching circuit 116 of FIG. 4 is provided to receive the output of the color signal separator 122, while the switching circuit 116 of FIG. 4 is omitted. A single A/D converter 128, instead of the three A/D converters 128R, 128G and 128B, is provided to A/D converts the output of the switching circuit 144. A single D/A converter 132, instead of the three D/A converter 132R, 132G and 132B, is provided to D/A convert the output of the memory 130. The output of the D/A converter is supplied via an amplifier, not shown, to the CRT 102.

The frequency converter 127 for producing the triple-frequency horizontal sync signal is omitted.

The switching circuit 144 selects the R, G and B signals in turn and in a sequence in which switching from one of the R, G and B signals to another is every horizontal scanning line. To effect the switching every scanning line, the switching S from the control circuit 114 is produced every scanning line. The output of the switching circuit 144 is a time-division multiplexed signal of R, G and B signals, i.e., it consists of a sequence of R, G and B signals, with each of R, G and B signals continuting for one horizontal line. The image signal of one out of every three scanning lines of each color is contained in the output of the switching circuit, while the image signal of two other scanning lines of every three scanning lines is dropped. That image signal of each color contained in the output of the switching circuit 144 is of scanning lines different from the scanning lines of which the image signals of different colors are also contained.

This is illustrated in FIG. 24A to FIG. 24E. The outputs of the color signal separator 122 are shown in FIG. 24A. As illustrated, the outputs of the color signal separator 122 respectively contain the image signals of all the scanning lines. The switching circuit 144 selects the R image signal for the first line, and the G image signal for the second line, and the B image signal for the third line, and again the R image signal for the fourth line, and so on. The output of the switching circuit 144 is therefore a combination of the R, G and B signals, each for every third line, as shown in FIG. 24C. The output of the switching circuit 144 is A/D-converted at the A/D converter 128 and is written in the memory 130.

Image signals of the respective colors as stored in the memory 130 consists of image signals of every third lines. The amount of data of image signal of each color which is contained in the output of the A/D converter and is stored in the memory 130 for one field is one third of the amount of the image signal of each color for one field which would be stored if the time-division multiplexing were not made.

The image signals of the respective colors are read in sequence in which switching from one color to another is made every field, each "field" as meant here consisting of one third of all the scanning lines in one field in its ordinary sense. That is, the image signals of every third line of a first color (e.g., R), i.e., all the (3n+1)-th lines (n being a non-negative integer) including Ra and Rd at the top of FIG. 24D, are read in sequence to produce an image signal of the first color (e.g., red) for one field consisting of one third of the horizontal scanning lines then the image signals of every third line, of a second color (e.g. green) i.e., al the (3n+2)-th lines including Gb and Ge in the middle of FIG. 24D, are read in sequence to produce an image signal of the second color for one field consisting of one third of the horizontal scanning lines, and then the image signals of every third line of a third color (e.g., blue), i.e., all the 3n-th lines including Bc and Bf at the bottom of FIG. 24D, are read in sequence to produce an image signal of the third color. This is achieved by a suitable address control by means of the control circuit 114.

Reading from the memory 130 is conducted at the same rate as the rate of writing. It should again be noted that the rate of reading and the rate of writing is expressed in terms of samples per second. But as the amount of data for each color is one third, the time required for reading image signals for one field is one third of the time required for writing one field of data (consisting of the three color image signals) or the time which would be required for one field of data for one color if all the image signals as output from the color signal separator 122 were digitized and stored in the memory. Accordingly, the vertical scanning frequency is three times the vertical scanning frequency of the original video signal, or the signals as written in the memory 130, so the triple-frequency vertical sync signal is supplied to the CRT 102. On the other hand, the horizontal scanning frequency is identical to that of the original video signal. Accordingly, the horizontal sync signal extracted from the original video signal is supplied to the CRT 102.

The image signals read from the memory 130 are D/A-converted into analog signals, which are supplied via an amplifier not shown to the CRT 102, to produce, in sequence, black-and-white images each having a brightness corresponding to the strength of the image signals of each color.

The scanning lines of the image signals of different colors are not on the same position but are shifted in the vertical direction. This is achieved by shifting the timing of reading the first scanning lines of each color by an amount corresponding to the position of the scanning lines of which the image signals are stored in the memory and read. For instance, the first scanning line of the R signal scanning line starts at the same position as the first scanning line in ordinary scanning, but it decreases with a higher gradient than in the ordinary scanning as shown in FIG. 24E, because of the higher vertical frequency and the unchanged horizontal scanning frequency. The first scanning line of the G signal starts at the same position as the second scanning line in the ordinary scanning. The first scanning line of the B signal starts at the same position as the third scanning line in the ordinary scanning. The second scanning line of the R signal starts at the same position as the fourth scanning line in the ordinary scanning line, and so on. Thus the interval between the scanning lines is three times that of the ordinary scanning.

The rotation of the rotary filter 106 is so controlled that the filter section of each color overlie the screen 103 when the image of the corresponding color image signal are formed on the screen 103. This means that the rotary filter is rotated once per vertical period.

With the arrangement described above, the total capacity of the memory for storing the image signals can be reduced to one third. The vertical definition is lowered, but because the scanning lines of the image signals of different colors are shifted in the vertical direction, the effective vertical definition is higher than if the scanning lies of all the three colors are at the same position.

Embodiment A6

A shortcoming of Embodiment A5 is that the vertical definition is lowered to one third as the two out of every three horizontal scanning lines for each color are dropped. In Embodiment A6, the configuration identical to that of Embodiment A5 is used but the manner of control over the switching circuit 144, and the reading of the memory 130, both effected by the control circuit 114, is changed for improve the vertical definition. That is, the switching is so made that the image signal each color is selected at different horizontal scanning line. In other words, the scanning lines of which the image signal of each color is selected is shifted by one line every vertical period or every field. This is achieved by altering the order of selection of the image signals of the respective colors every write field so that the position of the first line of the image signal of each color within each write field is altered every write field. An example of such control is illustrated in FIG. 25A to FIG. 25C. In a given vertical period shown in FIG. 25A, the R image signal of the scanning lines R1$a$, R1$d$, etc., which are (n+1)-th lines in the field, is selected, the G image signal of the scanning lines G1$b$, G1$e$, etc., which are (n+2)-th lines in the field, is selected, and the B image signal of the scanning lines B1$c$, B1$f$, etc., which are n-th lines in the field, is selected.

In a next vertical period shown in FIG. 25B, the R image signal of the scanning lines R2$b$, R2$e$, etc., which are (n+2)-th lines in the field, is selected, the G image signal of the scanning lines G2$c$, G2$f$, etc., which are n-th lines in the field, is selected, and the B image signal of the scanning lines B2$a$, B2$d$, etc., which are (n+1)-th lines in the field, is selected.

In a yet next vertical period shown in FIG. 25C, the R image signal of the scanning lines R3$c$, R3$f$, etc., which are n-th lines in the field, is selected, the G image signal of the scanning lines G3$a$, G3$d$, etc., which are (n+1)-th lines in the field, is selected, and the B image signal of the scanning lines B3$b$, B3$e$, etc., which are n-th lines in the field, is selected.

The selection of a yet next vertical period is identical to that shown in FIG. 25A. Thus, the above recited cycles of operation are repeated.

When reading the image signal of each color for display in time with the rotation of the rotary filter, the timing at which the reading is commenced (or the timing at which the D/A conversion is commenced or the timing at which the supply of the signal to the CRT 102 is commenced) is shifted in accordance with the shift (or alteration of the position) of the first line of the image signal of the particular color.

It will be seen from FIG. 25A to FIG. 25C that the image signals of all the scanning lines are displayed over three fields, and the vertical definition is therefore higher than that of Embodiment A5.

If interlaced scanning is adopted in Embodiment A5 or Embodiment A6, the vertical definition is further improved.

Embodiment A7

Figure 26:
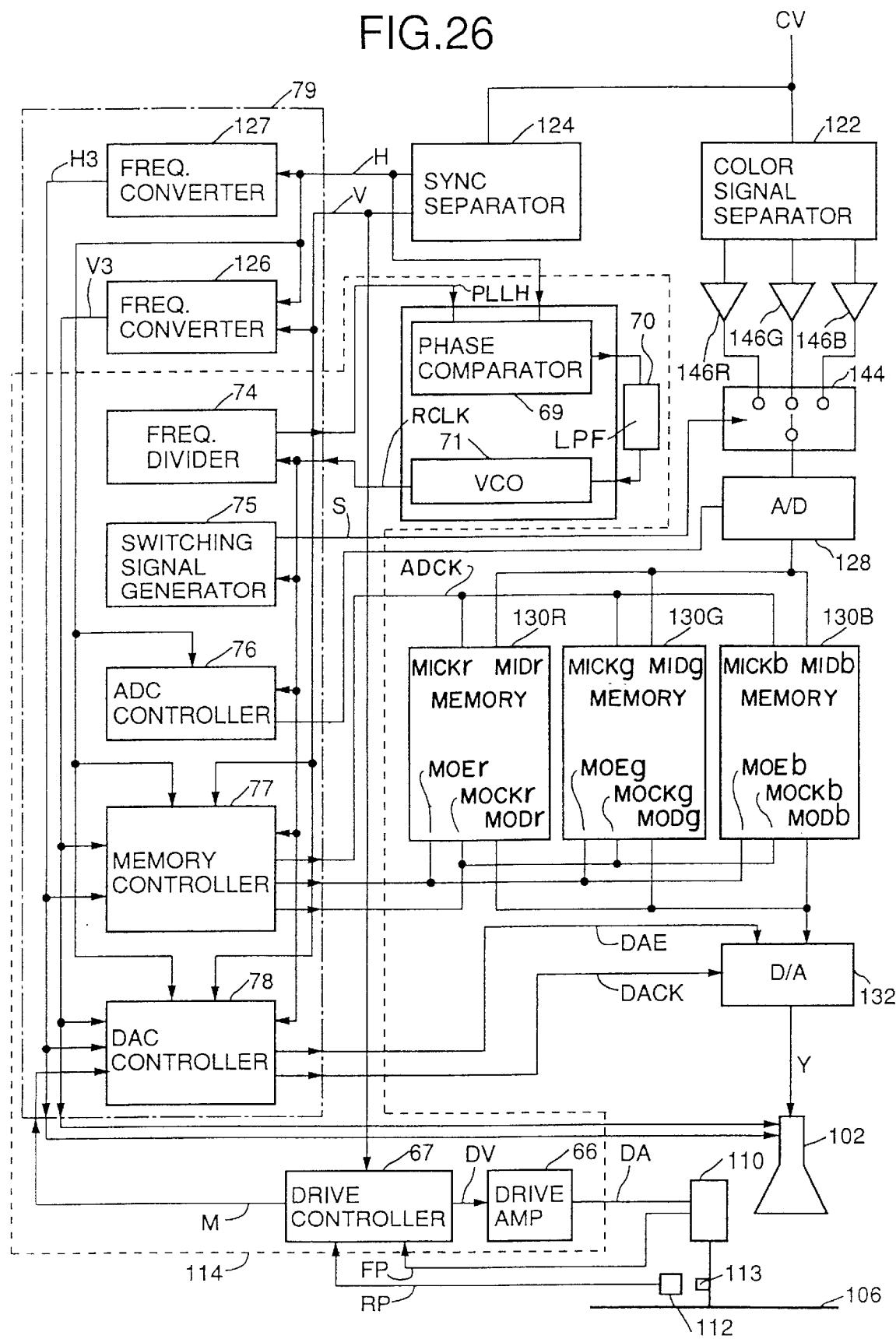
FIG. 26 is a block diagram showing a part of a color image display device of another embodiment of the invention.
Figures 30A, 30B, 30C, 30D:
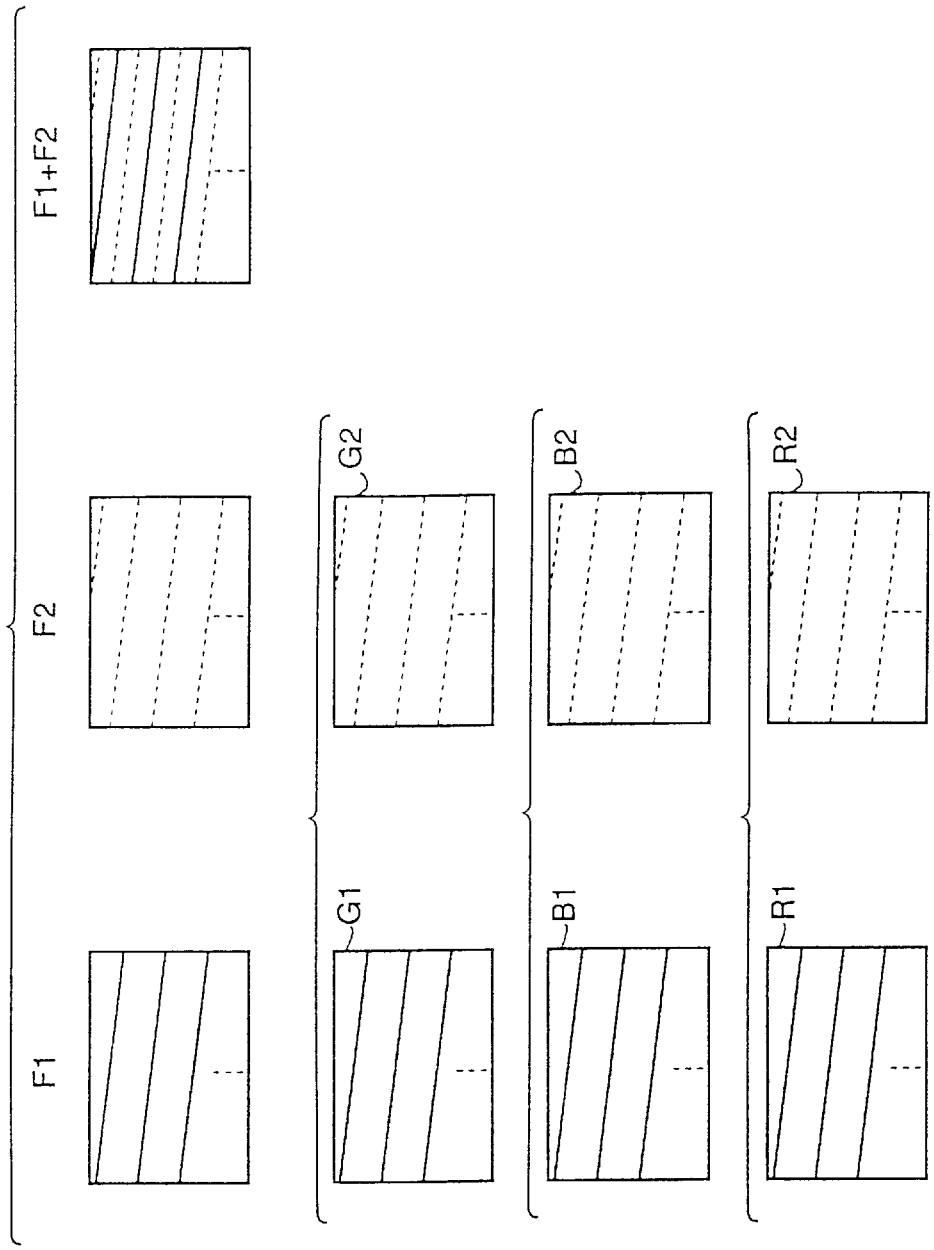
FIG. 30A to FIG. 30D are diagrams showing the scanning lines in odd and even fields, and a complete raster formed of the odd and even fields.

FIG. 26 shows a color image display device of another embodiment of the invention. Circuits identical or corresponding to those in the previous drawings are denoted by identical reference numerals. The overall configuration of the circuit is similar to that shown in FIG. 4. However, amplifiers 146R, 146G and 146B are provided to receive and amplify the red (R), green (G) and blue (B) signals from the color signal separator 122, and the switching circuit 144, similar to that of FIG. 23 is provided to receive the outputs of the amplifiers. The output of the switching circuit 144 is supplied to a single A/D converter 128, which is provided in place of the three A/D converters. The switching circuit 116 of FIG. 4 is omitted, but an equivalent function is rendered by the shifted timing control of output of the memories 130R, 130G and 130B. A single D/A converter 132 is provided in place of the three D/A converters. The control circuit 114 of this embodiment is shown in detail.

The amplifiers 146R, 146G and 146B are capable of adjustment of the amplification factor and the delay time. The amplification factors of the resepctive amplifiers 146R, 146G and 146B are adjusted to optimize the color balance, which are also affected by optical systems, including the transparency of the color filters, and other parts of the circuits. The delay time is adjusted to have color image signals of different colors sampled at corresponding points, as will be understood from the following description. The color image signals output from the amplifiers are input to a signal switching circuit or multiplexer 144, which selects the color image signals in a sequence in which the switching from the image signal of one color to another is made every sample.

The time-division multiplexed R, G and B color image signals are input to an analog-to-digital (A/D) converter 128, where they are sampled and A/D-converted (digitized) into a digital signal which consists of a sequence of digital data representing the sample values of R, G and B signals in repeated succession. That is, the digital signal consists of digital data of a sample taken from the R signal, followed digital data of a sample taken from the G signal, followed by digital data of a sample taken from the B signal, followed by digital data of a sample taken from the R signal, and so on.

The output of the A/D converter 128 are applied to data input terminals MIDr, MIDg, MIDb of memories 130R, 130G and 130B, which are dual port memories capable of simultaneous and asynchronous writing and reading. The sequence of data of the R signals are written in the memory 130R, the sequence of data of the G signals are written in the memory 130G and the sequence of data of the B signals are written in the memory 130B. This is achieve by appropriately applying control clocks MICKr, MICKg and MICKb of different phases.

The data stored in the memories 130R, 130B and 130B are read in a predetermined sequence, in which switching of the data from one memory to another is made every field. That is, a field of data of the R signals are read from the memory 130R, then a field of data of the G signals are read from the memory 130G and then a field of the data of the B signals are read from the memory 130B. The same process is similarly repeated.

The D/A converter 132 has its input coupled to all the output of the memories 130R, 130G and 130B, and D/A-converts the signal being applied to its input. The control circuit 114, in particular the memory controller 77 controls the memories 130R, 130G and 130B such that the memories output the image signals in turn, and only one of them outputs the image signal at a time.

The analog signal output from the D/A converter 132 is supplied to the monochromatic (black-and-white) CRT 102, as described above and cooperates with a rotary filter 106.

The horizontal sync signal H separated from the composite video signal CV is supplied to a phase comparator 69, frequency converters 126 and 127, an A/D converter controller 76, a memory controller 77, and a D/A converter controller 78.

The phase comparator 69 compares the phase of the horizontal sync signal H and the phase of a frequency-divided clock PLLH to be later described, and produces a voltage signal corresponding to the result to the phase comparison.

The output signal of the phase comparator 69 is High or Low depending on the result of comparison. The filter 70 smoothes the output of the phase comparator 69. The output of the filter 70 is applied to a voltage-controlled oscillator 71, which produces a reference clock RCLK the frequency of which varies depending on the voltage from the filter 70. A frequency divider 74 frequency-divides the reference clock to produce the frequency-divided clock PLLH, which is supplied to the phase comparator 69. The phase comparator 69, the filter 70, the voltage-controlled oscillator 71 and the frequency-divider 74 forms a PLL (phase-locked loop). The reference clock RCLK is supplied to the signal switching circuit 75, the A/D converter controller 76, the memory controller 77 and the D/A converter controller 78. Thus, clocks in synchronism with the horizontal sync signal H are supplied to various circuits in the control circuit 114.

Preferably, the number of clock pulses forming the reference clock RCLK that are produced during each horizontal period defined by the horizontal sync signal H, is a multiple of three, or the ratio of the write field period to the read field period, such that both the horizontal period of the read field and the horizontal period of the write field are defined by an integer multiple of a clock pulse period. For instance, the horizontal period of the read field is defined by 303 clock pulse period, while the horozontal period of the write field is defined by 909 clock pulse period. With such an arrangment, shifting of the picuture in the horizontal direction, an effect similar to that of jitter, can be avoided.

The triple-frequency sync signals V3 and H3 from the frequency converters 126 and 127 are supplied to the memory controller 77, D/A converter controller 78, and the CRT 102.

The switching signal S generated by the switching signal generator 75 is supplied to the signal switching circuit 144 for control over the switching at the switching circuit 144. The conversion clock ADCK generated by the A/D converter controller 76 is supplied to the A/D converter 128.

The write control signal generated by the memory controller 77 is supplied to the write signal input terminals MICKr, MICKg and MICKb of the memories 130R, 130G and 130B for control over the writing into the memories. The read control signal generated from the memory controller 77 is supplied to the read signal input terminals MOCKr, MOCKg and MOCKb for control over the output from the memories. The read enable signals generated from the memory controller 77 are supplied to the read enable signal input terminals MOEr, MOEg and MOEb also for control over the output from the memories.

The output enable signal DAE and the conversion clock DACK generated by the D/A converter controller 78 are supplied to the D/A converter 132.

A drive controller 67 produces a drive signal DV to control the rotation of the motor 110 in accordance with the rotation sync pulses RP from the sensor 112 and the rotation frequency pulses FP from the motor 110, and a drive amplifier 66 is responsive to the drive signal DV and supplies the drive current DA to the motor 110.

The frequency converters 126 and 127, the frequency divider 74, the switching signal generator 75, the A/D converter controller 76, the memory controller 77 and the D/A converter controller 78 are formed of gate arrays and the like in the form of an integrated circuit 79. The phase comparator 69, the filter 70, the voltage-controlled oscillator 71, the frequency divider 74, the switching signal generator 75, the A/D converter controller 76, the memory controller 77, and the D/A converter controller 78, the drive controller 67 and the drive amplifiers 66 in combination form the control circuit 114 of this embodiment.

The color image signals are amplified by the amplifiers 146R, 146G and 146B. The amplification factors of the respective amplifiers 146R, 146G and 146B are adjusted dependent on the transparencies of the filter sections of the respective colors, and the beam-to-light conversion efficiencies of the respective color components of the fluorescent material in the CRT 102. At least two of the amplifiers 146R, 146G and 16B have a delay time such that the signals output from the amplifiers 146R, 146G and 146B are delayed with respect to each other, as shown in FIG. 27A, FIG. 27B and FIG. 27C, assuming that the R, G and G signals are of the same waveform. It is seen that G signal is delayed relative to the R signal, and B signal is delayed relative to the G signal. The amount of the delay is one third of the sampling period, i.e., the interval between successive samplings of one of the R, G and B signals, e.g., the R signal. The reason for introducing such delay will be clear from the following description.

The switching circuit 144 sequentially and repeatedly selects the R, G and B signals, each for a period of one third of the sampling period. The result is that a time-division multiplexed color image signals shown in FIG. 27D are obtained.

The color image signal is input to the A/D converter 128, where it is A/D-converted into digital signal, shown in FIG. 27E, which are written in the memories 130R, 130G and 130B. The write signals applied to the memories 130R, 130G and 130B are shifted by one third of the sampling period, so that the sequence of the data of the respective colors are written in the respective memories. That is, the sequence of data corresponding to R signal are written in the memory 130R, the sequence of data corresponding to G signal are written in the memory 130G, and the sequence of data corresponding to B signal are written in the memory 130B. This is illustrated in FIG. 28A to FIG. 28E.

FIG. 28A shows the sampling points of the respective color image signals. FIG. 28B shows digital color image signals output from the A/D converter 128. FIG. 28C, FIG. 28D and FIG. 28E write control signals applied ot the write signal input terminals MICKr, MICKg and MICKb of the memories 130R, 130G and 130B. The data as output from the A/D converter 128 are written at the rising edges of the write signals, so the timing at which the writing occurs in the respective memories differ from each other as described above.

The digital color image signals having been written in the memories 130R, 130G and 130B are read in time with the read signals having a frequency three times that of the write signals, and in synchronism with the vertical sync signal V. That is, one field of color image signals of each color is read in one third of a write field period. The fields of the respective colors are read in sequence, e.g., in the order of R, G and B.

FIG. 29A to FIG. 29D show the vertical sync signal V and the read enable signals MOEg, MOEb and MOEr, which are Low when active. As illustrated, the read enable signals MOEg, MOEb and MOEr are active in turn, each for a period of one third of one vertical period or the field period VP. Each of the memories 130G, 130B and 130R is in a state in which reading is possible when the corresponding read enable signal MOEg, MOEb or MOEr is active. By controlling the read enable signals in this way, the digital color image signals are produced in turn from the memories 130G, 130B and 130R.

In reading the image signals from the memories, the timing at which the reading of each field of image signals is commenced is so adjusted as to produce a sequence of fields of images signals for interlaced scanning. In such a sequence of image signals, the switching between odd fields and even fields occur every three fields. That is, odd three fields for three colors are followed by three even fields for three colors, which in turn are followed by three odd fields for three colors, and so on.

This is illustrated in FIG. 30A to FIG. 30D, in which an odd field and an even of the original video signal are respectively indicated by F1 and F2. Odd fields formed of G, B and R image signals which are obtained from the odd field F1 and which are stored in the memories 130G, 130B and 130R are respectively indicated by G1, B1 and R1 in FIG. 30B, FIG. 30C and FIG. 30D. Even fields formed of the G, B and R image signals which are obtained from the odd field Fl and which are stored in the memories 130G, 130B and 130R are respectively indicated by G2, B2 and R2 in FIG. 30B, FIG. 30C and FIG. 30D. The writing of image signals G1, B1, R1, G2, B2, R2, etc. in the memories is commenced in synchronism with the first horizontal sync signal H subsequent to the vertical sync signal V. A combination (F1+F2) of the odd and even fields Fl and F2 forming a complete frame is also shown at the right end in FIG. 30A.

The fields of color image signals are read in the sequence of G1, B1, R1, G2, B2, R2, and so on. In the control for producing interlaced scanning according to this embodiment, the timing of beginning the reading of the image signals of each field is adjusted to be suitable for interlaced scanning in which the switching between odd and even fields is made every three read field, or every write field. This is achieved by using signals shown in FIG. 31B and FIG. 31C. The signal shown in FIG. 31B is the triple-frequency horizontal sync signal H3 in synchronism with the horizontal sync signal H. The signal shown in FIG. 31C is a shifted triple-frequency horizontal sync signal H3s shifted by one half the period of the horizontal sync signal H3. The reading of the image signals of the odd fields is made in synchronism with the triple-frequency horizontal sync signal H3, while the reading of the image signals of the even fields is made in synchronism with the shifted sync signals H3s. More specifically, the reading of each of the odd fields is commenced in synchronism with the first horizontal sync signal H3 subsequent to the vertical sync signal V3 of each field, and the reading of each line of the image signals is commenced in synchronism with the each of the horizontal sync signals H3. The reading of each of the even fields is commenced in synchronism with the first shifted horizontal sync signal H3s subsequent to the vertical sync signal V3 of each field, and the reading of each line of the image signals is commenced in synchronism with each of the shifted horizontal sync signals H3s.

The image signals read in the above sequence and with the above timings are D/A-converted at the D/A converter 132 and are then supplied to the CRT 102 for displaying the fields of images in turn, in time with the rotation of the rotary filter 106.

In the embodiment described above, only a single A/D converter 128 is used to sequentially sample the three image signals, and yet the timings at which the image signals of the three colors are sampled are at corresponding positions because of the different delays at the amplifiers 146R, 146G and 146B. As a result, color contamination due to differences in sampling points can be avoided.

Moreover, as the horizontal scanning period in the NTSC system and the horizontal scanning period in the PAL system are about the same, the embodiment described above can be readily applied to both of the systems.

Modifications to Embodiments A1 to A7

In the embodiments described, the color signal separator is used to produce R, G and B image signals. However, the color signal separator 122 is not required where the color image signals RS, GS and BS are supplied from the outside of the color image display device.

In the embodiments described, the sync separator is used to extract the vertical and horizontal sync signals V and H. However, the sync separator 124 is not required where the sync signals V and H are supplied from outside of the color image display device.

Figure 2:
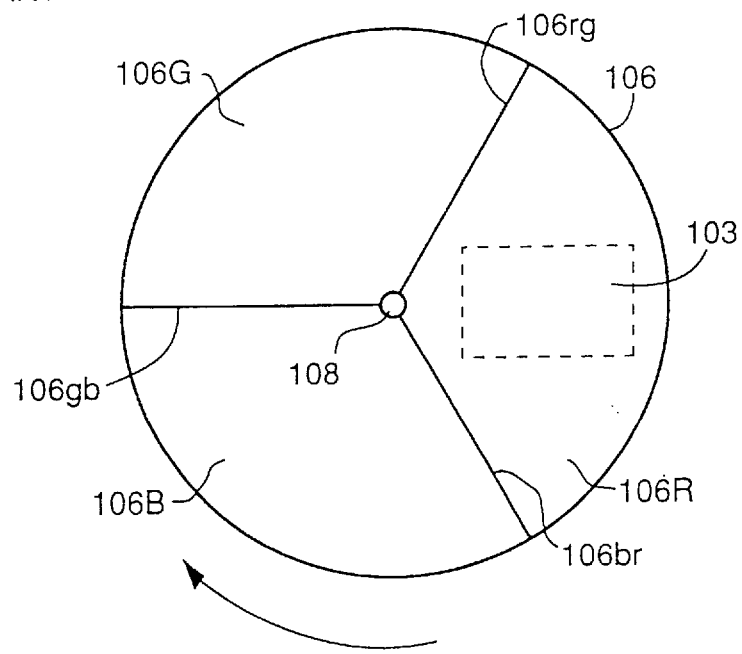
FIG. 2 is a front view of a disk-shaped rotary filter forming part of the coloring device used in the color image display device of FIG. 1.
Figure 3A:
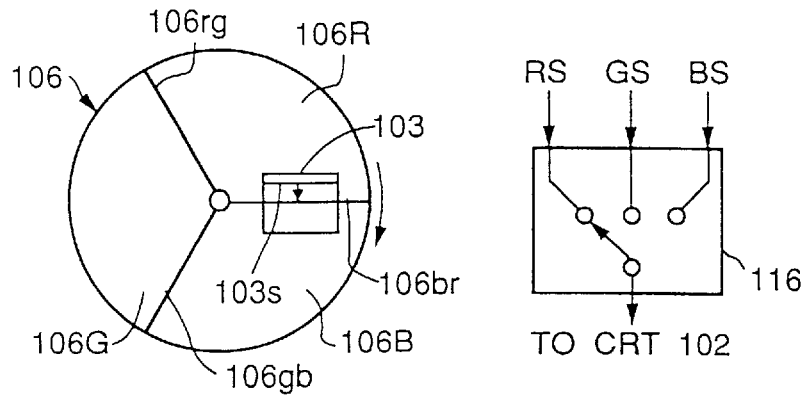
FIG. 3A to FIG. 3D are diagrams showing the relationship between the rotational phase of the rotary filter, the scan line of the CRT and the switching of a switching circuit used in the color image display device of FIG. 1.
Figure 3B:
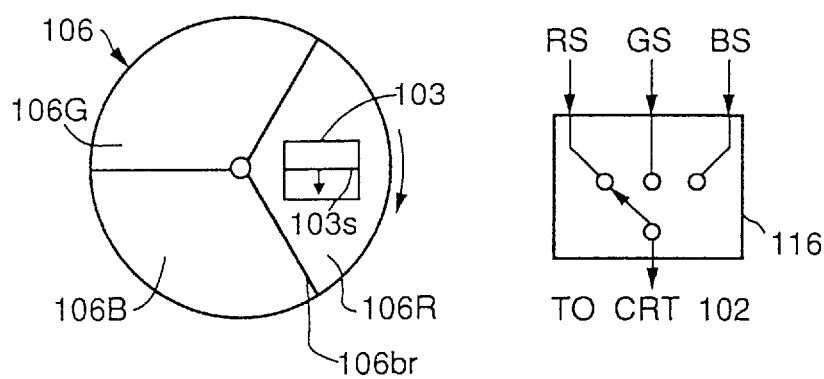
Figure 3C:
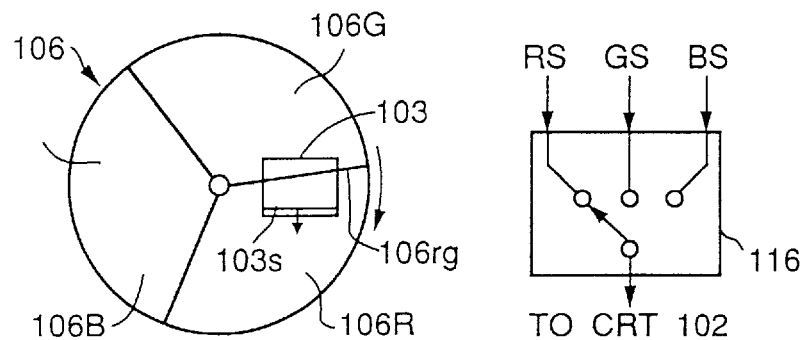
Figure 3D:
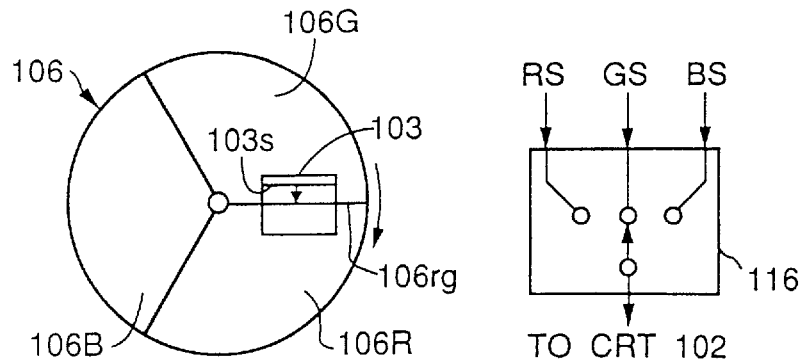
Figure 5G:
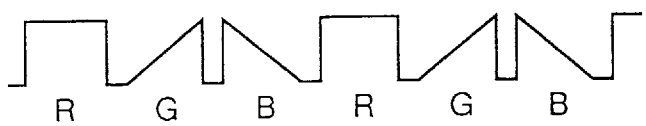
Figure 9A:
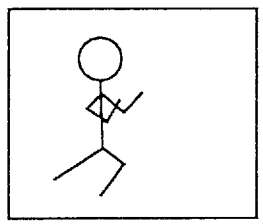
FIG. 9A to FIG. 9C are diagrams showing discontinuity in the picture due to the passing over of the address.
Figure 9B:
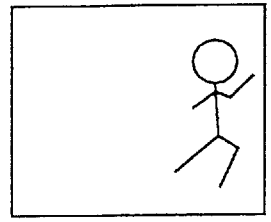
Figure 9C:
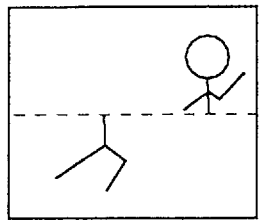
Figure 11A:
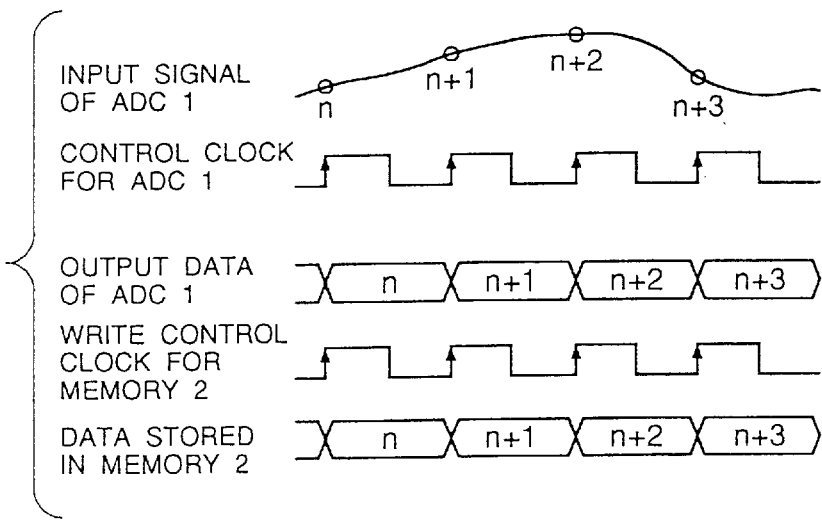
FIG. 11A and FIG. 11B are diagrams illustrating the waveforms and values of the signals at various points in the processor of FIG. 10.
Figure 11B:
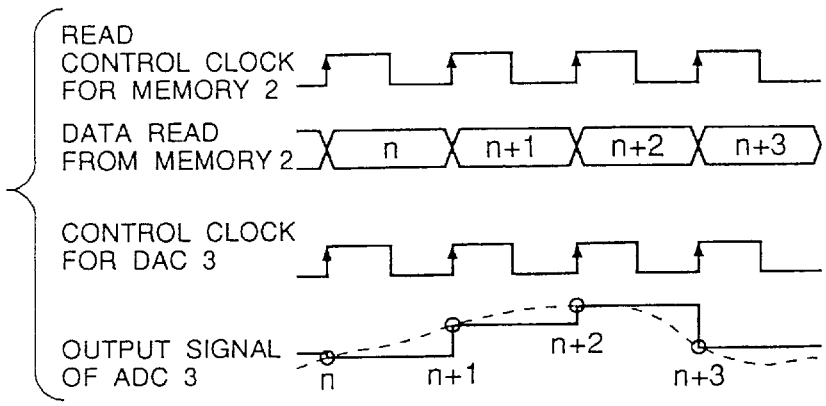
Figure 12A:
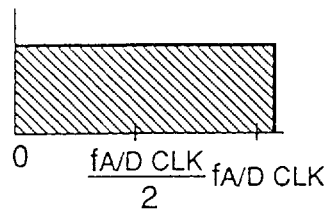
FIG. 12A to FIG. 12D are diagrams showing the frequency distributions of the signals at various points in the processor of FIG. 10.
Figure 12B:
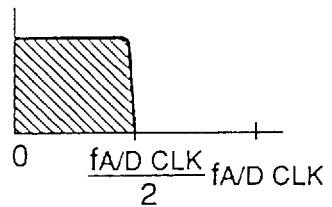
Figure 12C:
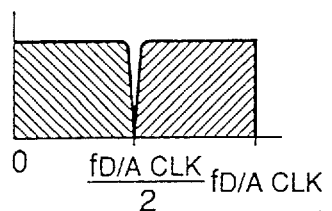
Figure 12D:
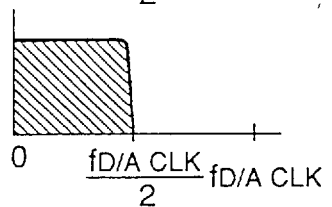
Figure 12E:
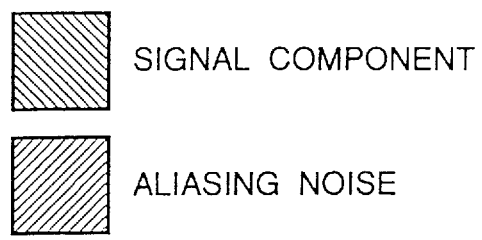
FIG. 12E is a diagram explaining the meaning of each type of hatching in FIG. 12A to FIG. 12D.

In the various embodiments described above, the image signals are read at a rate three times the rate at which the they are written in the memories. However, the reading may be at a rate other than three time the rate of writing. If the rate of reading is n times (n being an integer) the rate of writing and the rotary filter shown in FIG. 2 (having a single set of filter sections) the rotary filter is rotated at a speed n/3 revolutions per a vertical period of the input video signal.

Figure 32A:
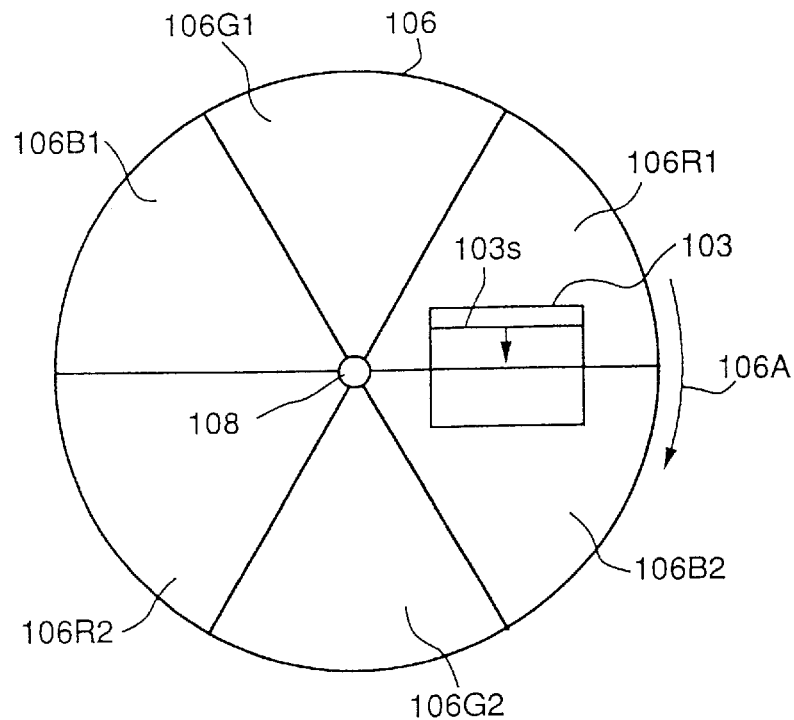
FIG. 32A to FIG. 32D are front views of another example of rotary filter.
Figure 32B:
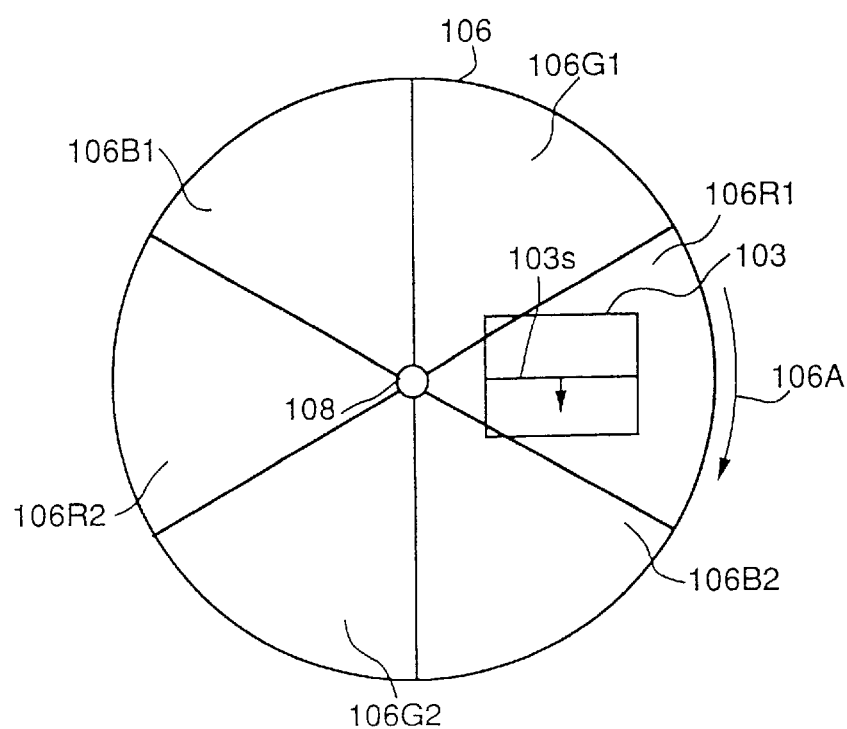
Figure 32C:
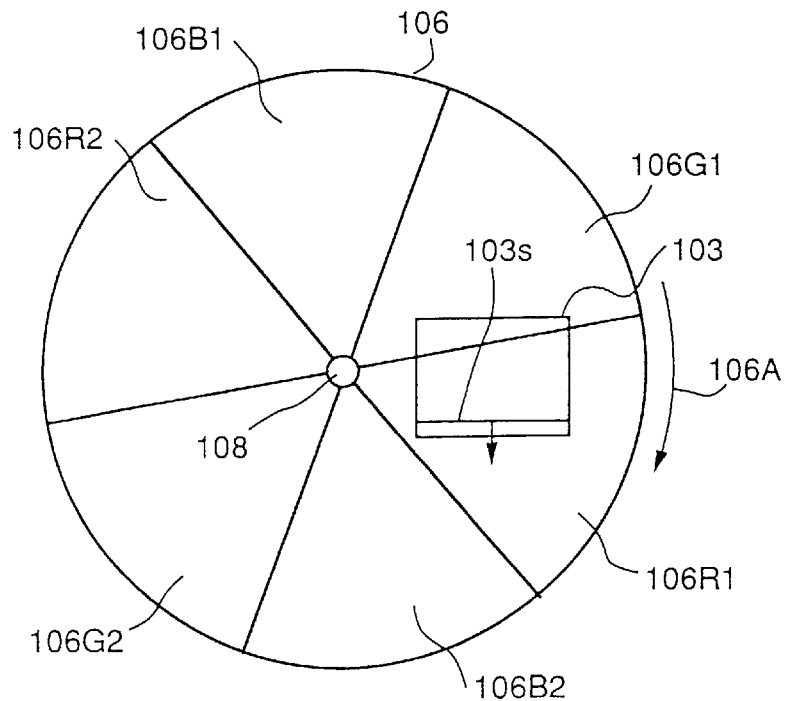
Figure 32D:
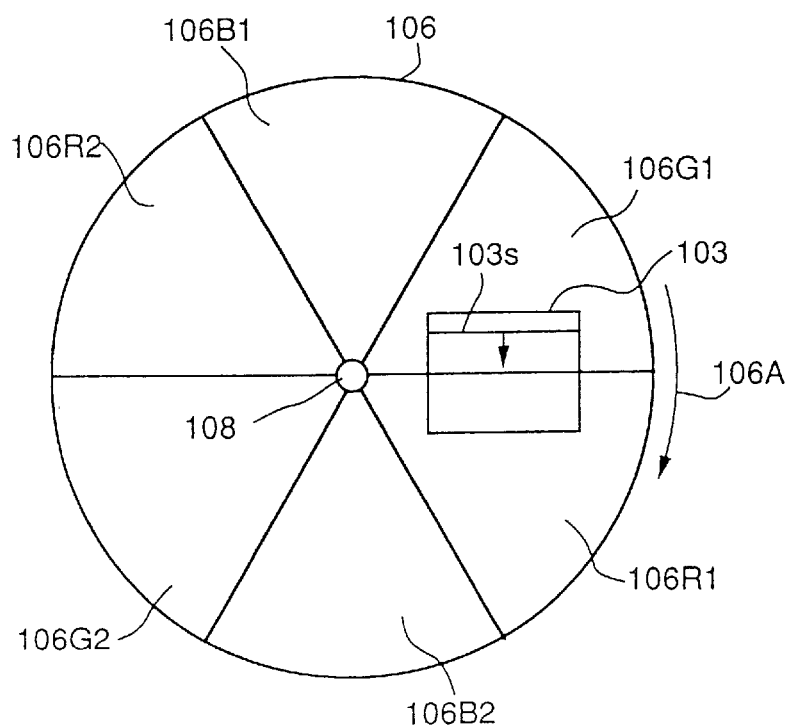

In various embodiments described above, rotary filter 106 has a single set of three filter sections 106R, 106G and 106B of the three primary colors. The rotary filter 106 may alternatively have two sets of filter sections. The first set consisting of three filter sections 106R1, 106G1 and 106B1 of red, green and blue, and the second consisting of three filter sections 106R2, 106G2 and 106B2 of red, green and blue, as illustrated in FIG. 32A. The filter sections 106R1, 106G1, 106B1, 106R2, 106G2 and 106G2 are consecutive in the direction of rotation so that they sequentially and continuously overlie the screen 103 of the CRT 102. In the state shown in FIG. 32A, the scanning line 103s is at or near the upper edge of the screen 103s, and the border line 106br between the filter sections 106B2 and 106R1 is at the center of the screen 103. In step with the downward movement of the scanning line 103s (by vertical deflection or scanning), the rotary filter rotates, in the direction of arrow 106A, as shown in FIG. 32B, FIG. 32C and FIG. 32D. In the state shown in FIG. 32D, the scanning line 103s is again at or near the upper edge of the screen 103, and the border line 106rg between the filter sections 106R1 and 106G1 is at the center of the screen.

By the use of the rotary filter 106 having two sets of filter sections, the rotational speed of the rotary filter can be lowered to one half (compared with case where the rotary filter has only one set of filter sections). This is advantageous because the noise due to rotation can be reduced, and the voltage for driving the motor 110 can be lowered. Moreover, the accuracy requirement in mounting the filter sections is alleviated, and the permissible rotational phase error is increased.

The number of the sets of the filter sections may be further increased to three, or more.

Figure 33:
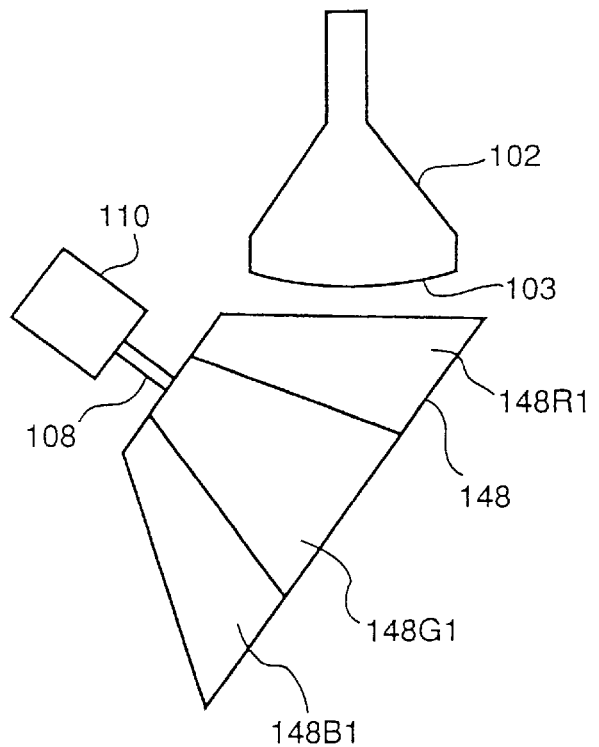
FIG. 33 is a side view showing another example of rotary filter.
Figure 34:
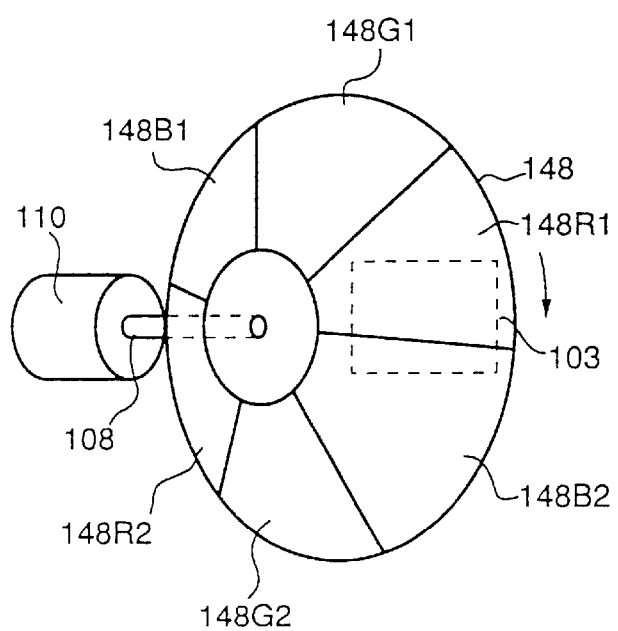
FIG. 34 is a perspective view of the rotary filter of FIG. 33.

In place of the disk-shaped rotary filter 106, a rotary filter 148 having a shape of a truncated circular cone, as shown in FIG. 33 and FIG. 34 may be used. The rotary filter 148 illustrated in FIG. 33 and FIG. 34 also has two sets of filter sections, 148R1, 148G1, 148B1, 148R2, 148G2 and 148B2.

The rotary filter 148 is rotatable about the axis of the cone and is equally divided by generators (straight lines extending along the surface of the cone and passing through the vertex of the cone) of the cone into the red, green and blue filter sections 148R1, 148G1, 148B1, 148R2, 148G2 and 148B2.

The screen 103 of the CRT 102 is provided to confront the outer conical surface of the rotary filter 148. By the use of the conical rotary filter, the diameter of the filter can be reduced, and the overall size of the device can be reduced.

In connection with the embodiments described, the filter sections of the rotary filter are made to overlie the screen of the display device. However, the invention is not limited to such an arrangement. What is essential that the filter section be made to be interposed in an optical path from the screen to a predefined viewing postion, at which the viewer receives the light from the screen.

The display device of the invention having been described above can be used as a view finder in a video camera, or as a projection television set.

Embodiment B1

Figure 35:
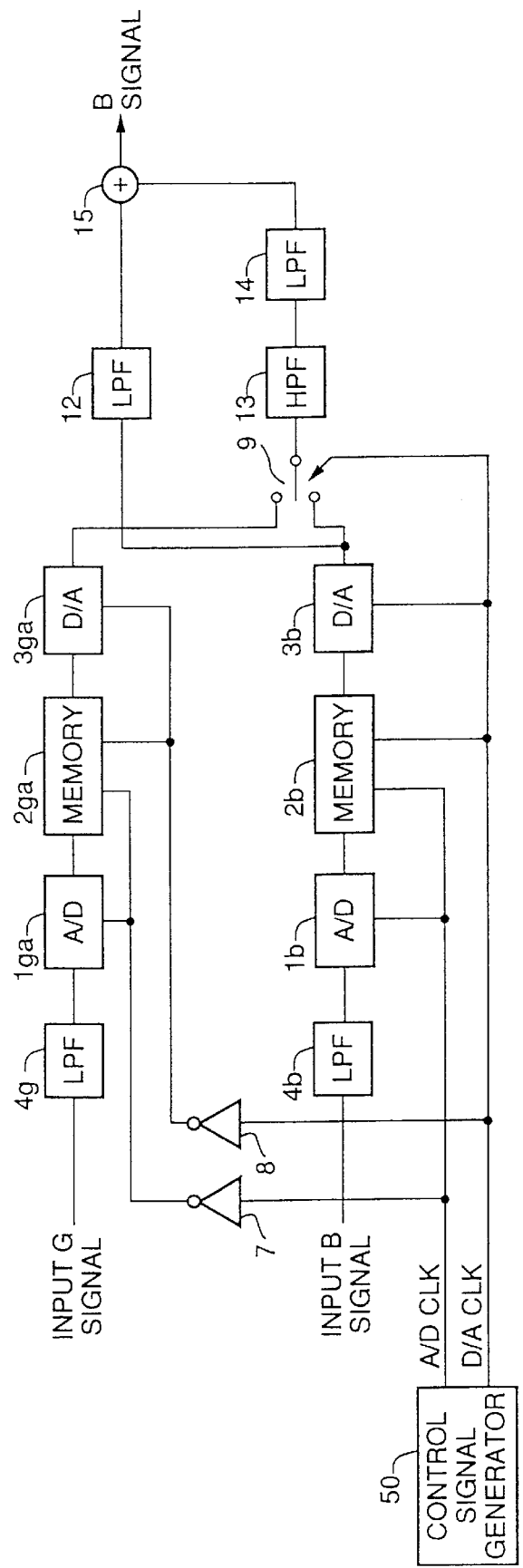
FIG. 35 is a block diagram showing a video signal processor of another embodiment of the invention.

FIG. 35 shows a video signal processor for converting the R, G and B video signals into a field sequential signals used in a display performing field sequential display of R. G and B video signals. FIG. 35 shows only such part of the video signal processor which relates to production of the decoded color image signal, e.g., B signal, of one of a plurality of colors.

In this embodiment as well as other embodiments subsequenly described, reference numerals identical to those in the drawings of the prior art of FIG. 10 to FIG. 18 denote identical or corresponding members or circuits.

The scanning frequency is higher than the scanning frequency used in the conventional display unit. It is assumed to be three times the scanning frequency used in the conventional display unit.

A control signal generator 50 provides control signals and clocks used for control over other circuits. In the embodiment of FIG. 35, clocks A/DCLK and D/ACLK are shown to be produced from the control signal generator 50. But other signals which may be necessary are also produced, although they are not shown. The control signal generator 50, in combination with inverters 7 and 8 inverting the clocks A/DCLK and D/ACLK, forms a control circuit of this embodiment.

An LPF 12 extracts the low-frequency component of the color signal (which is a chrominance signal component) from the output signal of the D/A converter 3b. An HPF 13 removes the chrominance signal component from the output signal of the switch 9. An LPF 14 removes the aliasing noises from the output signal of the HPF 13, thereby producing a signal consisting of the luminance signal component. An adder 15 adds the chrominance signal component from the LPF 12 and the luminance signal component from the LPF 14.

The video signal is comprised of a luminance signal and chrominance signals. The luminance signal has the same frequency band as the video signal. The bandwidth of the chrominance signals may not be so wide. Because of the limitation of the resolving power of the human eyes, it is sufficient if the chrominance signal has a bandwidth of 0.5 to 1.5 MHz for the NTSC system, and 1.3 MHz for the PAL system.

The R, G and B video signals contain chrominance signal signal components which are not related with each other, as well as a luminance signal low-frequency component (luminance signal component in the low frequency band of up to 1.5 MHz), and a luminance signal high-frequency component (above 1.5 MHz) which is common between the R, G and B video signals. In other words, the R, G and B video signals can be divided into low frequency components which are not related to each other and high frequency components which are identical to each other.

In the following description, the low-frequency component of R video signal (which is not related to the low-frequency components of the G and B video signal) at a sample point n is represented by Rn, and the high frequency component of the R video signal (which is identical to the high-frequency component of the G and B video signals) at the sample point n is represented by YHn. The R video signal can therefore be represented by Rn+YHn. Similarly, the low-frequency component of G video signal at a sample point n is represented by Gn, and the high frequency component of the G video signal at the sample point n is represented by YHn. The G video signal can therefore be represented by Gn+YHn. Similarly, the low-frequency component of B video signal at a sample point n is represented by Bn, and the high frequency component of the B video signal at the sample point n is represented by YHn. The B video signal can therefore be represented by Bn+YHn. Although the low-frequency components of the video signal also contain luminance signal components, they are sometimes referred to simply as chrominance signal components.

In the following description, it is assumed that the frequency $f_{A/D}$ of the control clock for the A/D converters 1b, 1ga and the frequency $f_{D/A}$ of the control clock for the D/A converters 3b and 3ga are identical to each other.

Figure 38A:
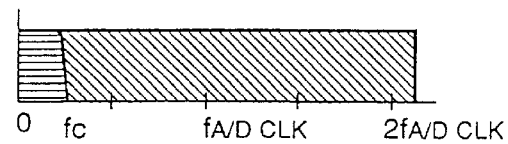
FIG. 38A to FIG. 38D are diagrams showing the frequency distributions of the signals at various points in the video signal processor in FIG. 35.

The G and B input signals have a frequency distribution shown in FIG. 38A.

Figure 38B:
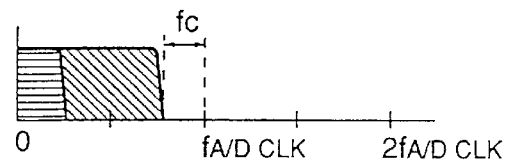

The LPFs 4b and 4ga respectively band-limit the input signals to a frequency $(f_{A/D}-f_C)$, which is the control clock frequency minus the frequency band $f_C$ of the chrominance signal component, which is for example 1.5 MHz. The output signals of the LPFs 4b and 4ga have a frequency distribution shown in FIG. 38B.

The the A/D converters 1b and 1ga, and field memories 2b and 2ga, and the D/A converters 3b and 3ga are similar to the A/D converters 1 and 1a, the field memories 2 and 2a, and the D/A converters 3 and 3a in the prior art example of FIG. 10. The control clocks applied to the circuits 1ga, 2ga and 3ga and the control clocks applied to the circuits 1b, 2b and 3b are 180° out of phase from each other. The sampling time points of the A/D converter 1b are denoted by n, n+1, n+2, . . . , while the sampling time points of the A/D converter 1ga are denoted by m, m+1, m+2.

Figure 36A:
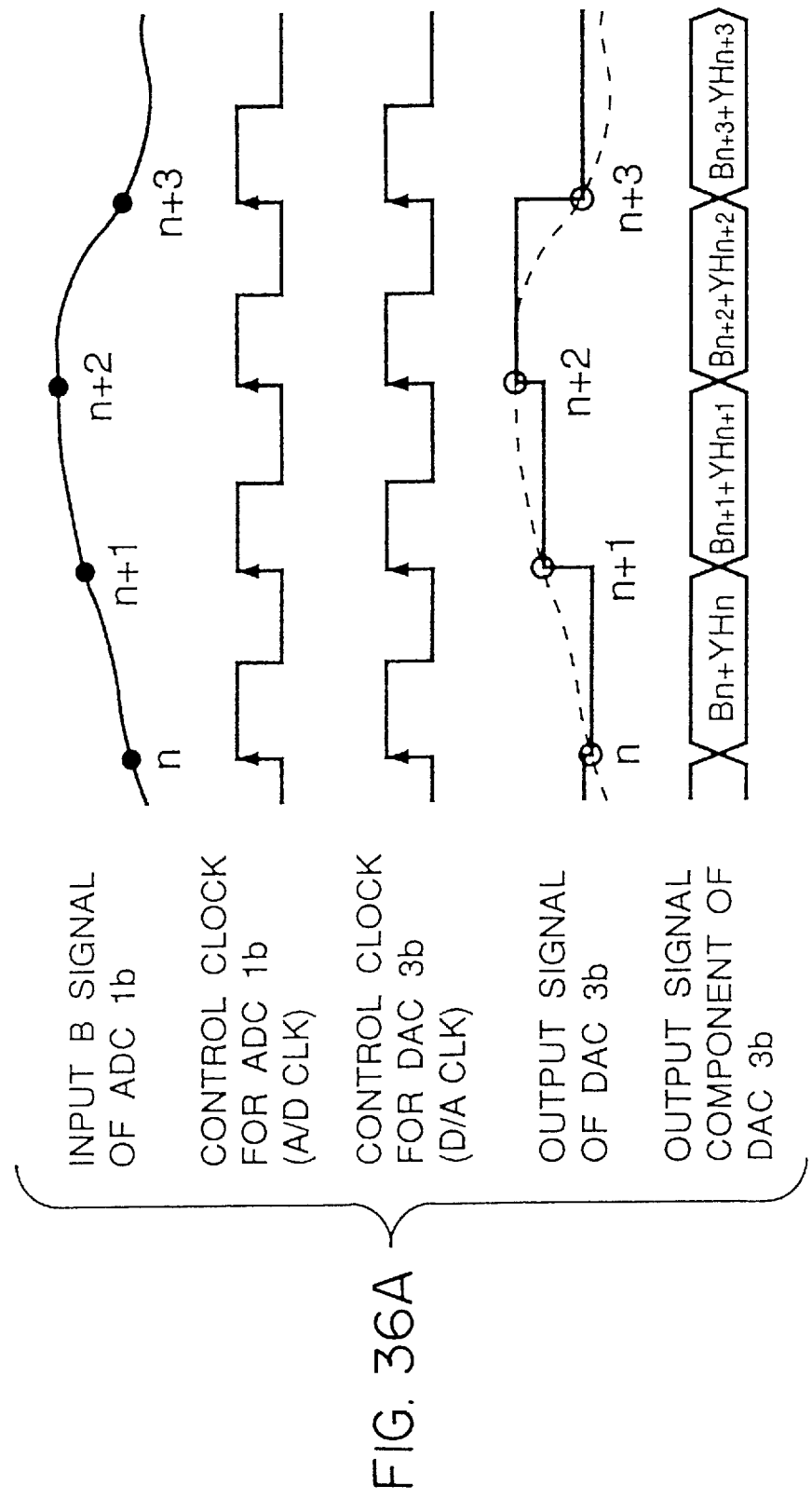
Figure 38C:
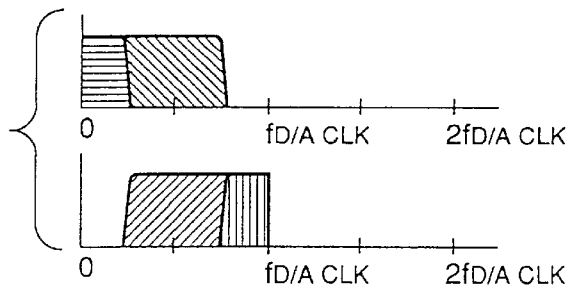
Figure 38D:
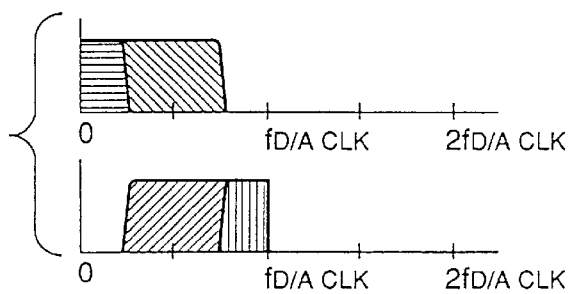

The output signals of the D/A converters 3b and 3ga contains aliasing noises from the control clock frequency $f_{D/A}$, as shown in FIG. 38C and FIG. 38D. The output signal components can be denoted by Bn+YHn, and Gm+YHm, as shown in FIG. 36A and FIG. 36B.

The LPF 12 extracts the chrominance signal component B from the output signal of the D/A converter 3b. For this purpose, it band-limits the signal to the frequency of not higher than $f_C$. The output signal of the LPF 12 is as shown in FIG. 39C. Its component consists of Bn alone as shown in FIG. 37A.

The output signal of the switch 9 has a waveform shown in FIG. 37B having twice as many sampling points, and contains the aliasing noises from the frequency twice the control clock frequency $f_{D/A}$ that are introduced because of the switching at the switch 9. The aliasing noises from the control clock frequency $f_{D/A}$ due to the sampling at the D/A converters 3b and 3ga cancel each other because of the phase difference of 180° between the clocks used for the sampling at the D/A converters 3b and 3ga. This is by the same mechanism as described with reference to the prior art of FIG. 14.

Figure 39A:
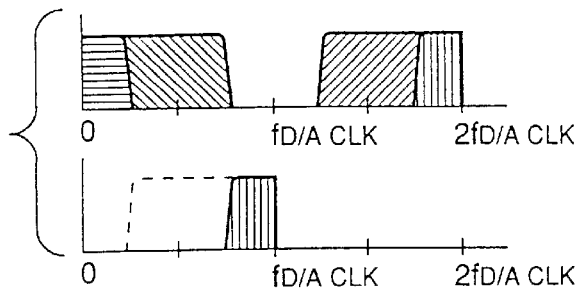
FIG. 39A to FIG. 39D are diagrams showing the frequency distributions of the signals at various points in the video signal processor in FIG. 35.

The output signals of the switch 9 has a frequency distribution shown in FIG. 39A and its components are (Bn+YHn)+(Gm+YHm), as shown in FIG. 37B.

The HPF 13 blocks components of not higher than $f_C$, i.e., the chrominance signal component, and removes the chrominance signal components of B and G from the output signal of the switch 9.

Figure 37C:
Figure 39B:
Figure 39C:
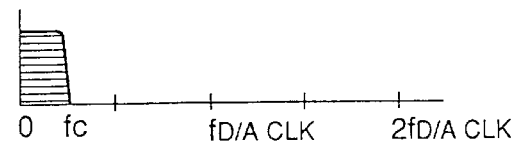

The LPF 14 band-limits output signal of the HPF 13 to a bandwidth of not higher than $(f_{D/A}-f_C)$, to thereby remove any residual aliasing noises from the control clock frequency $f_{D/A}$ and the aliasing noises from the double frequency $2f_{D/A}$. The output of the LPF 14 is as shown in FIG. 39B. The output signal is YHn+YHm, as shown in FIG. 37C. Thus it consists of the luminance signal component YH alone.

Figure 37D:
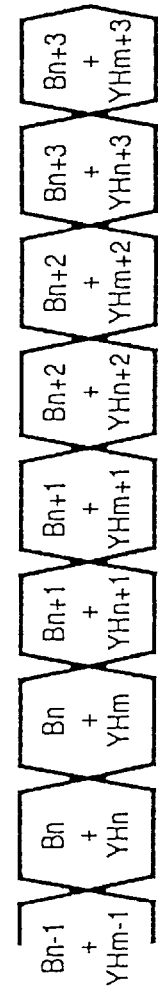
Figure 39D:
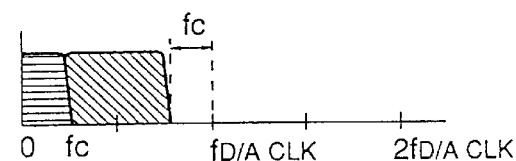
Figure 39E:
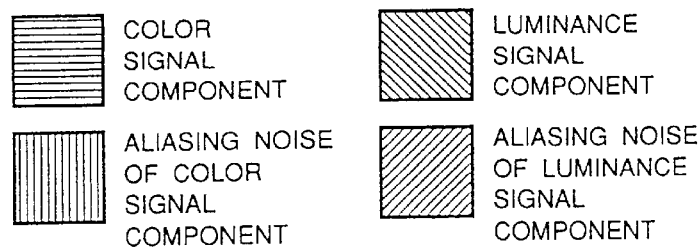
FIG. 39E is a diagram explaining the meaning of each type of hatching in FIG. 39A to FIG. 39D.

The adder 15 adds the color signal component B from the LPF 12 and the luminance signal component YH from the LPF 14, to produce a signal having a frequency distribution as shown in FIG. 39D. The output signal components are (Bn+YHn+YHm) as shown in FIG. 37D.

As has been described, in the video signal processor of Embodiment B1, the luminance signal component YHm of the G signal sampled at different sampling points is added to the B signal, so that the sampling frequency is effectively doubled. The signal bandwidth is expanded to $(f_{D/A}-f_C)$ The reduction of $f_C$ is due to the necessity to remove the aliasing noises of the chrominance signal components from the control clock frequency $f_{D/A}$.

Consideration on $f_{A/D}$ and $f_{D/A}$

Where $f_{A/D}=f_{D/A}$, as has been assumed, the bandwidth $f_C$ of the chrominance signal component at the A/D converter and the bandwidth $f_C$ of the chrominance signal component at the D/A converter are identical. Where $f_{A/D} \neq f_{D/A}$, it is necessary to perform frequency scaling between the A/D converter and the D/A converter. If the bandwidth of the chrominance signal component at the A/D converter is $f_C$, the bandwidth $f_C'$ of the chrominance signal component at the D/A converter is:

$$f_C'=f_C \times (f_{D/A}/f_{A/D})$$

The signal bandwidth at the D/A converter, i.e., the bandwidth of the output signal of the adder 15 is given by:

$$f_{D/A}-f_C \times f_{D/A}/f_{A/D}=f_{D/A}/f_{A/D} \times (f_{A/D}-f_C)$$

The bandwidth at the A/D converter is given by performing frequency-scaling, i.e., by multiplying the above-given bandwidth with $f_{A/D}/f_{D/A}$. The signal bandwidth at the A/D converter is therefore $(f_{A/D}-f_C)$ which is identical to that described above.

Thus, it is understood that there is no difference in the signal bandwidth at the A/D converter between a situation where $f_{A/D} \neq f_{D/A}$ and a situation where $f_{A/D}=f_{D/A}$. So, it is sufficient if we consider the situation where $f_{A/D}=f_{D/A}$.

In the above description, a high-order scanning, such as three-time scanning is performed to perform field-sequential display of R, G and B video signals, thereby converting video signal of three primary colors into field-sequential signals. The concept disclosed in this embodiment as well as other embodiments described subsequently can be applied to other video signal processor.

Embodiment B2

Figure 40:
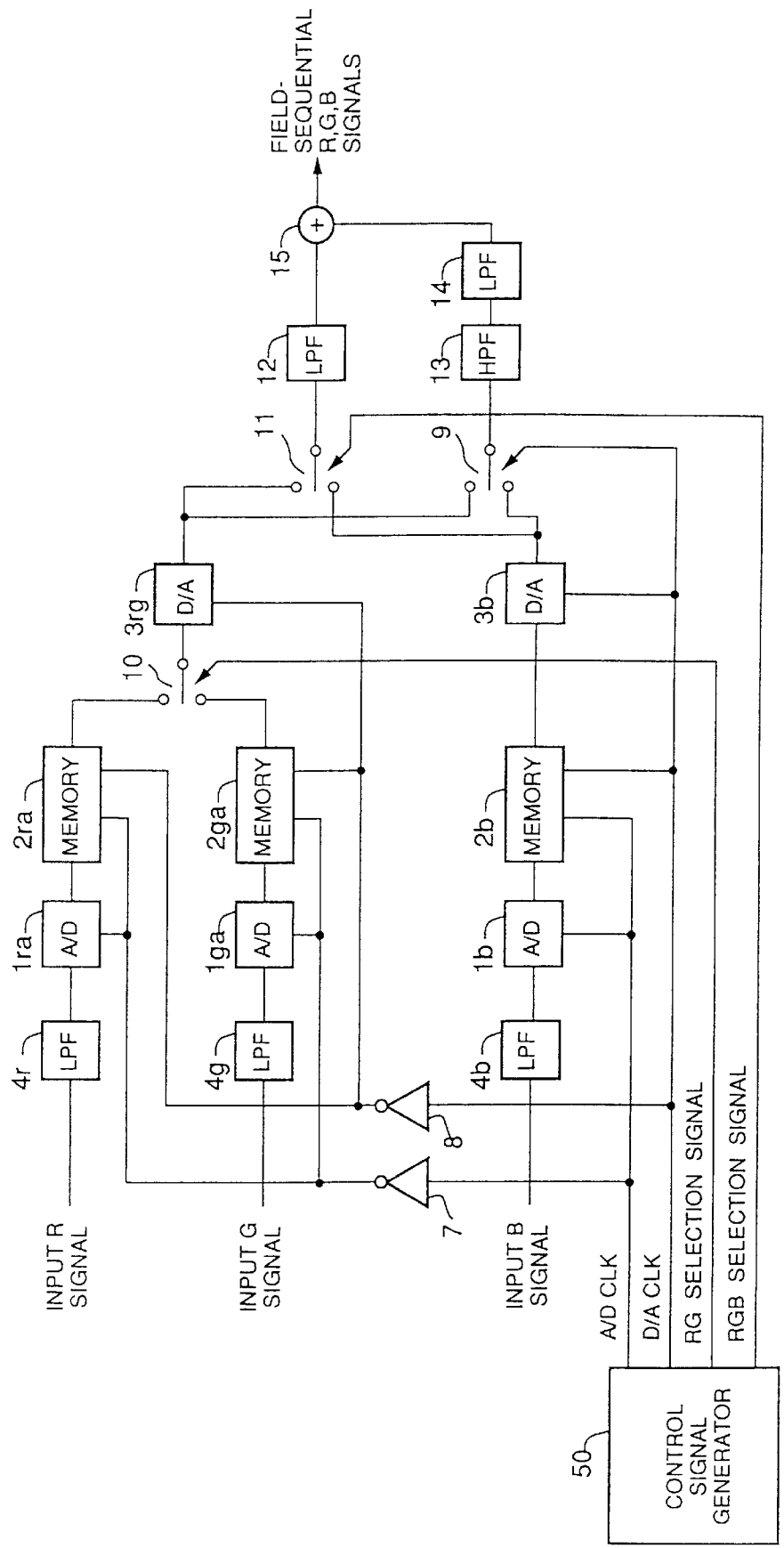
FIG. 40 is a block diagram showing a video signal processor of another embodiment of the invention.

FIG. 40 shows another embodiment of the video signal processor. The video signal processor of this embodiment is capable of producing field sequential signals of red, green and blue in sequence. The circuits identical or corresponding to those of FIG. 35 are denoted by identical reference numerals. The circuits with identical reference numerals except for the suffix "r" substituting "g" or "b" are identical except that they process the R signal instead of G or B signals. The clocks used in the circuits for processing the R and G signals, and the clocks used in the circuits for processing the B signal are 180° out of phase from each other.

A switch 10 selects either the output data from the field memory 2ra or the output data from the field memory 2ga. A switch 11 selects either the output signal from the D/A converter 3 or the output signal from the D/A converter 3a. Similarly, a switch 9 selects either the output signal from the D/A converter 3rg or the output signal from the D/A converter 3b.

For producing the R signal, the switch 10 is made to select the data from the field memory 2ra, and the switch 11 is made to select the data from the D/A converter 3rg, and the switch 9 is made to select the data from the D/A converter 3b.

For producing the G signal, the switch 10 is made to select the data from the field memory 2ga, and the switch 11 is made to select the data from the D/A converter 3rg, and the switch 9 is made to select the data from the D/A converter 3b.

For producing the B signal, the position of the switch 10 is arbitrary, i.e., it may be in a position for selecting the data from the field memory 2ra or in a position for selecting the data from the field memory 2ga, and the switch 11 is made to select the data from the D/A converter 3b, and the switch 9 is made to select the data from the D/A converter 3rg.

By controlling the switches 9, 10 and 11 in the manner described above, the field sequential R, G and B signals are produced at the output of the adder 15. When the R signal is produced at the output of the adder 15, the luminance signal of the B signal, with different sampling points, are added. When the G signal is produced at the output of the adder 15, the luminance signal of the B signal, with different sampling points, are added. When the B signal is produced at the output of the adder 15, the luminance signal of either the R signal or the G signal, with different sampling points, are added.

The signal bandwidth of the video signal processor of this embodiment is $f_{A/D}-f_C$.

Embodiment B3

Figure 41:
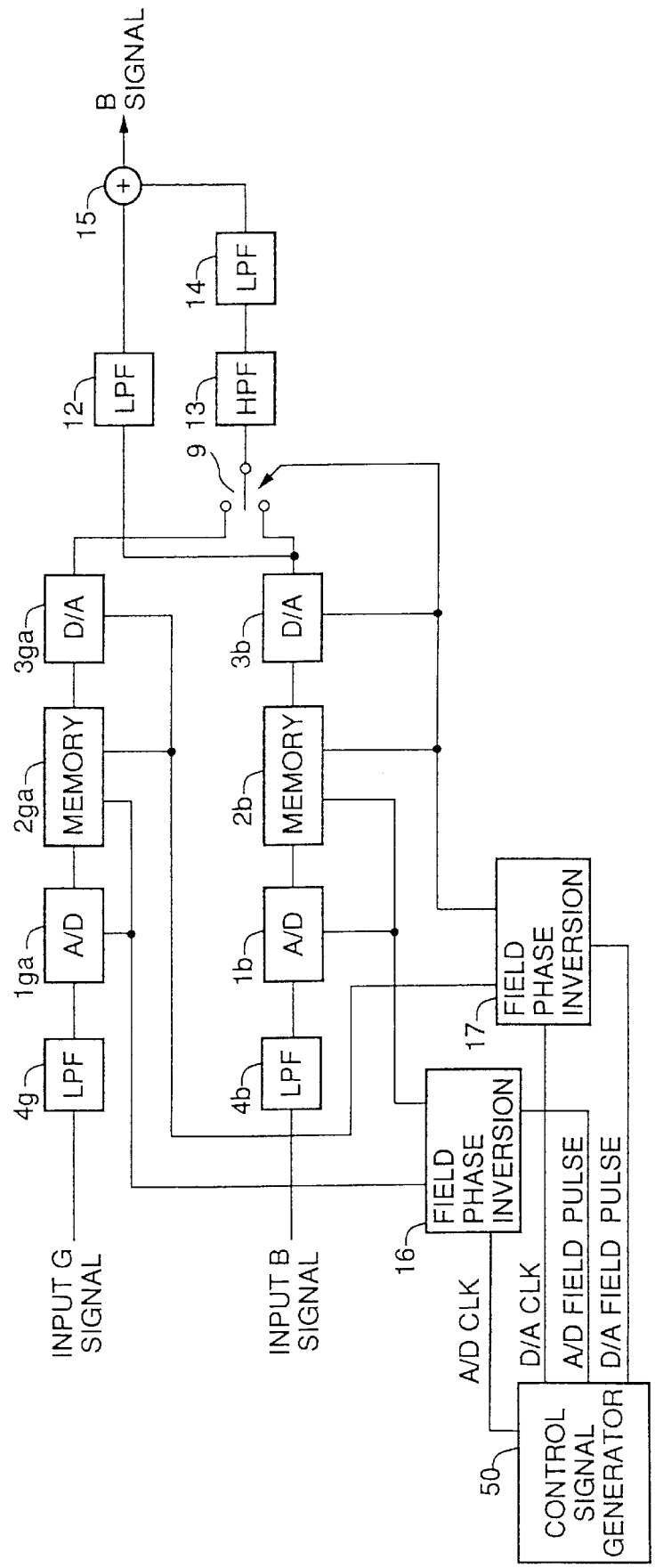
FIG. 41 is a block diagram showing a part of the video signal processor of another embodiment.

FIG. 41 shows part of the video signal processor of another embodiment. FIG. 41 shows only such part of the video signal processor which relates to production of the decoded color signal, e.g., B signal, of a plurality of colors. The field phase inverter 16 receives the clock A/DCLK and outputs a pair of clocks 180° having the same frequency as and in synchronism with the clock A/DCLK, and out of phase from each other, and shifts the phases of the output clocks by 180° each time an A/D field pulse is applied. The field phase inverter 17 receives the clock D/ACLK and outputs a pair of clocks 180° having the same frequency as and in synchronism with the clock D/ACLK, and out of phase from each other, and shifts the phases of the output clocks by 180° each time a D/A field pulse is applied.

Figure 42:
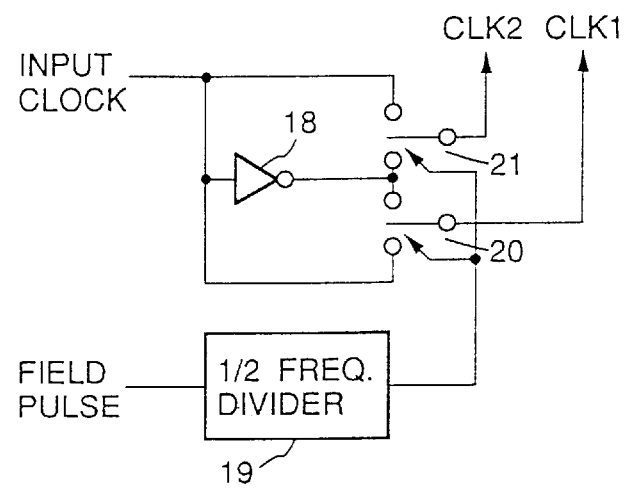
FIG. 42 is a block diagram showing an example of field phase inverter used in the video signal processor of FIG. 41.
Figure 43:
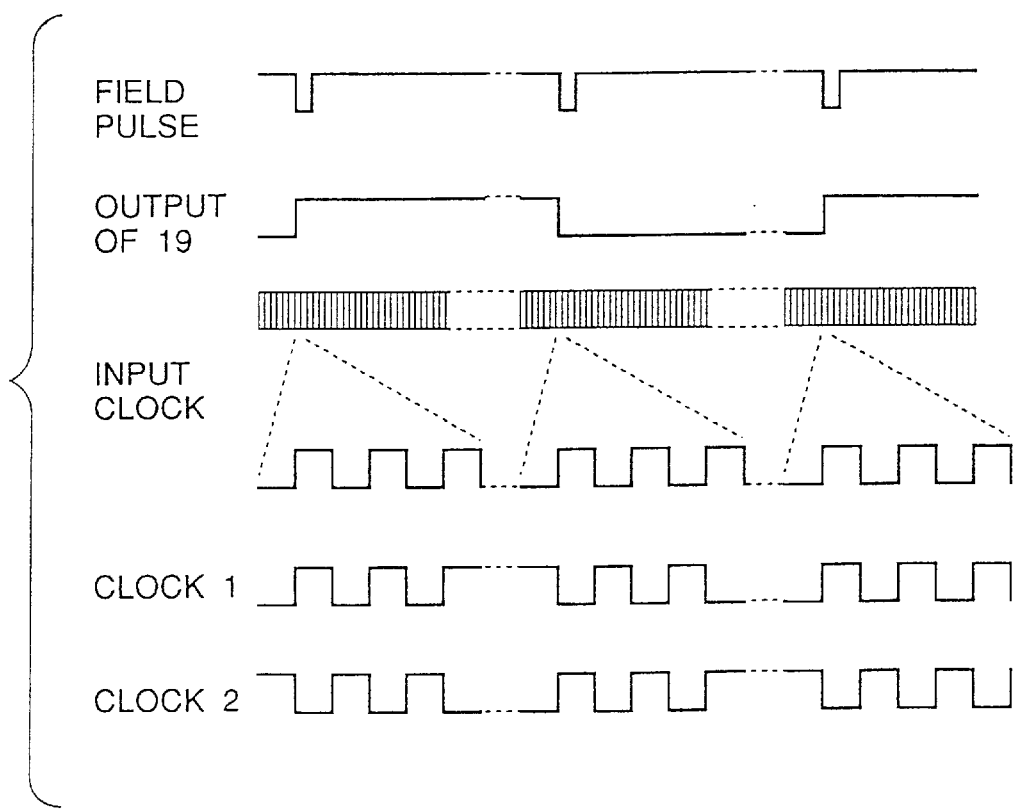
FIG. 43 is a time charts showing the waveforms of signals at various parts of the circuit of FIG. 42.

FIG. 42 shows an example of the field phase inverter 16, while FIG. 43 shows the waveforms of the signals at various points in the circuit of FIG. 42. As illustrated in FIG. 42, the field phase inverter comprises a frequency divider 19 for dividing the frequency of the D/A field pulses into half. An inverter 18 inverts the input clock D/ACLK to thereby shift the phase of the clock by 180°. Switches 20 and 21 selects either of the clocks which are out of phase by 180° from each other. The pair of clocks, CLK1 and CLK2, are obtained at the outputs of the switches 20 and 21.

The field phase inverter 17 is similarly composed of, but it receives the A/D field pulses (instead of the D/A field pulses) and the input clock A/DCLK (instead of the input clock D/ACLK).

FIG. 44A to FIG. 44D and FIG. 45A to FIG. 45D show the frequency distributions of the signals at various nodes in the circuit of FIG. 41.

It is assumed that $f_{D/A}=f_{A/D}$.

Figure 44A:
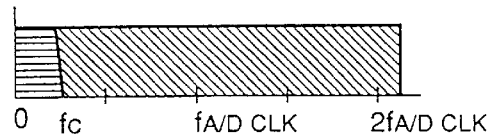
FIG. 44A to FIG. 44D are diagrams showing the frequency distributions of the signals at various points in the circuit of FIG. 41.
Figure 44B:
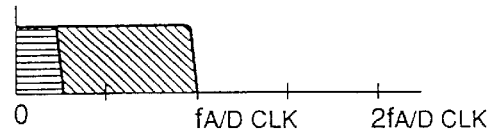

In the video signal processor shown in FIG. 41, the input G and B signals are band-limited by the LPFs 4g and 4b to the frequency $f_{A/D}$ of the control clocks for the A/D converters 1ga and 1b, and are then input to the A/D converters 1ga and 1b. FIG. 44A shows the frequency distribution of input signals G and B, FIG. 44B shows the frequency distribution of the output of LPFs 4g and 4b. The field phase inverters 16 and 17 shift the phases of the control clocks for the B signal processing circuit and the G signal processing circuit, by 180° every field. The aliasing noises contained in the output signals from the D/A converters 3b and 3ga are phase-shifted by 180° every field.

Figure 44C:
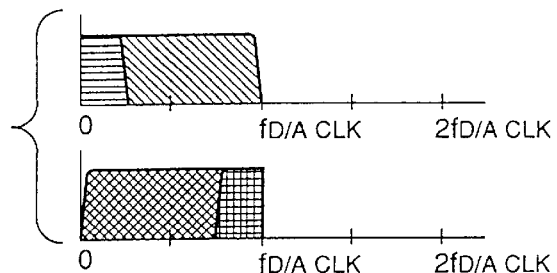
Figure 44D:
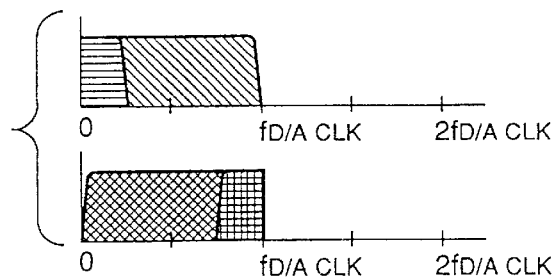
Figure 44E:
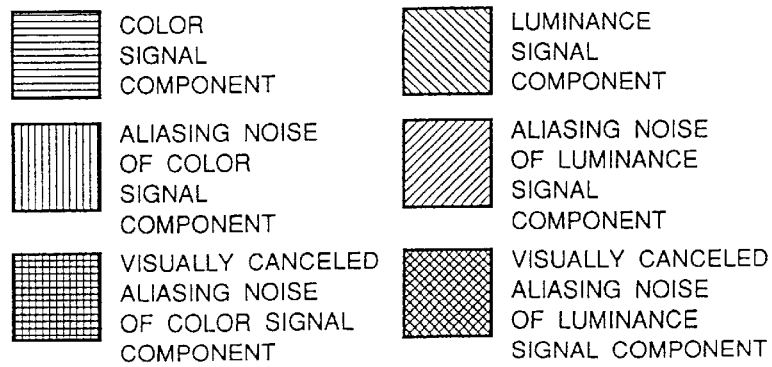
FIG. 44E is a diagram explaining the meaning of each type of hatching in FIG. 44A to FIG. 44D.

The output signals from the D/A converters 3b and 3ga have frequency distributions as shown in FIG. 44C and FIG. 44D. The phases of the aliasing noises from the control clock frequency $f_{D/A}$ are shifted by 180° every field, so that the aliasing noises, both in the chrominance signal components and in the luminance signal components, as seen by the human eyes, cancel each other, i.e., "visually" cancel each other.

Figure 45A:
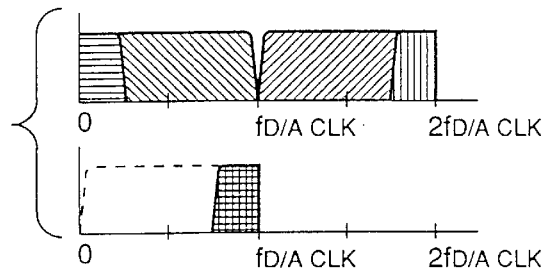
FIG. 45A to FIG. 45D are diagrams showing the frequency distributions of the signals at various points in the circuit of FIG. 41.
Figure 45B:
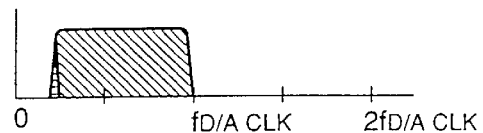
Figure 45C:
Figure 45D:
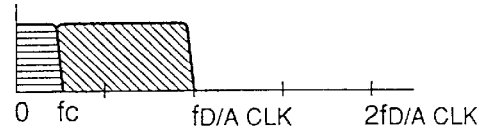
Figure 45E:
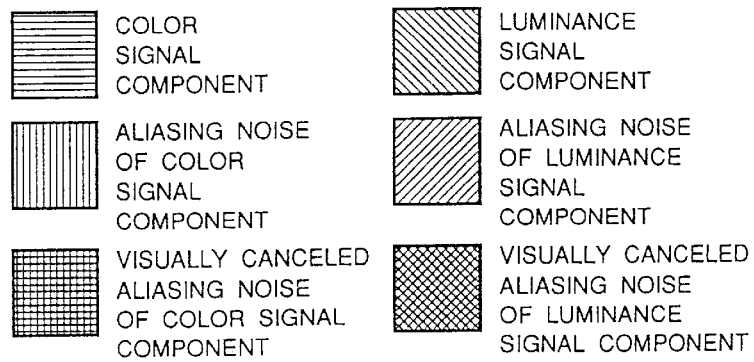
FIG. 45E is a diagram explaining the meaning of each type of hatching in FIG. 45A to FIG. 45D.

The output signal from the switch 9 contains the aliasing noises from the frequency $f_{D/A}$ of the control clocks for the D/A converters 3b and 3ga, and the aliasing noises from the frequency $2f_{D/A}$ twice the control clock frequency $f_{D/A}$, as shown in FIG. 45A. However, the aliasing noises from the control clock frequency $f_{D/A}$ in the chrominance signal components cancel each other in the images as seen by the human eyes. It is therefore unnecessary to remove these aliasing noises by the use of the LPF 14 as in the Embodiment B1. The LPF 14 instead band-limits the signal to remove components higher than $f_{D/A}$, while HPF 13 removes the components lower than 1.5 MHz, i.e., chrominance signal components of blue (B) and green (G) FIG. 45B shows the frequency distribution of the output of LPF 14. The LPF 12 on the other hand removes the components higher than 1.5 MHz, i.e., other than the chrominance signal component of blue (B). The bandwidth of the output B signal is extended up to the control clock frequency $f_{D/A}$. FIG. 45C shows the frequency distribution of the output of LPF 12, and FIG. 45D shows the frequency distribution of the output the adder 15 produced by adding the output of LPFs 12 and 14.

Embodiment B4

FIG. 46 shows a video signal processor of another embodiment. The circuits identical or corresponding to those in FIG. 40 and FIG. 41. It is similar to the embodiment of FIG. 40, but is additionally provided with the field phase converters 16 and 17, which are similar to those shown in FIG. 41.

The switches 9, 10 and 11 are controlled in the same way as described with reference to the embodiment of FIG. 40. Then, during the period when the R signal is output, the luminance signal component of the B signal at different sampling points is added. When the G signal is output, the luminance signal component of the B signal at different sampling points is added. When the B signal is output, the luminance signal component of the R signal or the G signal at different sampling time points is added, and the field sequential R, G and B signals are obtained.

The bandwidth of the output signals is extended to the control clock frequency $f_{A/D}$, in the same way as described with reference to the embodiment of FIG. 41.

Embodiment B5

FIG. 47 shows a video signal processor of another embodiment. FIG. 47 shows only such part of the video signal processor which relates to production of the decoded color signal, e.g., B signal, of a plurality of colors. In FIG. 47, circuits identical or corresponding to those in FIG. 35, FIG. 40 and FIG. 41 are denoted by identical reference numerals. It is similar to the embodiment of FIG. 35, but is additionally provided with A/D converters 1g and 1ba, field memories 2g and 2ba, D/A converters 3g and 3ba, frequency dividers 22 and 23, and a switch 24. Instead of the inverters 7 and 8 of FIG. 35, inverters 7g, 7b, 8g and 8b are provided. Instead of the switch 9, a pair of switches 9g and 9b are provided. The frequency divider 22 divides the frequency of the input clock having a frequency of 2 $f_{A/D}$ and producing first and second clocks having a frequency $f_{A/D}$ and a phase difference of 90° between them. The frequency divider 23 divides the frequency of the input clock having a frequency of 2 $f_{D/A}$ and producing first and second clocks having a frequency $f_{A/D}$ and a phase difference of 90° between them. The switch 24 selects one of the outputs of the switches 9g and 9b.

Figure 48A:
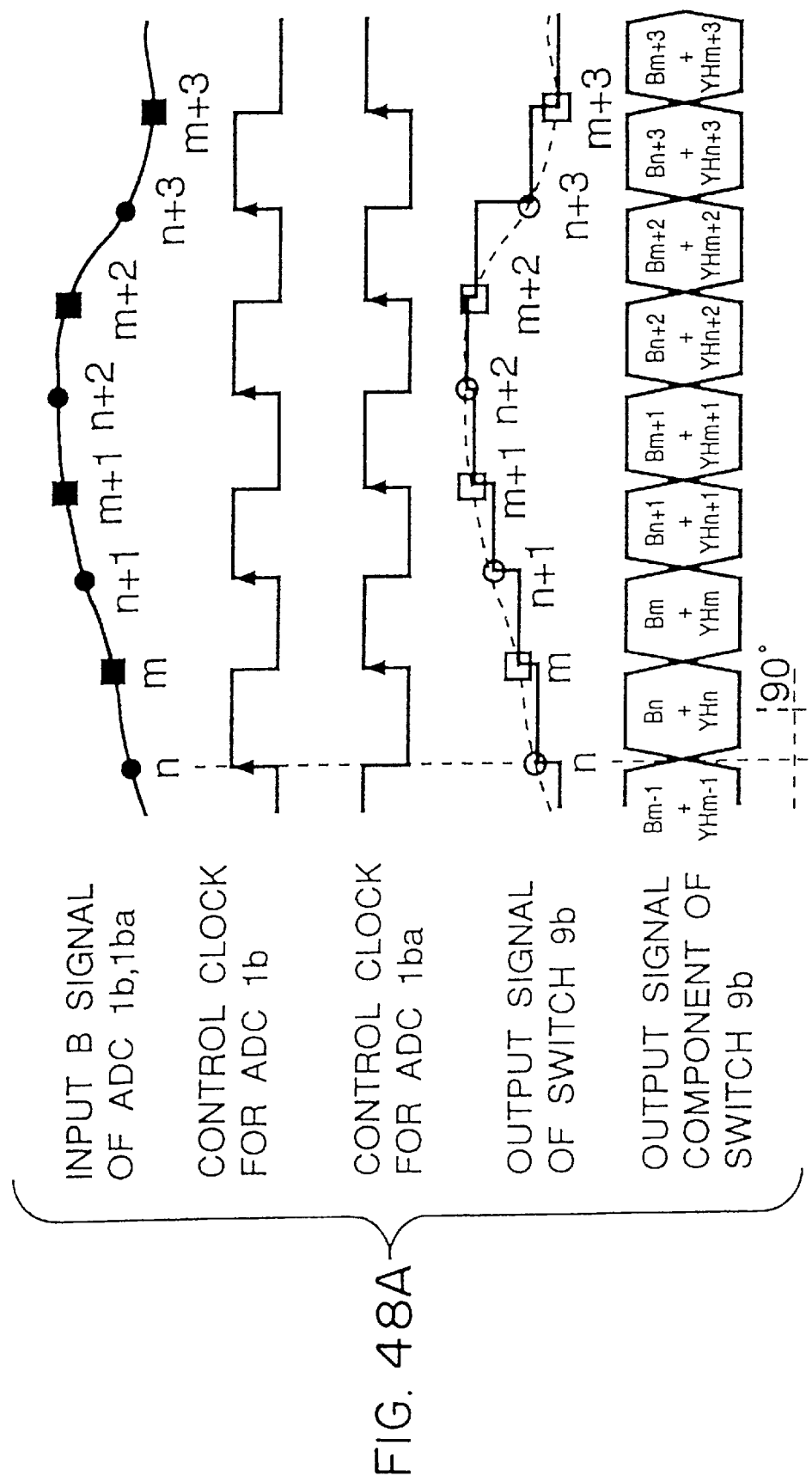
FIG. 48A to FIG. 48C are diagrams showing the waveforms of the signals at various points in the video signal processor of FIG. 47.
Figure 48B:
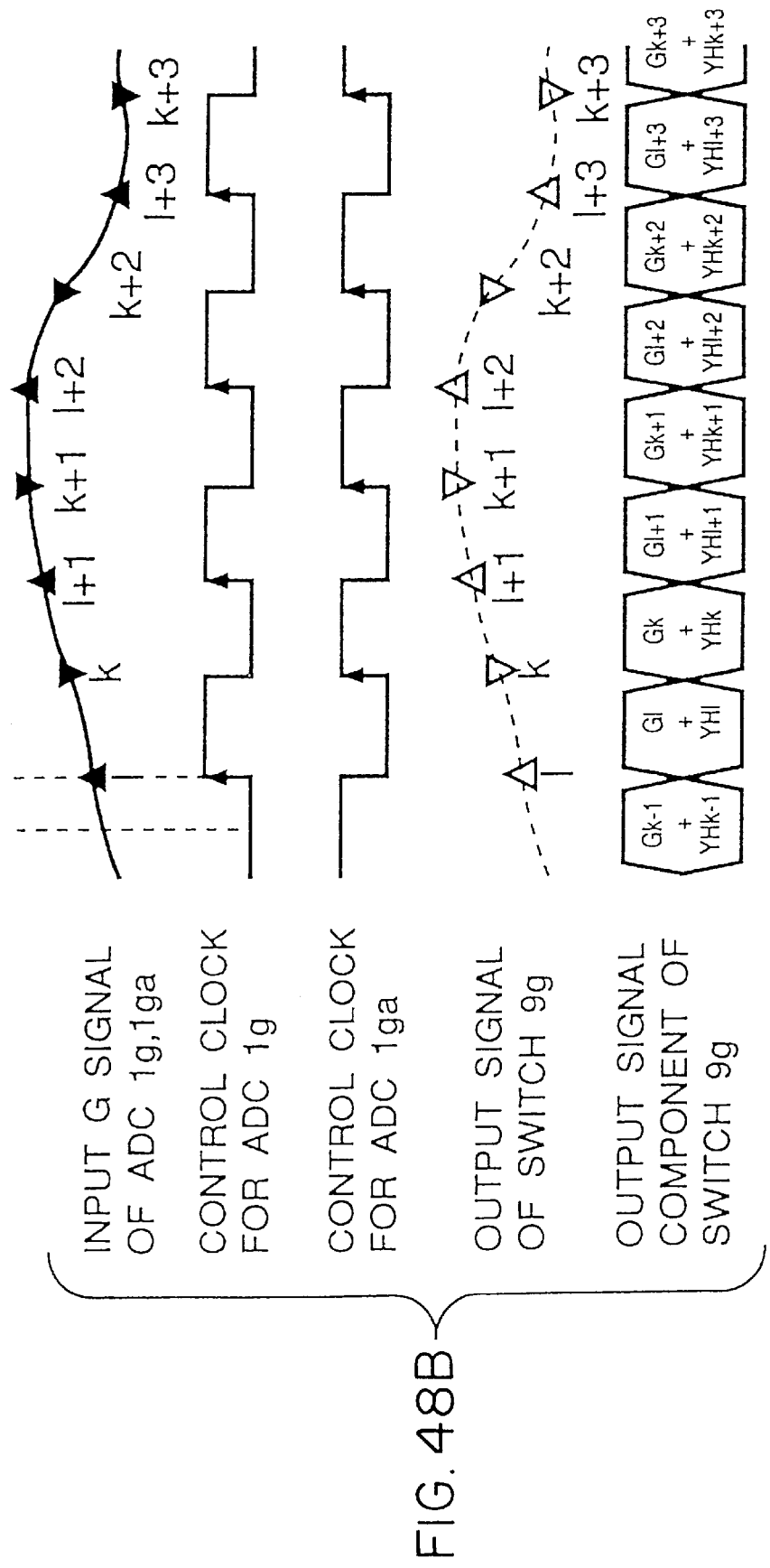
Figure 48C:
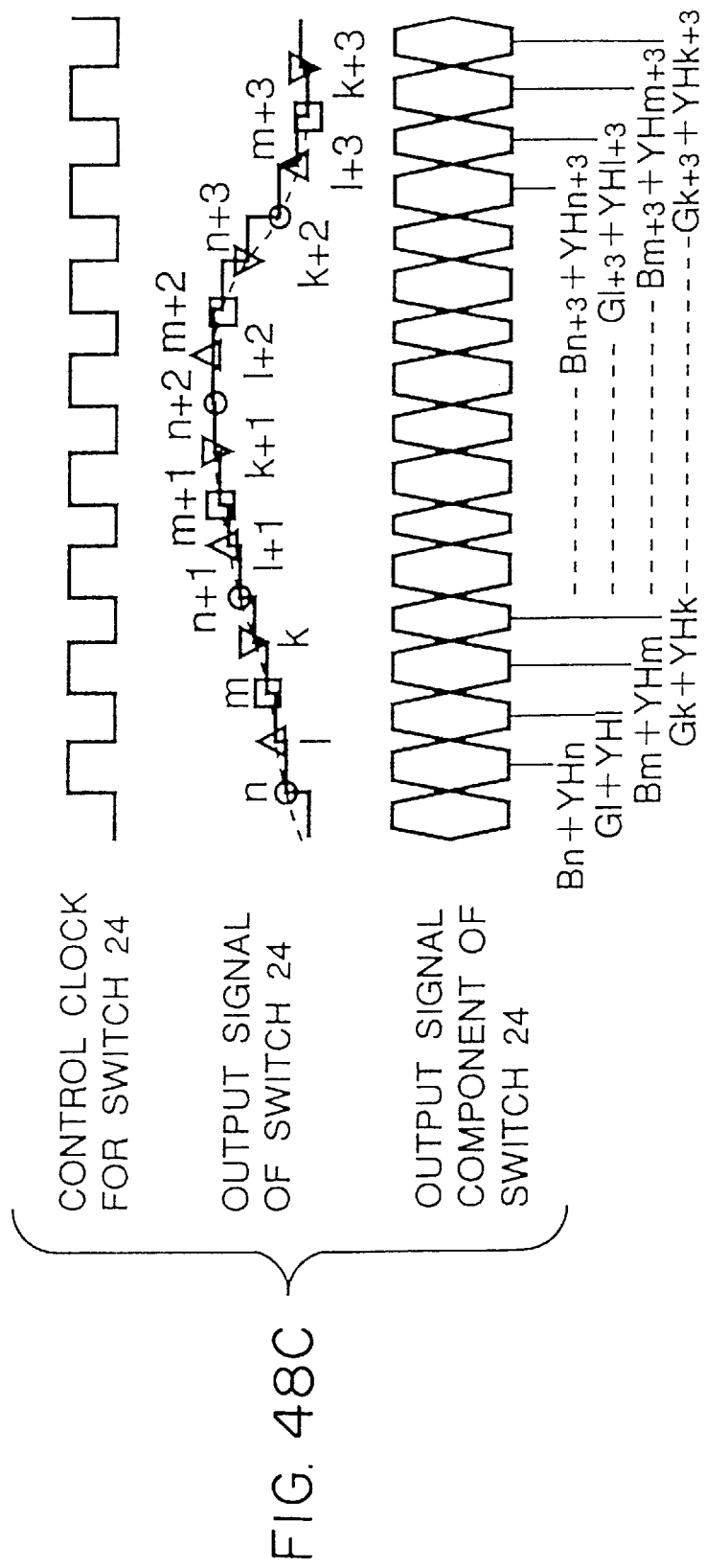

FIG. 48A to FIG. 48C show the waveforms of the signals at various nodes in the circuit of FIG. 47. FIG. 49A to FIG. 49F show the frequency distributions of the signal at various nodes in the circuit of FIG. 47. It is assumed that $f_{A/D}=f_{D/A}$.

Figure 49A:
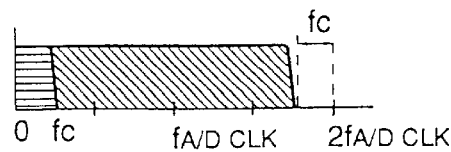
FIG. 49A to FIG. 49F are diagrams showing the frequency distributions of the signals at various points in the video signal processor of FIG. 47.

In the video signal processor of FIG. 47, the input G signal is band-limited to a frequency $(2f_{A/D}-f_C)$ by the LPF 4g, and is then input to the A/D converter 1g and 1ga. Similarly, the input B signal is band-limited to a frequency $(2f_{A/D}-f_C)$ by the LPF 4b, and is then input to the A/D converter 1ba and 1b. FIG. 49A shows the frequency distribution of the signals input to A/D converters 1b, 1ba, 1g and 1ga.

Each of the B signal processing circuit and the G signal processing circuit is similar to the prior art example of FIG. 14 in that it has a pair of A/D converters 1ga and 1g, or 1ba and 1b, operating in accordance with clocks having a phase difference of 180° from each other, to thereby effectively doubling the sampling frequency. There is however a phase difference of 90 between the clocks output from the frequency dividers 22 and 23 for the B signal processing circuit and the G signal processing circuit. As a result, the sampling points of the G signals, l, k, l+1, k+1, l+2, k+2, . . . are midway between the sampling points of the B signals, n, m, n+1, m+1, n+2, m+2, . . . , and the phase difference between the sampling points of the G signals and the sampling points of the B signals is 180°.

Figure 49B:
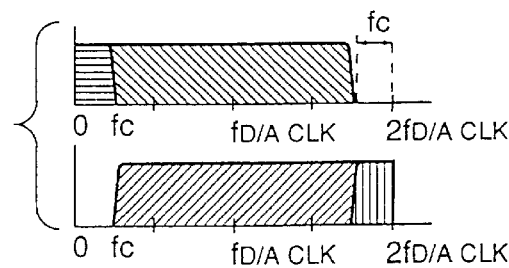

The output signals of the switches 9b and 9g have a frequency distribution shown in FIG. 49B. As illustrated, they contain aliasing noises from the frequency $2f_{D/A}$ of the control clocks for the switches 9b and 9g.

The LPF 12 removes the components other than the B chrominance signal component by band-limiting the signal to a frequency range of not higher than $f_C$. The output of the LPF 12 has a frequency distribution shown in FIG. 49D.

The switch 24 is controlled by the clock 2 $f_{D/A}$ to alternately selects the outputs of the switches 9b and 9g.

The output of the switch 24 has a waveform having a double sampling frequency as shown in FIG. 48C. It contains aliasing noises from the frequency $2f_{D/A}$ twice the frequency of the control clocks for the switches 9b and 9g, and aliasing noises from the frequency $4f_{D/A}$ two times the frequency $2f_{D/A}$ of the control clock for the switch 24.

Figure 49C:
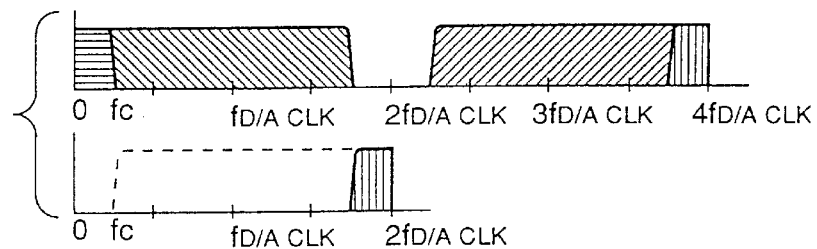
Figure 49D:
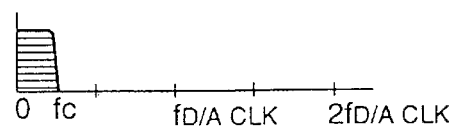

The aliasing noises from the frequency $2f_{D/A}$ comprise components for the luminance signal component Y. The aliasing noise component for the luminance signal component Y output from the B signal processing circuit and the aliasing noise component for the luminance signal component Y output from the G signal processing circuit have a phase difference of 180° and therefore cancel each other. As a result, the output of the switch 24 has a frequency distribution as shown in FIG. 49C, and its signal components are (Bn+YHn)+(Bm+YHm)+(Gl+YHl)+(Gk+YHk)

as shown in FIG. 48C.

The HPF 13 blocks the components lower than $f_C$, to thereby remove the B and G chrominance signal components from the output of the switch 24.

Figure 49E:
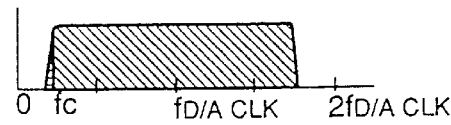

The LPF 14 band-limits the signal to a range of not higher than $(2f_{D/A}-f_C)$, thereby to remove the aliasing noises from $2f_{D/A}$ (the frequency twice the frequency of the control clock for the switches 9b and 9g) due to the B and G chrominance signal components, and the aliasing noises from $4f_{D/A}$ (twice the frequency of the control clock for the switch 24), and extract the luminance signal component. The output of the LPF 14 does not contain aliasing noises, as shown in FIG. 49E, and its components are YHn+YHm+YHl+YHk Thus, it consists only of luminance signal components.

Figure 49F:
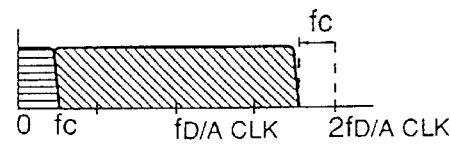

The adder 15 adds the B chrominance signal component from the LPF 12 and the luminance signal component YH from the LPF 14, to produce a B signal having a frequency distribution shown in FIG. 49F. The components of the B signal are B+YHn+YHm+YHl+YHk As has been described, in the video signal processor of the Embodiment B5, the luminance signal components YHl and YHk of the G signal having different sampling points are added to the B signal, and the sampling frequency with respect to the luminance signal components is doubled. It is however necessary to remove the aliasing noises from $2f_{D/A}$ due to the B and G chrominance signal components. As a result, output of the adder 15 has a bandwidth extended to $2f_{D/A}-f_C$.

Embodiment B6

FIG. 50 shows a video signal processor according another embodiment. The circuits identical or corresponding to those in the drawings previously referred to are denoted by identical reference numerals. It is similar to the embodiment of FIG. 47. However, it is additionally provided with an LPF 4r similar to LPF 4g or 4b and therefore having a passband of up to $2f_{A/DCLK}/2=f_{A/DCLK}$, an A/D converter 1ra controlled by the same clock as the A/D converter 1ga, another A/D converter 1r controlled by the same clock as the A/D converter 1g, field memories 2ra and 2r, switches 10a, 10, and 11. Instead of the inverter 8g, an inverter 8rg similar to the inverter 8g in that it receives and inverts the output of the frequency divider 23 is provided. Instead of the D/A converters 3ga and 3g, D/A converters 3rga and 3rg are provided. Instead of the switch 9g, a switch 9rg is provided. The output of the A/D converter 2ra is written in the field memory 2ra under control of the clock from the inverter 7rg. The data stored in the field memory 2ra is read under control of the clock from the inverter 8rg. The output of the A/D converter 2r is written in the field memory 2r under control of the clock from the frequency divider 22. The data stored in the field memory 2r is read under control of the clock from the frequency divider 23. The switch 10a selects one of the outputs of the field memories 2ra and 2ga in accordance with the RG select signal. The switch 10 selects one of the outputs of the field memories 2r and 2g in accordance with the RG select signal. The D/A converter 3rga D/A-converts the output of the switch 10a into an analog signal, being controlled by the clock as output from the inverter 8rg. The D/A converter 3rg D/A-converts the output of the switch 10 into an analog signal, being controlled by the clock from the frequency divider 23.

The switch 9rg alternately selects the outputs of the D/A converters 3rga and 3rg, under control by the clock from the frequency divider 23. The switch 11 selects one of the outputs of the switches 9rg and 9b in accordance with the RGB select signal.

For producing the R signal, the switch 10 is made to select the data from the field memory 2r, the switch 10a is made to select the data from the field memory 2ra, and the switch 11 is made to select the data from the switch 9rg.

For producing the G signal, the switch 10 is made to select the data from the field memory 2g, the switch 10a is made to select the data from the field memory 2ga, and the switch 11 is made to select the data from the switch 9rg.

For producing the B signal, the switch 11 is made to select the data from the switch 9b. The switch 10 and the switch 10a may be in an arbitrary position: they may be select either of their alternative inputs.

The R, G and B signals are selectively produced in sequence, each for a period of one field. When the R signal is produced, the luminance signal component of the B signal at different sampling points is added. When the G signal is produced, the luminance signal component of the B signal at different sampling points is added. When the B signal is produced, the luminance signal component of the R or G signal at different sampling points is added.

The signal bandwidth of the output of the video signal processor of this embodiment is $2f_{A/D}-f_C$.

Embodiment B7

Figure 51:
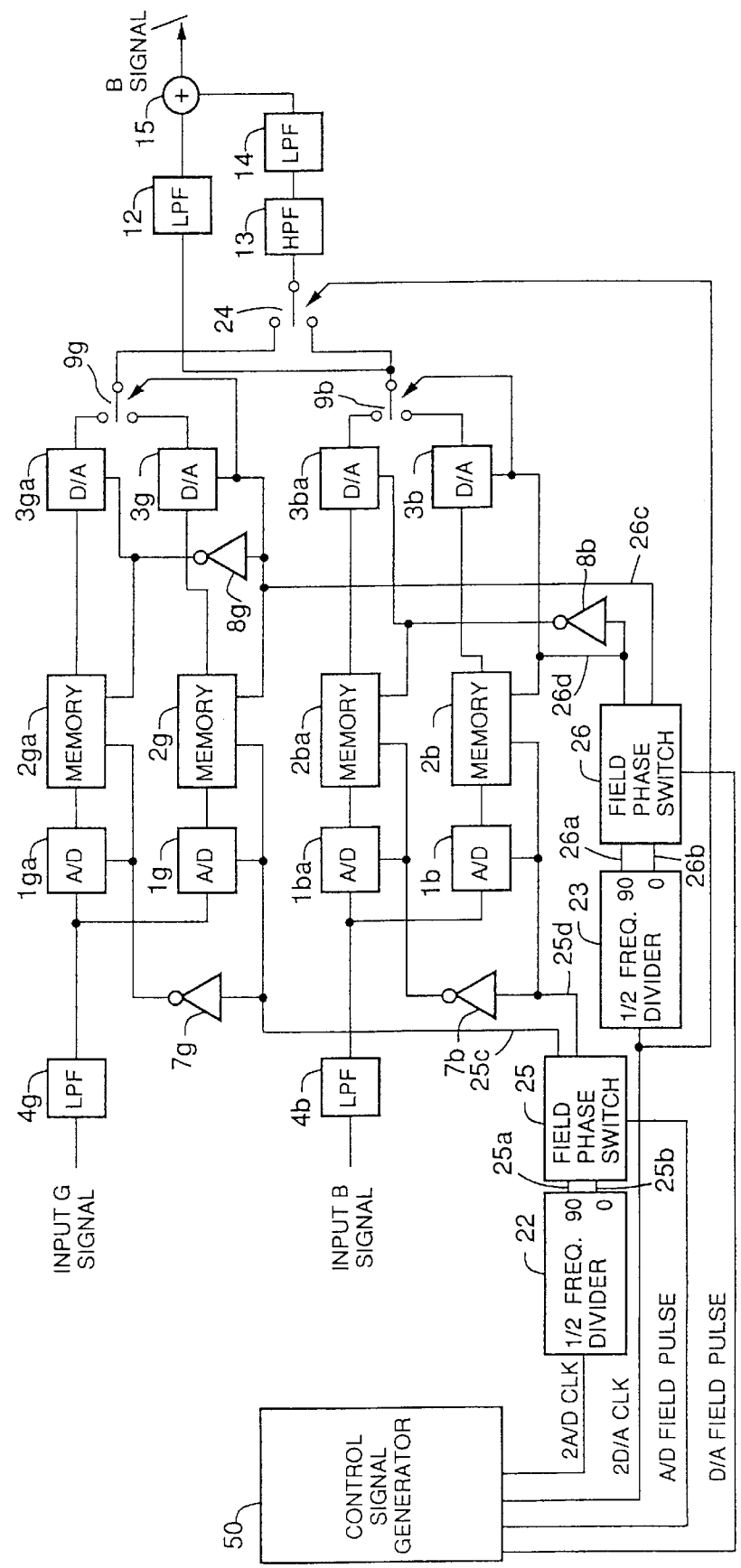
FIG. 51 is a block diagram showing a part of a video signal processor of another embodiment of the invention.

FIG. 51 shows a video signal processor of another embodiment of the invention. FIG. 51 shows only such part of the video signal processor which relates to production of the decoded color signal, e.g., B signal, of a plurality of colors. The circuits identical or corresponding to those in the drawings previously referred to are denoted by identical reference numerals. It is similar to the embodiment of FIG. 47. However, it is additionally provided with field phase switching circuits 25 and 26.

The field phase switching circuit 25 receives, at its first and second terminals 25a and 25b, the outputs of the frequency divider 22 having a 90° phase difference, and outputs them through its first and second output terminals 25c and 25d in an alternate fashion.

Figure 52:
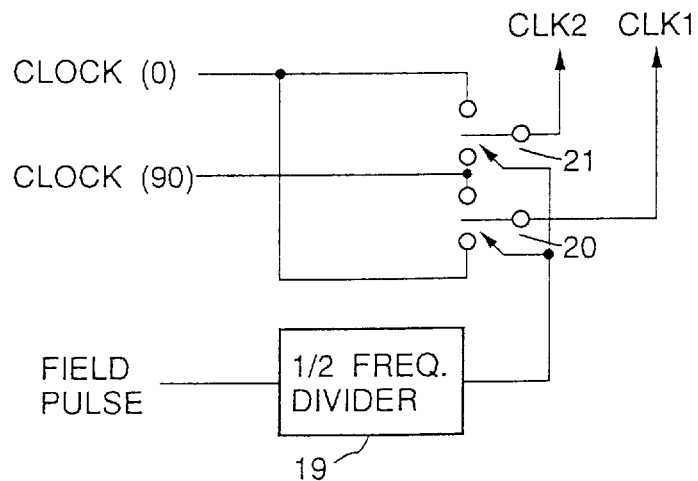
FIG. 52 is a block diagram showing an example of the field phase switching circuit used in the video signal processor of FIG. 51.
Figure 53:
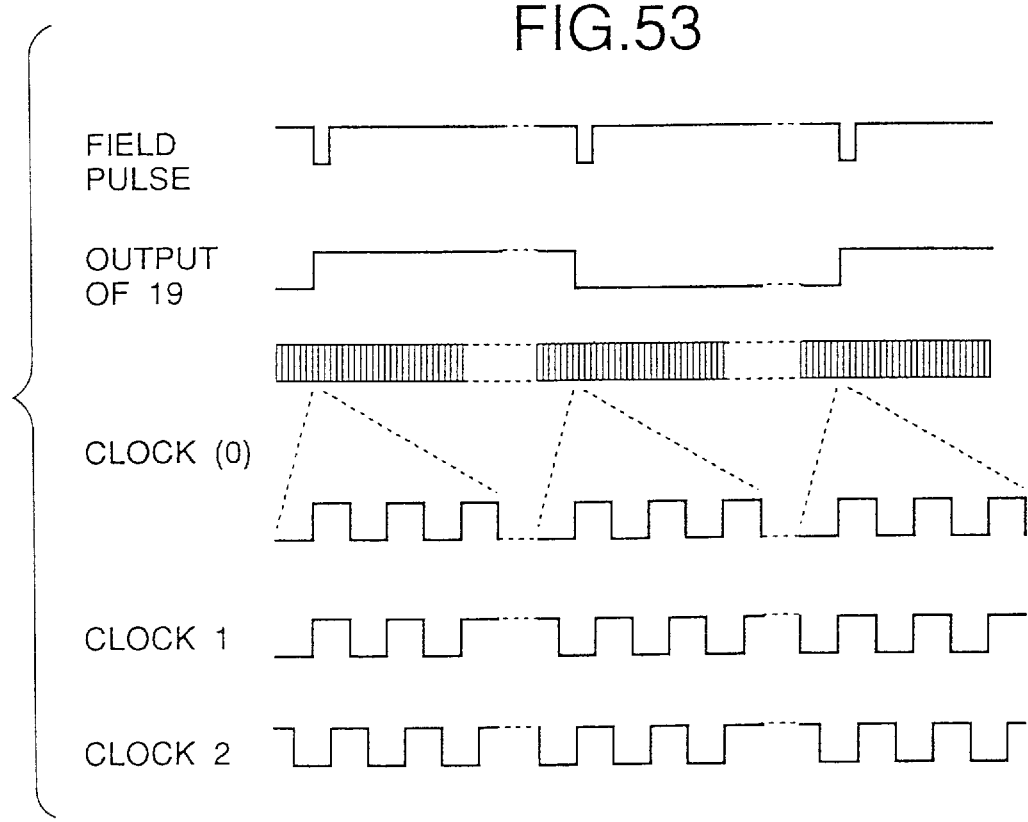
FIG. 53 is a time charts showing the waveforms of the signals at various points in the circuit of FIG. 52.

An example of the field phase switching circuit 25 is illustrated in FIG. 52, and the waveforms of the signals at various points in the circuit of FIG. 52 are illustrated in FIG. 53. As illustrated in FIG. 52, the field phase switching circuit 25 comprises a first switch 20 alternately selecting the two input clocks (clock (0) an clock (90)) and a second switch 21 alternately selecting the two input clocks. The switches 20 and 21 select different input clock at any time. The switching occurs responsive to an output of a frequency divider 19 receiving the A/D field pulses, and hence once per two fields, as illustrated in FIG. 53.

The field phase switching circuit 26 is similarly composed of, but receives the outputs of the frequency divider 23 (instead of the frequency divider 22) and the D/A field pulses instead of the A/D field pulses).

The inverter 7g inverts the clock from the first output terminal 25c of the first field phase switching circuit 25. The inverter 7b inverts the clock from the second output terminal 25d of the first field phase switching circuit 25. The inverter 8g inverts the clock from the first output terminal 26c of the second field phase switching circuit 26. The inverter 8b inverts the clock from the second output terminal 26d of the second field phase switching circuit 26.

FIG. 54A to FIG. 54F show frequency distributions at various points in the video signal processor of the embodiment of FIG. 51. It is assumed that $f_{A/D}=f_{D/A}$.

The A/D conversion by the A/D converter 1ga and the writing in the field memory 2ga are controlled by the clock from the inverter 7g. The A/D conversion by the A/D converter 1g and the writing in the field memory 2g are controlled by the clock from the first output 25c of the field phase switching circuit 25. The clock from the inverter 7g and the clock from the first output 25c of the field phase switching circuit 25 are complementary to each other.

Figure 54A:
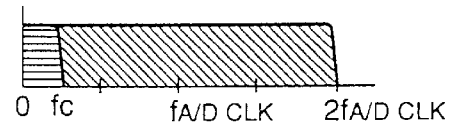
FIG. 54A to FIG. 54F are diagrams showing the frequency distributions at various points in the video signal processor of FIG. 51.

The A/D conversion at the A/D converter 1ba and the writing in the field memory 2ba are controlled by the clock from the inverter 7b. The A/D conversion at the A/D converter 1b and the writing in the field memory 2b are controlled by the clock from the first output 26c of the field phase switching circuit 26. The clock from the inverter 7b and the clock from the. first output 26c of the field phase switching circuit 26 are complementary to each other. The frequency distribution of the input signals of A/D converters 1b, 1ba, 1g, and 1ga is shown in FIG. 54A.

The reading from the field memory 2ga and D/A conversion at the D/A converter 3ga are controlled by the clock from the inverter 8g. The reading from the field memory 2g, D/A conversion at the D/A converter 3g and the switching operation of the switch 9b are controlled by the clock from the first output 26c of the second field-phase switching circuit 26. The clock from the inverter 8g and the clock from the first output 26c of the second field-phase switching circuit 26 are complementary to each other. The reading from the field memory 2ba and D/A conversion at the D/A converter 3ba are controlled by the clock from the inverter 8b. The reading from the field memory 2b, D/A conversion at the D/A converter 3b and the switching operation of the switch 9b are controlled by the clock from the second output 26d of the second field-phase switching circuit 26. The clock from the inverter 8b and the clock from the second output 26d of the second field-phase switching circuit 26 are complementary to each other.

The phases of the control clocks supplied to the B signal system and the G signal system are shifted by 90° every field. That is, the phases of the sampling points are shifted by 180° every field. The aliasing noises from the frequency $2f_{D/A}$, twice the frequency of the control clock for the switches 9b and 9g are also shifted by 180° every field.

Figure 54B:
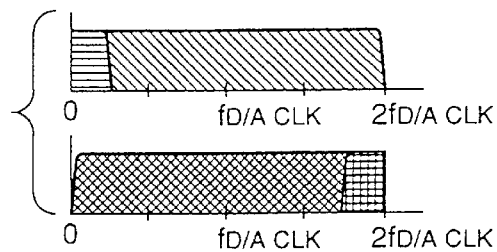

The outputs of the switches 9b and 9g have frequency distribution shown in FIG. 54B. Since the aliasing noises from $2f_{D/A}$ are shifted by 180° every field, they are effectively canceled to the human eyes, with regard both to luminance and chrominance signal components. The output of switch 9b is supplied to LPF 12. The frequency distribution of the output of LPF 12 is shown in FIG. 54D.

Figure 54C:
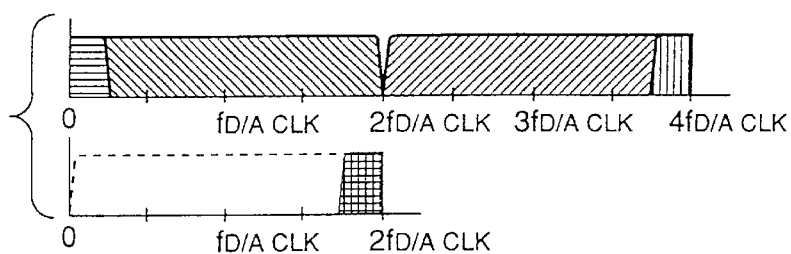
Figure 54D:
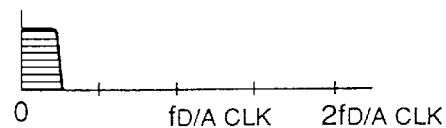
Figure 54E:
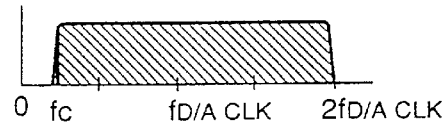
Figure 54F:
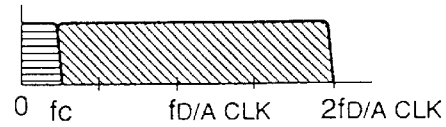
Figure 54G:
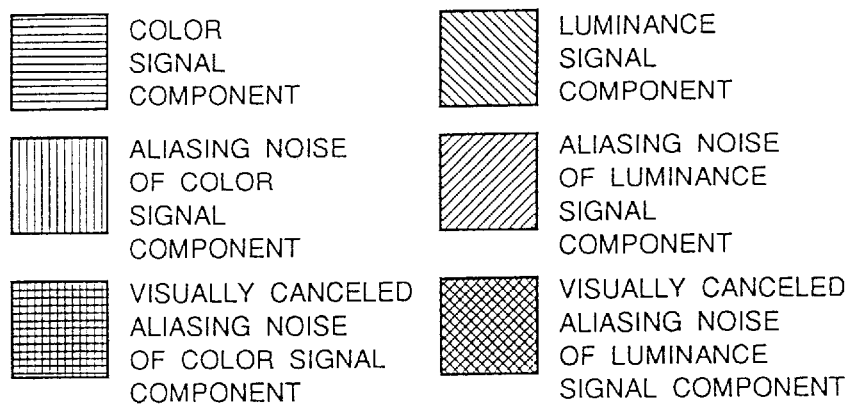
FIG. 54G is a diagram explaining the meaning of each type of hatching in FIG. 54A to FIG. 54F.

The output of the switch 24 has, as in Embodiment B5 of FIG. 47, a frequency distribution shown in FIG. 54C which contains aliasing noises from $2f_{D/A}$. The aliasing noise from $2f_{D/A}$ of the chrominance signal component is canceled to the human eyes, so that, unlike Embodiment B5, it is unnecessary to remove the aliasing noises of the chrominance signal from $2f_{D/A}$, by the use of the LPF 14. FIG. 54E illustrates the frequency distribution of the output of LPF 14. An adder 15 then adds the outputs of the LPF 14 and the LPF 12. FIG. 54F illustrates the frequency distribution of the output adder 15.

The LPF 14 in this embodiment is used for removing the aliasing noise from $4f_{D/A}$.

It is therefore possible to expand the signal bandwidth up to $2f_{A/D}$, which is twice the frequency of the control clocks for the A/D converters 1b, 1ba, 1g and 1ga, which is the passband of the LPF 4g and 4b.

Embodiment B8

Figure 55:
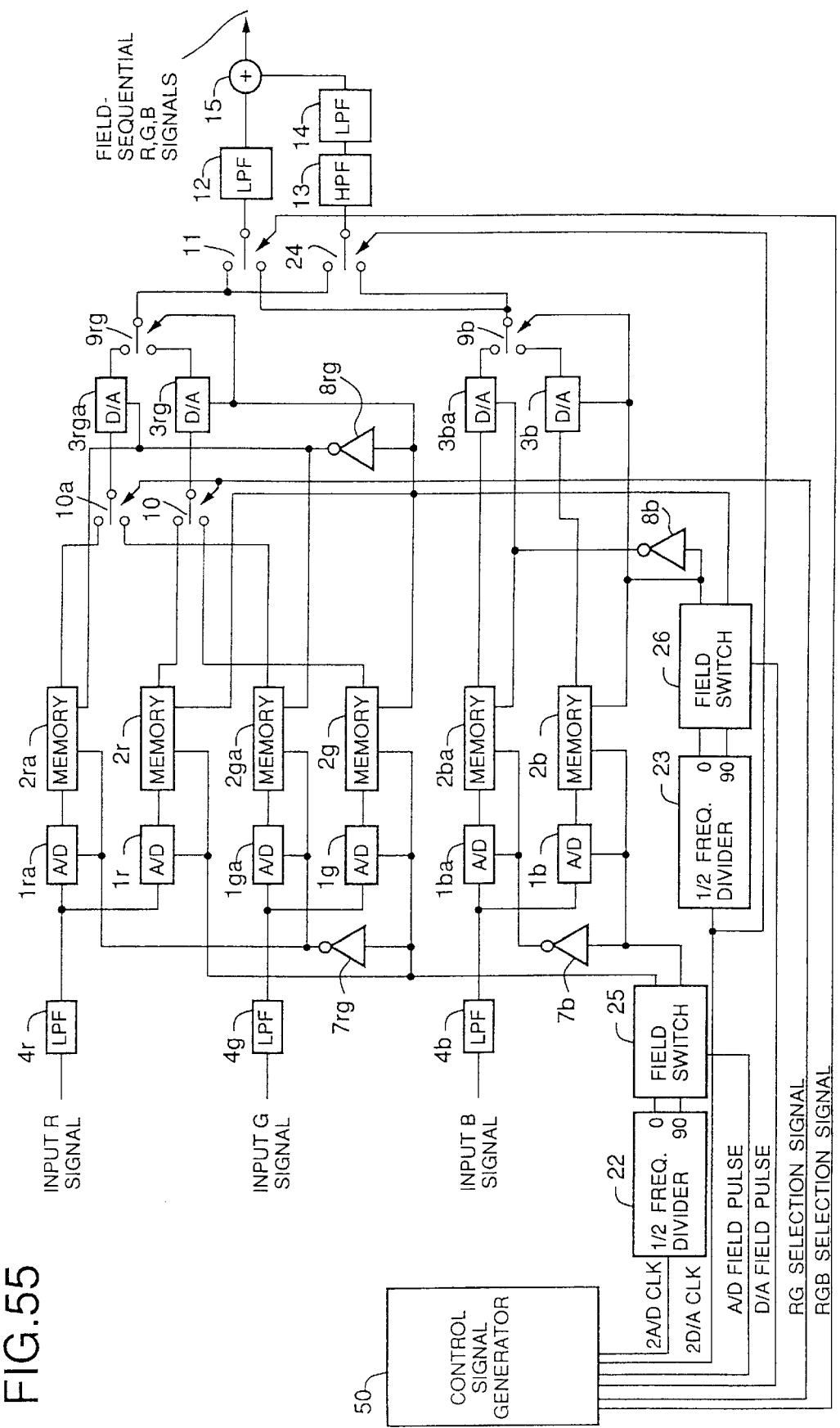
FIG. 55 is a block diagram showing a video signal processor of another embodiment of the invention.

FIG. 55 shows a video signal processor of another embodiment of the invention. The circuits identical or corresponding to those in the drawings previously referred to are denoted by identical reference numerals. It is similar to the embodiment of FIG. 50. However, it is additionally provided with field phase switching circuits 25 and 26, as in Embodiment B7 of FIG. 51.

The clock from the first output terminal 25c of the first field phase switching circuit 25 is used for control over the A/D conversion at the A/D converters 1r and 1g, and writing into the field memories 2r and 2g. The clock from the inverter 7rg is used for control over A/D conversion at the A/D converters 1ra and 1ga and writing into the field memories 2ra and 2ga. The clock from the second output terminal 25d of the first field phase switching circuit 25 is used for control over the A/D conversion at the A/D converter 1b, and writing into the field memory 2b. The clock from the inverter 7b is used for control over A/D conversion at the A/D converter 1ba and writing into the field memory 2ba.

The clock from the first output terminal 26c of the second phase switching circuit 26 is used for control over reading from the field memories 2r and 2g and D/A conversion at the D/A converter 3rg and the switching operation of the switch 9rg. The clock from the inverter 8rg is used for control over reading from the field memories 2ra and 2ga and D/A conversion at the D/A converter 3rga.

The clock from the second output terminal 26d of the second phase switching circuit 26 is used for control over reading from the field memory 2b and D/A conversion at the D/A converter 3b and the switching operation of the switch 9b. The clock from the inverter 8b is used for control over reading from the field memory 2ba and D/A conversion at the D/A converter 3ba.

The rest of configuration and operation are identical to those described with reference to Embodiment B6 of FIG. 50 and Embodiment B7 of FIG. 51.

The signal bandwidth obtained by Embodiment B8 is $2f_{A/D}$.

Embodiment B9

Figure 56:
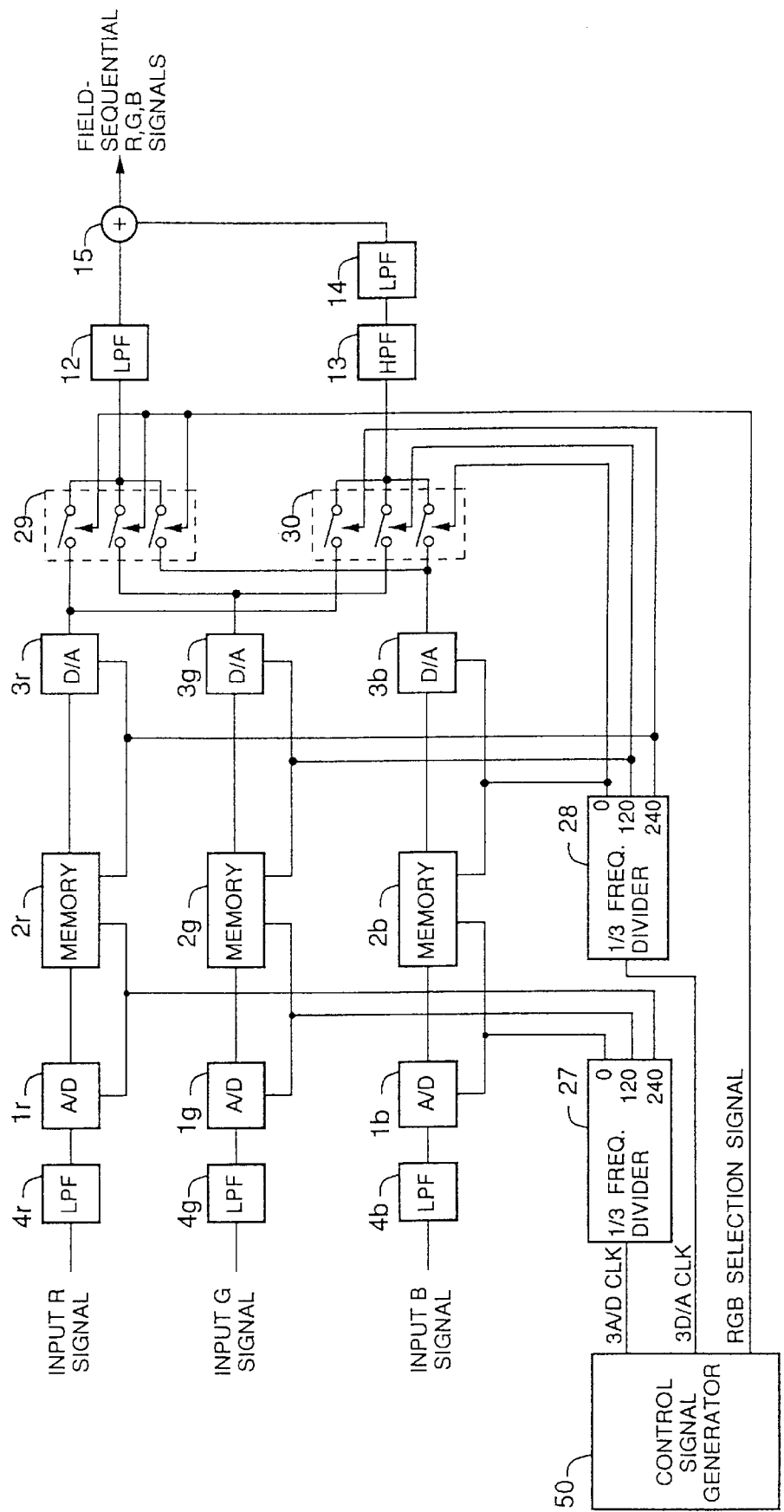
FIG. 56 is a block diagram showing a video signal processor of another embodiment of the invention.

FIG. 56 shows another embodiment of the video signal processor. The circuits identical or corresponding to those in the drawings previously referred to are denoted by identical reference numerals. It is similar to Embodiment B1 of FIG. 35. However, in place of the A/D converter 1ga, the field memory 2ga and the D/A converter 3ga, an A/D converter 1g, a field memory 2g and a D/A converter 3g are provided. Additionally, an LPF 4r, an A/D converter 1r, a field memory 24 and a D/A converter 3r are provided. Further provided are a frequency divider 27 receiving a clock (3A/DCLK) with a frequency of 3f A/DCLK and frequency-dividing it by three to produce three clocks having phase differences 120° from each other, a frequency divider 28 receiving a clock (3D/ACLK) with a frequency of 3f D/ACLK and frequency-dividing it by three to produce three clocks having phase differences 120° from each other, a switch 29 sequentially and repeatedly selecting the outputs of the D/A converters 3r, 3g and 3b in accordance with the RGB selection signal, and a switch 30 sequentially and repeatedly selecting the outputs of the D/A converters 3r, 3g and 3b in accordance with the three clocks from the frequency divider 28. The output of the switch 29 is supplied to the LPF 12. The output of the switch 30 is supplied to the HPF 13.

FIG. 57A to FIG. 57F show the frequency distribution at various nodes of the video signal processor of FIG. 56.

It is assumed that $f_{A/D}=f_{D/A}$.

Figure 57A:
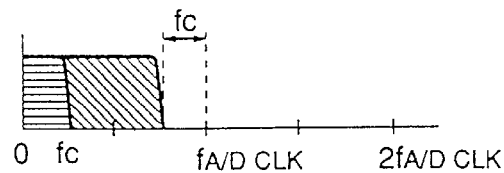

The input R, G and B signals are band-limited by the LPFs 4r, 4g and 4b to a frequency ($f_{A/D}-f_C$), where $f_{A/D}$ is the frequency of the control clock $f_{A/D}$ for the A/D converters 1r, 1g and 1b and $f_C$ is the bandwidth of the chrominance signal. As a result, signals having a frequency distribution shown in FIG. 57A are supplied to the A/D converters 1r, 1g and 1b.

Figure 13:
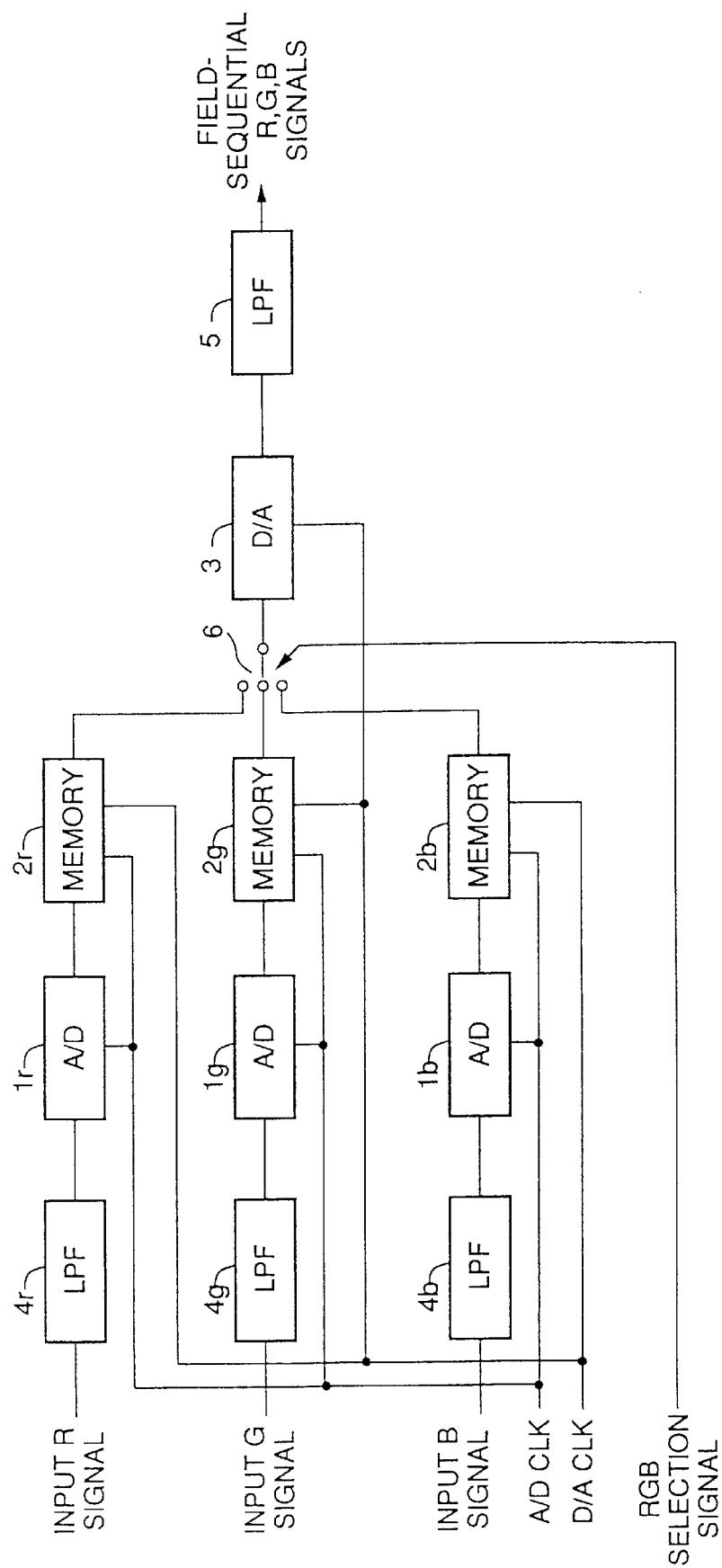
FIG. 13 is a block diagram showing a video signal processor of another prior art example.
Figure 15A:
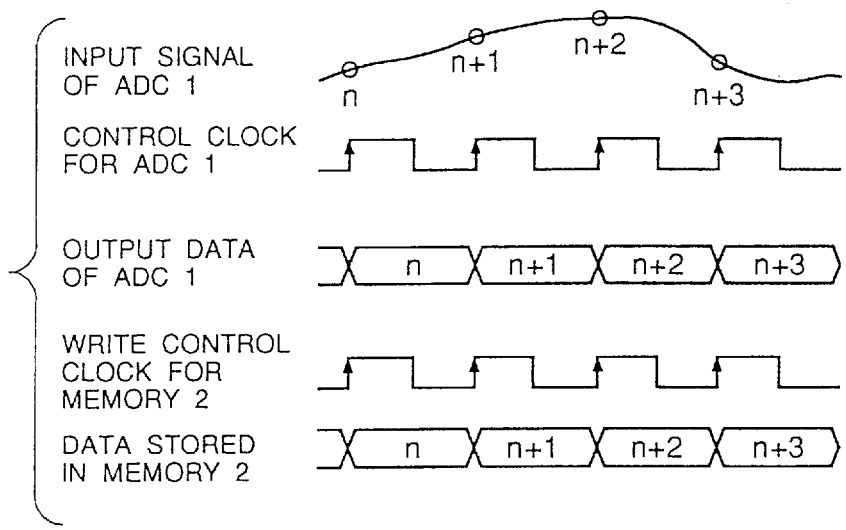
FIG. 15A and FIG. 15B are diagrams showing waveforms and values of the signals at various points in the video signal processor of FIG. 14.
Figure 15B:
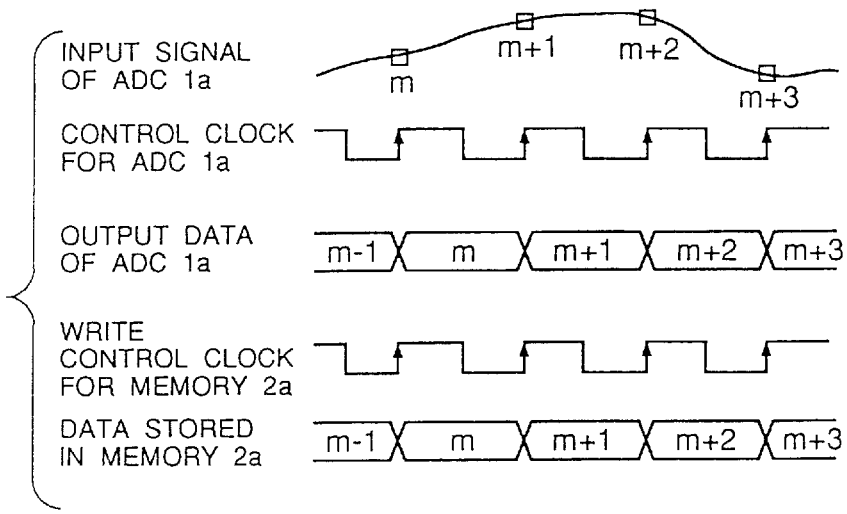
Figure 16A:
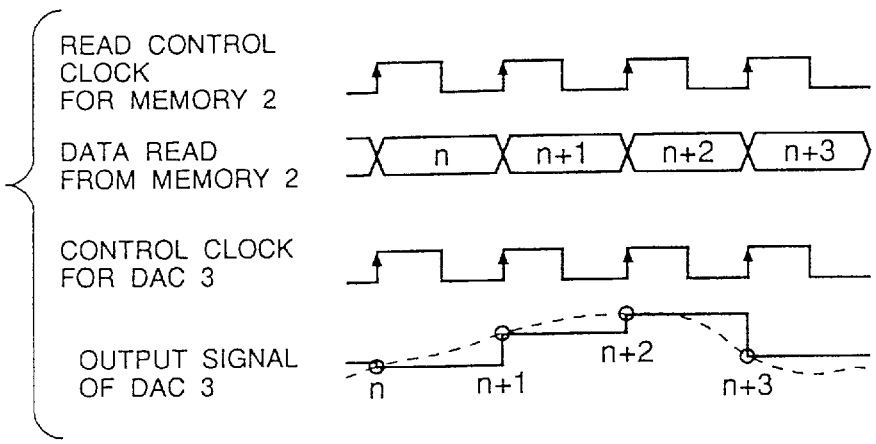
FIG. 16A to FIG. 16C are diagrams showing waveforms and values of the signals at various points in the video signal processor of FIG. 14.
Figure 16B:
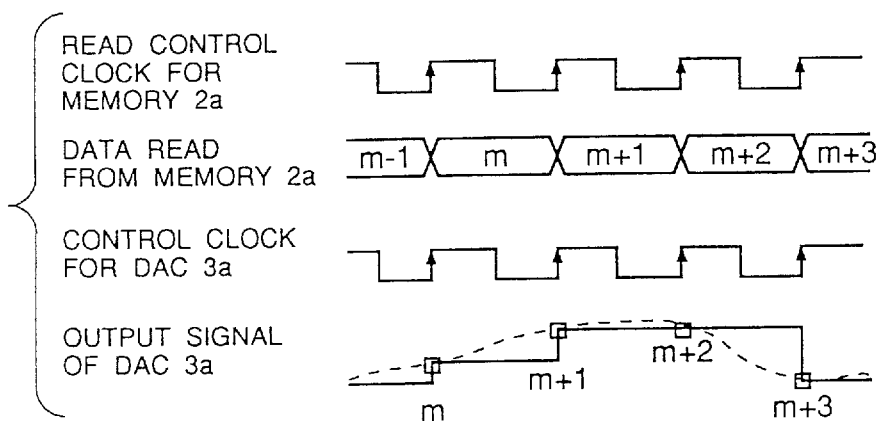
Figure 16C:
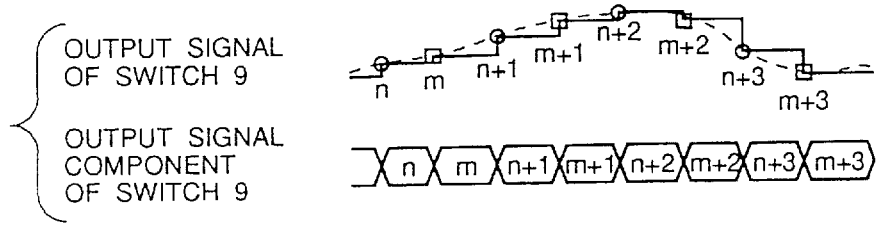
Figure 17A:
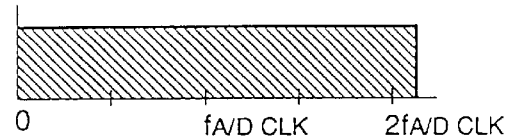
FIG. 17A to FIG. 17F are diagrams showing the frequency distributions at various points in the video signal processor of FIG. 14.
Figure 17B:
Figure 17C:
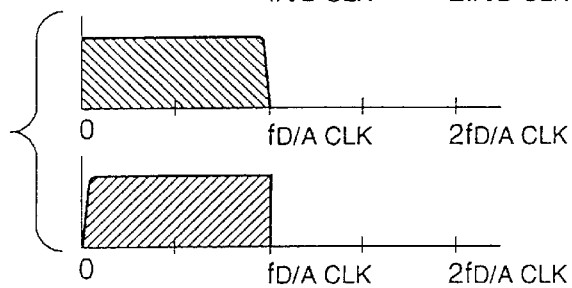
Figure 17D:
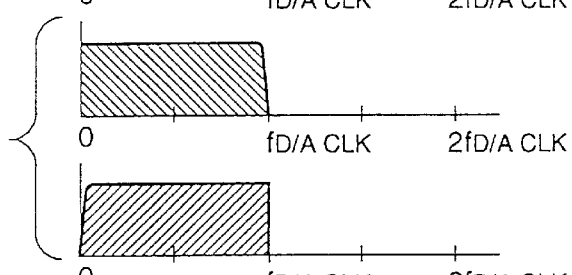
Figure 17E:
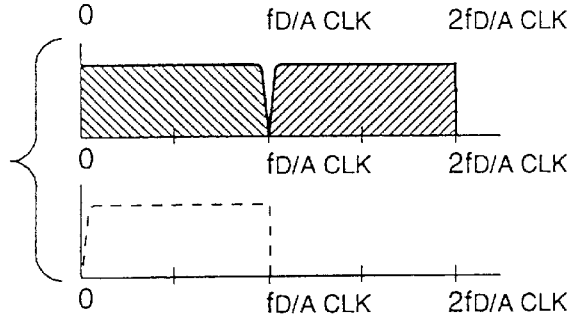
Figure 17F:
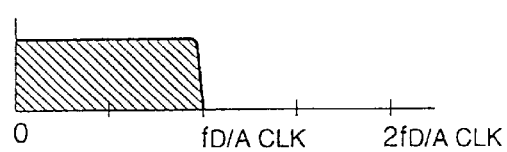
Figure 17G:
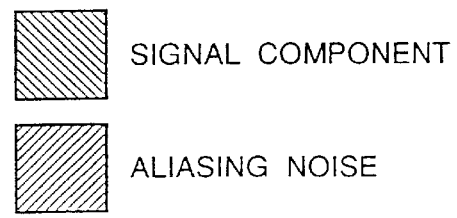
FIG. 17G is a diagram explaining the meaning of each type of hatching in FIG. 17A to FIG. 17D.
Figure 18:
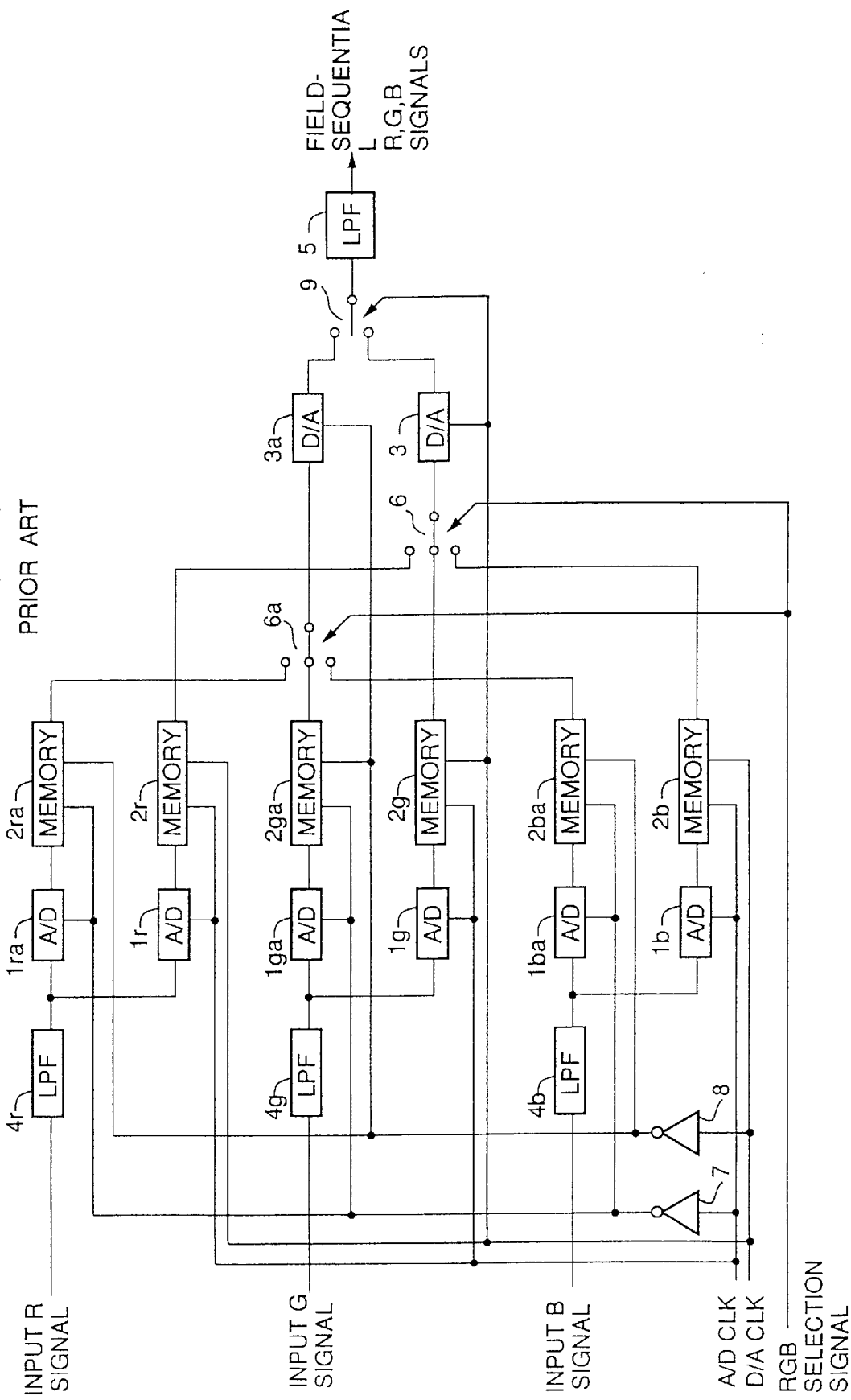
FIG. 18 is a block diagram showing a video signal processor of another prior art example.

The A/D converters 1r, 1g and 1b, the field memories 2r, 2g and 2b, D/A converters 3r, 3g and 3b operate in the same way as those of the prior art example of FIG. 13. However, these circuits components are controlled by three clocks having 120° phase differences.

Figure 57B:
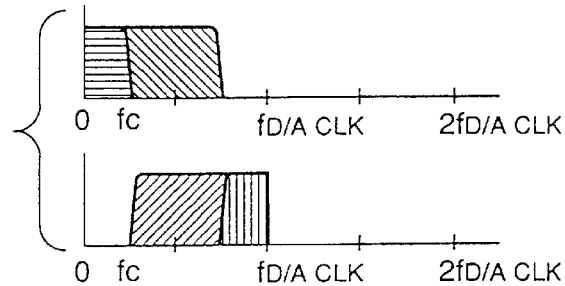
Figure 57C:
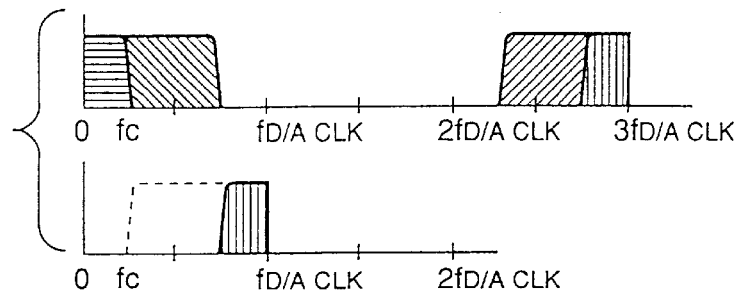
Figure 57D:
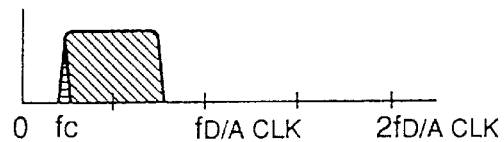

The outputs of the D/A converters 3r, 3g and 3b contain aliasing noises from $f_{D/A}$ of the control clocks for the D/A converters 3g, 3g and 3b, as illustrated in FIG. 57B. The switch 29 selects the outputs of the D/A converters 3r, 3g and 3b in accordance with the RGB selection signal to produce field-sequential R, G and B signals.

Figure 57E:
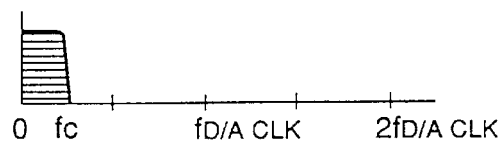

The LPF 12 band-limits the output of the switch 29 to the frequency range of up to $f_C$ (band-width of the chrominance signal component) to extract the chrominance signal component alone to produce RGB field-sequential chrominance signal components having a frequency distribution shown in FIG. 57E.

The switch 30 is controlled by three clocks having 120° phase differences, and selects the outputs of the D/A converters 3r, 3g and 3b having a frequency distribution shown in FIG. 57B. The output of the switch 30 contains aliasing noise from the frequency $f_{D/A}$ of the control clock for the D/A converters 3r, 3g and 3b, and aliasing noise from the frequency $3f_{D/A}$ of the switching operation of the switch 30.

Of the noises from $f_{D/A}$, the aliasing noise component of the luminance signal component have 120° phase differences (because the sampling points of the three colors are 120° apart from each other), so that they cancel each other to the human eyes. The output of the switch 30 therefore has a frequency distribution shown in FIG. 57C.

The HPF 13 blocks the components not higher than the bandwidth $f_C$ of the chrominance signal, and therefore removes the chrominance signal component contained in the output of the switch 30.

The LPF 14 band-limits the output of the HPF 13 to a frequency range of up to $f_{D/A}-f_C$. The aliasing noise from $f_{D/A}$ of the chrominance signal and the aliasing noise from $3f_{A/D}$ of the switching operation of the switch 30 are thereby removed. The output of the LPF 14 has a frequency distribution shown in FIG. 57D.

Figure 57F:
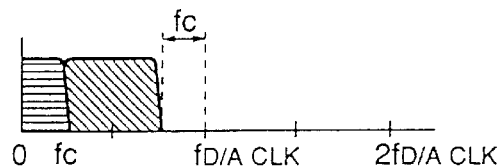

The adder 15 adds the chrominance signal component from the LPF 12 and the luminance signal component from the LPF 14 to produce a field-sequential RGB signal having a frequency distribution shown in FIG. 57F.

In the sequential control of the video signal processor having an expanded signal bandwidth, when the R signal is output, the luminance signal components of the G signal and the B signal having different sampling points are added, when the G signal is output, the luminance signal components of the B signal and the R signal having different sampling points are added, and when the B signal is output, the luminance signal components of the R signal and the G signal having different sampling points are added.

As has been described, in the video signal processor of Embodiment B9, the R signal contains the luminance signal component of the G signal having a 120° phase difference, and the luminance signal component of the B signal having a 240° phase difference. As a result, the sampling frequency is trebled as compared with the prior art example of FIG. 13. However, as it is necessary to remove the aliasing noise from $f_{D/A}$, the frequency band of the output signal is expanded up to $f_{D/A}-f_C$.

That is, the signal bandwidth of the video signal processor can be expanded to $f_{A/D}-f_C$.

Embodiment B10

Figure 58:
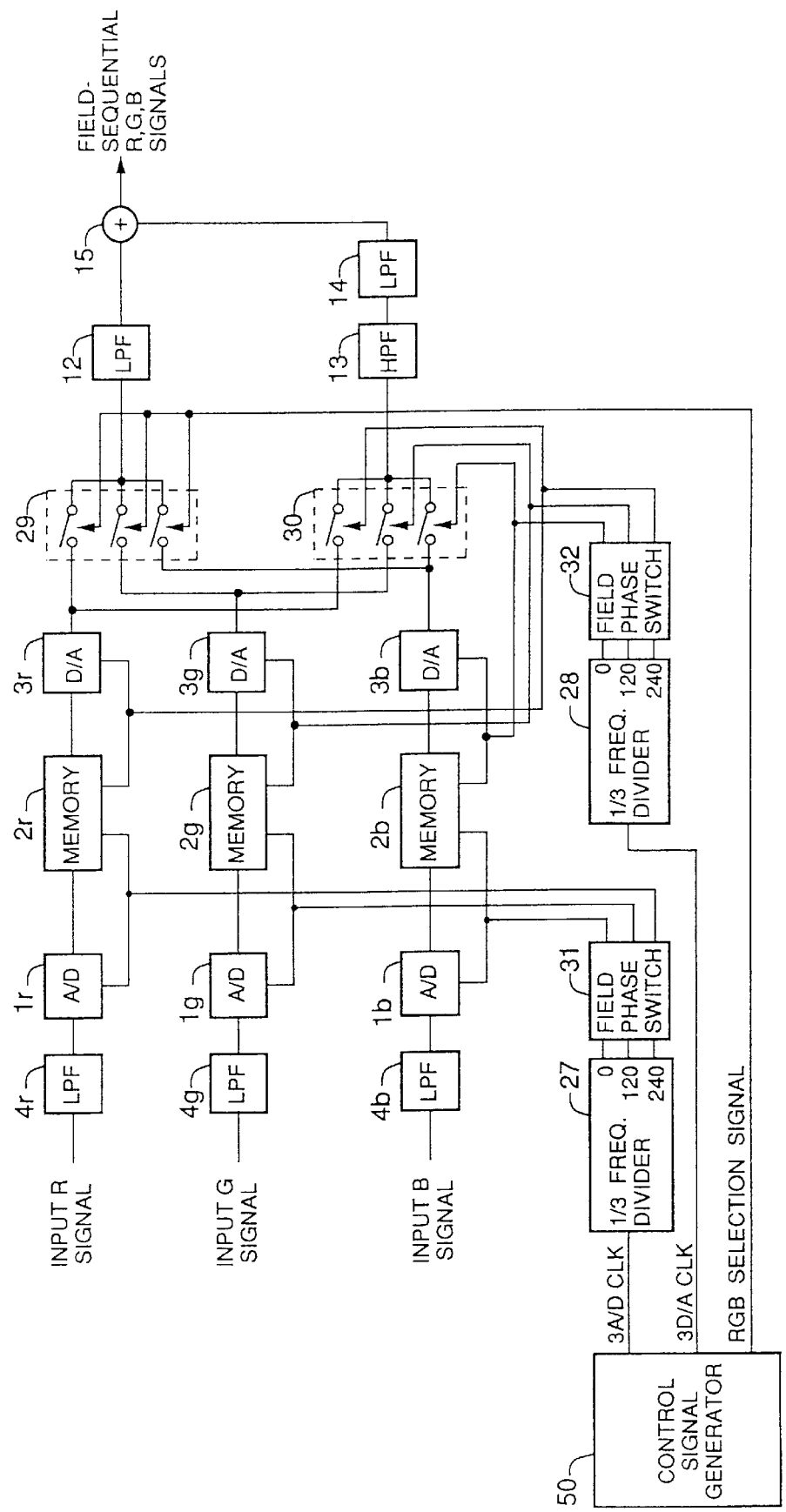
FIG. 58 is a block diagram showing a video signal processor of another embodiment of the invention.

FIG. 58 shows a video signal processor of another embodiment of the invention. The circuits identical or corresponding to those in the drawings previously referred to are denoted by identical reference numerals. It is similar to Embodiment B9 of FIG. 56. However, it is additionally provided with field phase switching circuits 31 and 32, as in Embodiment B7 of FIG. 51 and Embodiment B8 of FIG. 55.

The field phase switching circuit 31 receives a set of three clocks from the frequency divider 27 and produces a set of three clocks having phase differences of 120° and having their phases shifted by 120° every field. The field phase switching circuit 32 receives a set of three clocks from the frequency divider 28 and produces a set of three clocks having phase differences of 120° and having their phases shifted by 120° every field.

Figure 59:
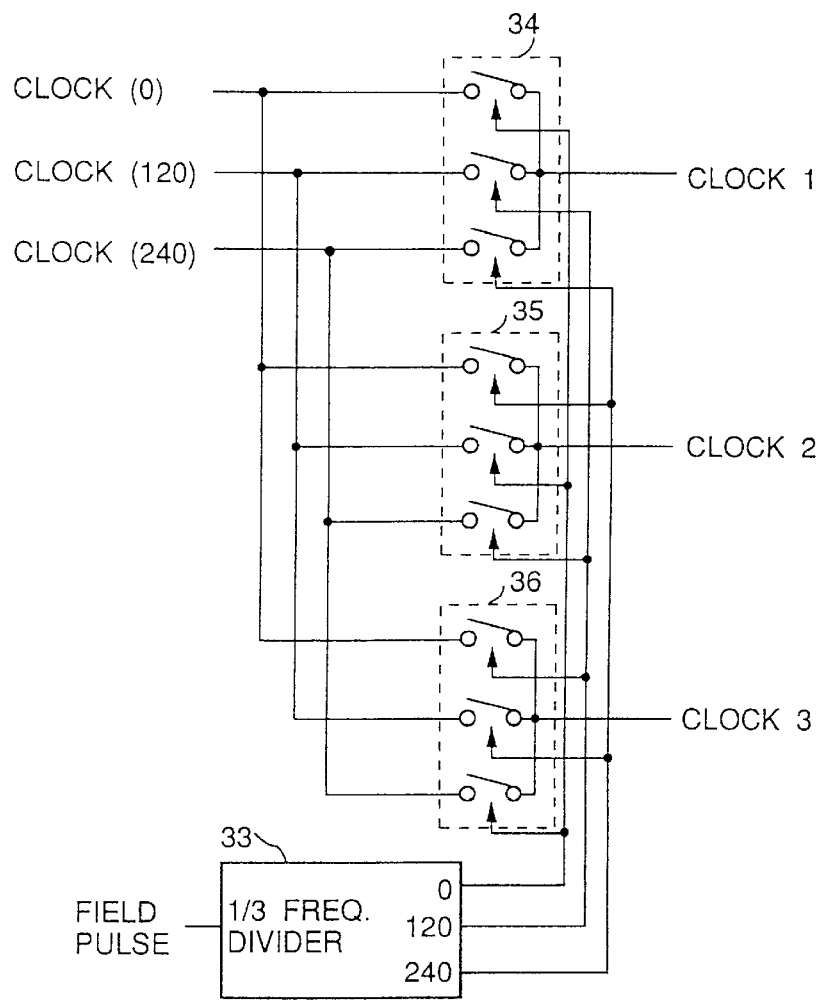
FIG. 59 is a block diagram showing an example of field phase switching circuit used in the embodiment of FIG. 58.
Figure 60:
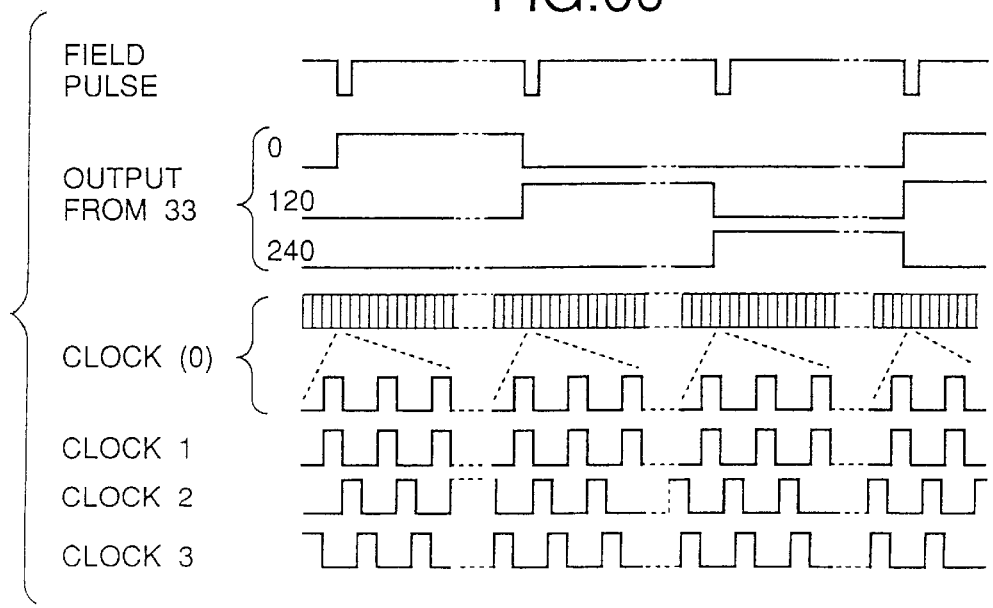
FIG. 60 is a time charts showing the waveforms of the signals at various points in the circuit of FIG. 59.

An example of the field phase switching circuit 31 is shown in FIG. 59, and the waveforms of the signals at various points in the circuit of FIG. 59 are shown in FIG. 60.

As illustrated, the field phase switching circuit 31 comprises a frequency divider 33 and switches 34 to 36. The frequency divider 33 receives the A/D field pulses, and divides the frequency of the field pulses by three to produce a set of three clocks having a frequency one third of the input frequency, and having phases 120 different from each other. The switches 34 to 36 receive the set of three clocks from the frequency divider (FIG. 58), and sequentially select them.

The selection is so made that the clocks output from the switches 34 to 36 are 120° out of phase from each other, and the phase relation between the outputs of the switches 34 to 36 are kept maintained (that is, the output of the switch 34 is always ahead of the the output of the switch 35 by 120°, and the output of the switch 35 is always ahead of the output of the switch 36 by 120°, and the output of the switch 36 is always ahead of the output of the switch 34 by 120°. That is, when the switch 34 selects the first clock (0) the second switch 35 selects the second clock (120) and the third switch 36 selects the third clock (240); when the first switch 34 selects the second clock (120) the second switch 35 selects the third clock (240) and the third switch 36 selects the first clock (120); and when the first switch 34 selects the third clock (240) the second switch 35 selects the first clock (0) and the third switch 36 selects the second clock (120).

The field phase inverter 32 is similarly composed of, but receives the D/A field pulses (instead of the A/D field pulses), and the oututs of the frequency divider 28 (instead of the frequency divider 27).

In the sequential control of the video signal processor having an expanded signal bandwidth, when the R signal is output, the luminance signal components of the G signal and the B signal having different sampling points are added, when the G signal is output, the luminance signal components of the B signal and the R signal having different sampling points are added, and when the B signal is output, the luminance signal components of the R signal and the G signal having different sampling points are added. It is again assumed that $f_{D/A}=f_{A/D}$.

Figure 61A:
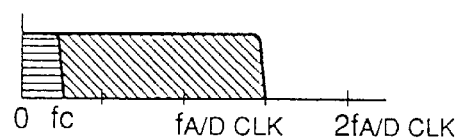
FIG. 61A to FIG. 61F are diagrams showing the frequency distributions at various points in the video signal processor of FIG. 58.

The input R, G and B signals are band-limited by the LPFs 4r, 4g and 4b to a frequency 1.5 $f_{A/D}$, 1.5 times the frequency of the control clock for the A/D converters 1r, 1g and 1b. The outputs of the LPFs 4r, 4g and 4b are supplied to the A/D converters 1r, 1g and 1b. Fig. 61A illustrates the frequency distribution of the input signals of A/D converters 1r, 1g, 1b.

The phase of the control clock to each of the color circuits are shifted by 120° every field. The phase of the sampling points of each color circuit is also shifted by 120° every field. The aliasing noise from $f_{D/A}$ is therefore also shifted by 120° every field.

Figure 61B:
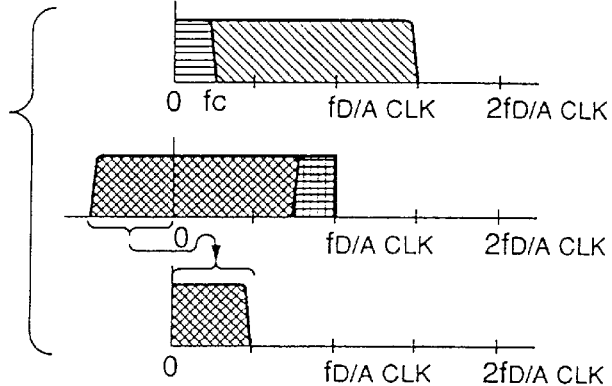

The outputs of the D/A converters 3r, 3g and 3b have a frequency distribution shown in FIG. 61B. The aliasing noises from $f_{D/A}$ contained in the respective signals are shifted by 120° every field, so that they cancel each other to the human eyes. This is true for both of the chrominance signal component and the luminance signal component.

Figure 61C:
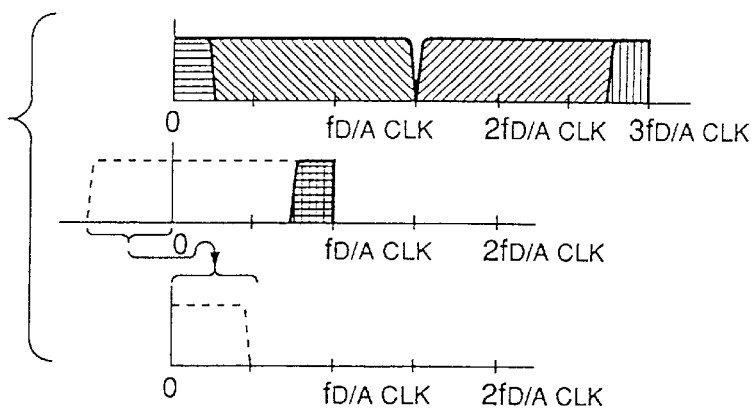
Figure 61D:
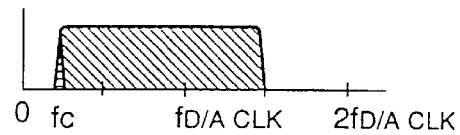
Figure 61E:
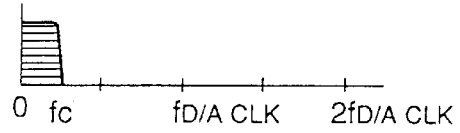
Figure 61F:
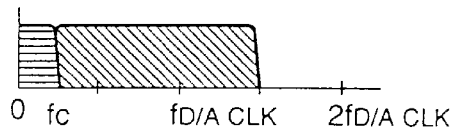
Figure 61G:
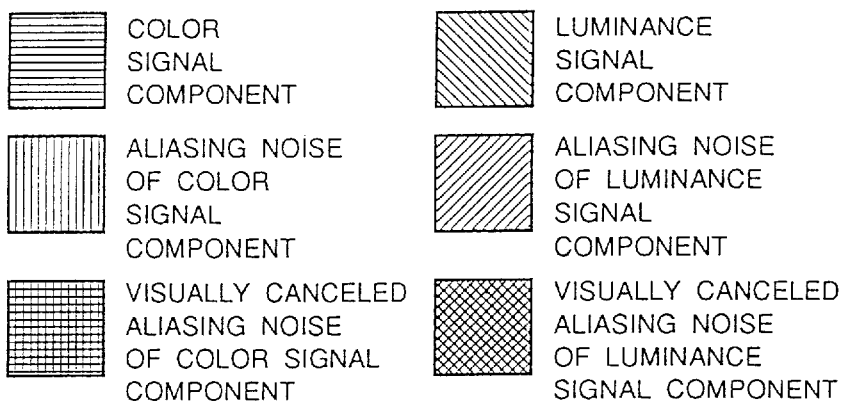
FIG. 61G is a diagram explaining the meaning of each type of hatching in FIG. 61A to FIG. 61F.

The output of the switch 30 contains, like Embodiment B9, the aliasing noise from frequency $f_{D/A}$ of the control clock for the D/A converters 3r, 3g and 3b, and the aliasing noise from $3f_{D/A}$ of the switching frequency of the switch 30, and has a frequency distribution shown in FIG. 61C. The aliasing noise of the chrominance signal component from the $f_{D/A}$ cancel each other to the human eyes, so that it is not necessary to remove the aliasing noise of the chrominance signal component from $f_{D/A}$. The signal bandwidth of the output of the adder 15 can therefore be expanded to 1.5 $f_{D/A}$ which is one half the switching frequency of the switch 30. FIG. 61F illustrates the frequency distribution of the output of the adder 15. The adder 15 adds the outputs of the LPF 14 and the LPF 12. The LPF 12 filters the output of the switch 29, and the frequency distribution of the output of HPF 13, which filters the output of the switch 30. FIG. 61D illustrates the frequency distribution of the output of the LPF 14.

Embodiment B11

FIG. 62 shows a video signal processor of another embodiment of the invention. The circuits identical or corresponding to those in the drawings previously referred to are denoted by identical reference numerals. It is similar to Embodiment B2 of FIG. 40. However, instead of the three A/D converters 1ra, 1ga and 1b, two A/D converters 1r and 1gb are provided, with the A/D converter 1r substituting the A/D converter 1ra and the A/D converter 1gb substituting the A/D converters 1ga and 1b. In addition, a frequency divider 38 and a switch 37 are provided. The frequency divider 38 frequency divides its input into half. The switch 37 alternately selects the outputs of the LPFs 4g and 4b, and its output is supplied to the A/D converter 1gb. Instead of the clock A/DCLK, a clock 2A/DCLK is supplied. The clock 2A/DCLK is applied to the A/D converters 1r and 1gb. The A/D converters 1r and 1gb therefore perform A/D conversion at a frequency $2f_{A/D}$ which is twice the frequency of the control clock for the A/D converters 1ra, 1ga and 1b of Embodiment B2 of FIG. 40 to produce data twice as much as the data obtained in Embodiment B2. The clock A/DCLK at the output of the frequency divider 38 is supplied directly to the field memory 2b, and via the inverter 7 to the field memories 2ra and 2ga. The clock A/DCLK is also applied to the switch 37 so that it performs the alternate selection of its two inputs.

Figure 63A:
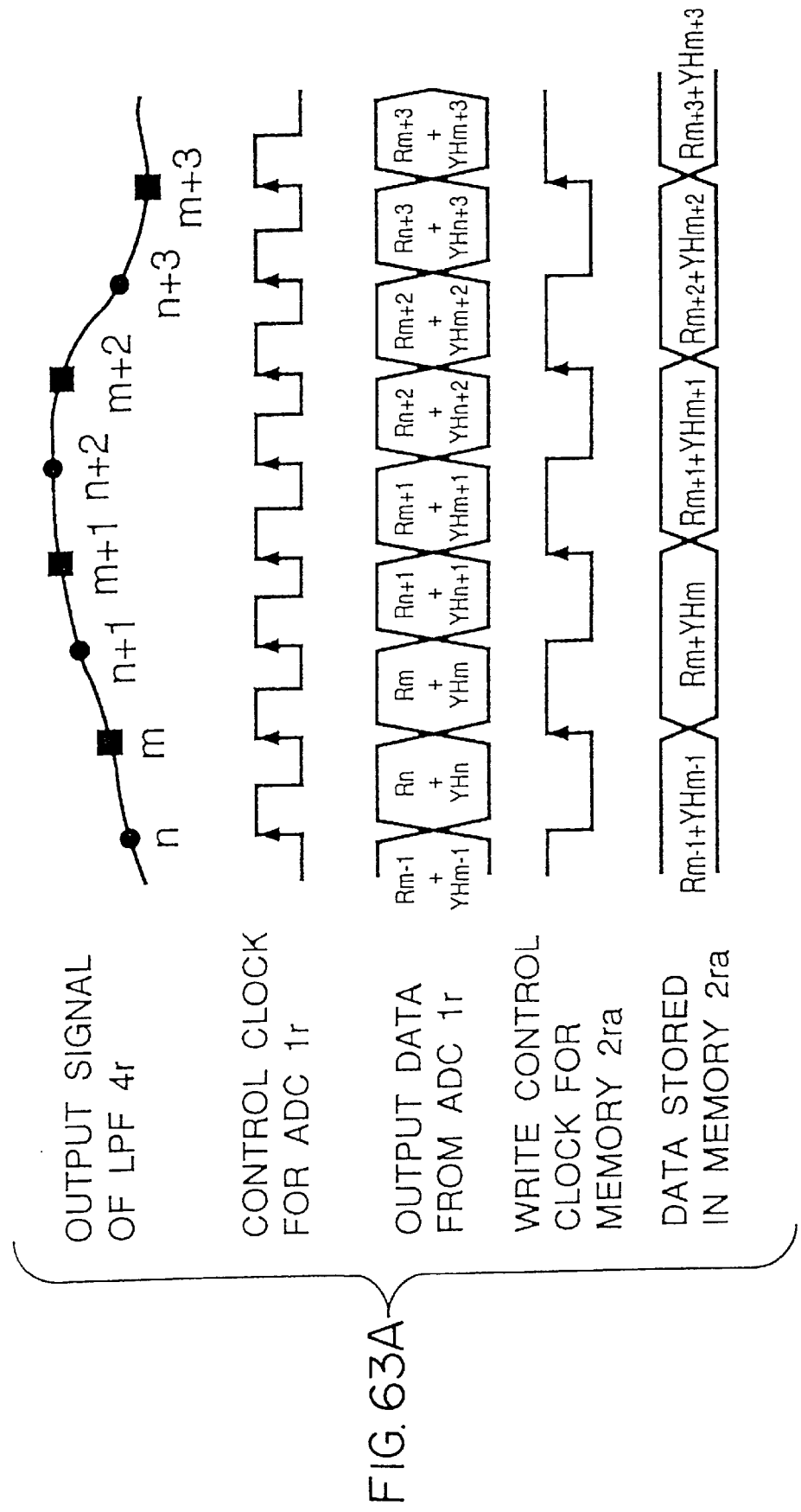
FIG. 63A and FIG. 63B are time charts showing the waveforms and values of the signals at various points in the video signal processor of FIG. 62.

The field memory 2ra is controlled by the clock inverted at the inverter 7 and stores the data from the LPF 4r. The clock used for control over the field memory 2ra is one half the clock used for the A/D converter 1r. On the other hand, the A/D converter 1r performs the A/D conversion at a frequency of 2A/DCLK, so that as shown in FIG. 63A, one out of every two pieces of data from the A/D converter 1r is stored in the field memory. In other words, the data is written in the field memory 2ra at the frequency $f_{A/D}$. (This is similar to Embodiment B2 of FIG. 40).

Figure 63B:
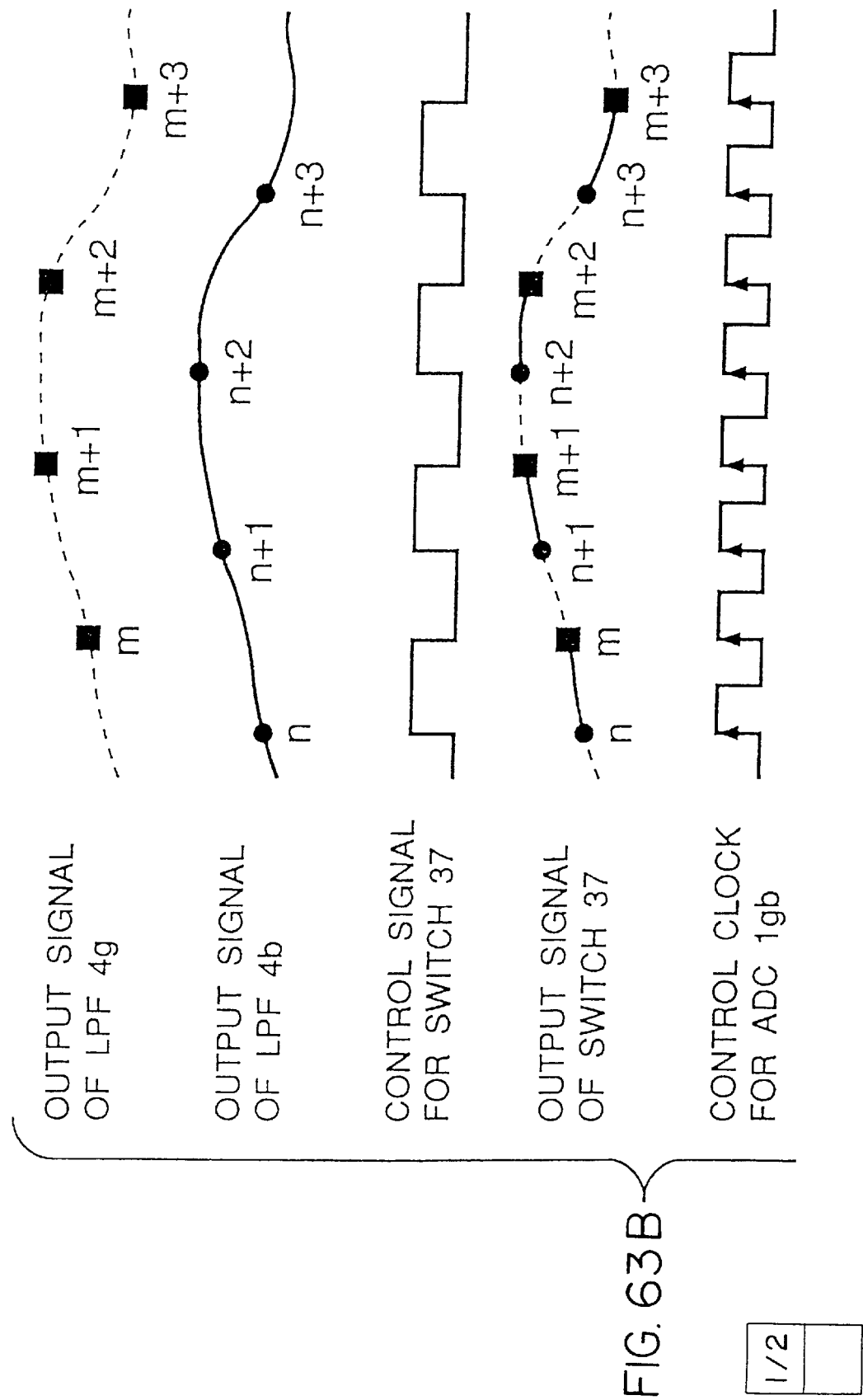

The switch 37 alternately selects the outputs of the LPFs 4g and 4r under control of the clock $2f_{A/D}$ to produce a signal obtained by synthesizing or time-division multiplexing the input G signal and the input B signal, shown in FIG. 63B.

The A/D converter 1gb performs A/D conversion on the output of the switch 37, under control of $2f_{A/D}$, and alternately produces data corresponding to the input G signal and data corresponding to the input B signal.

The field memory 2ga stores the data from the A/D converter 1gb under control of the clock output from the inverter 7. The field memory 2b stores the data from the A/D converter 1gb under control of the clock output from the frequency divider 38. The clock from the inverter 7 and the clock from the frequency divider 38 have an identical frequency $f_{A/D}$ and are 180° out of phase from each other. The data stored in the field memory 2ga therefore corresponds to the input G signal in FIG. 63B and the data stored in the field memory 2b corresponds to the input B signal as shown in FIG. 63B.

As has been described, the data corresponding to the input R signal and stored in the field memory 2ra, and the data corresponding to the input G signal and stored in the field memory 2ga are for identical sampling points, while the data corresponding to the input B signal and stored in the field memory 2b is 180° shifted from the data corresponding to the input R and G signals. Accordingly, the results similar to those obtained in Embodiment B2 of FIG. 40 are obtained.

Instead of the clock 2A/DCLK, the clock A/DCLK (obtained at the output of the frequency divider 38 may be applied to the A/D converter 1r.

The concept described above as a modification of Embodiment B2 of FIG. 40 can be combined with other embodiments to reduce the number of the A/D converters (from three to two).

Embodiment B12

FIG. 64 shows a video signal processor of another embodiment of the invention. The circuits identical or corresponding to those in the drawings previously referred to are denoted by identical reference numerals. It is similar to Embodiment B2 of FIG. 40. However, instead of the three A/D converters 1ra, 1ga and 1b, a single A/D converter 1 is provided. The A/D converter 1 operate at a sampling frequency determined by a clock 3A/DCLK. The clock 3A/DCLK is also supplied to a frequency divider 42 which frequency-divides the input into one third, to produce a set of clocks (first, second and third clocks) having a frequency A/DCLK (one third of 3A/DCLK) and having phases shifted by 120° from each other. The first, second and third clocks are supplied to first, second and third switches 41r, 41g and 41b, and also to first, second and third field memories 2ra, 2ga and 2b for control over writing into these memories.

A delay circuit 39 is provided to delay the output of the LPF 4g by the period $T_{3A/DCLK}$ of the clock 3A/DCLK, as illustrated in FIG. 65B. Another delay circuit 40 is provided to delay the output of the LPF 4b by the period $T_{3A/DCLK}/2$ which is one half the period the clock 3A/DCLK, as illustrated in FIG. 65B.

Figure 65D:
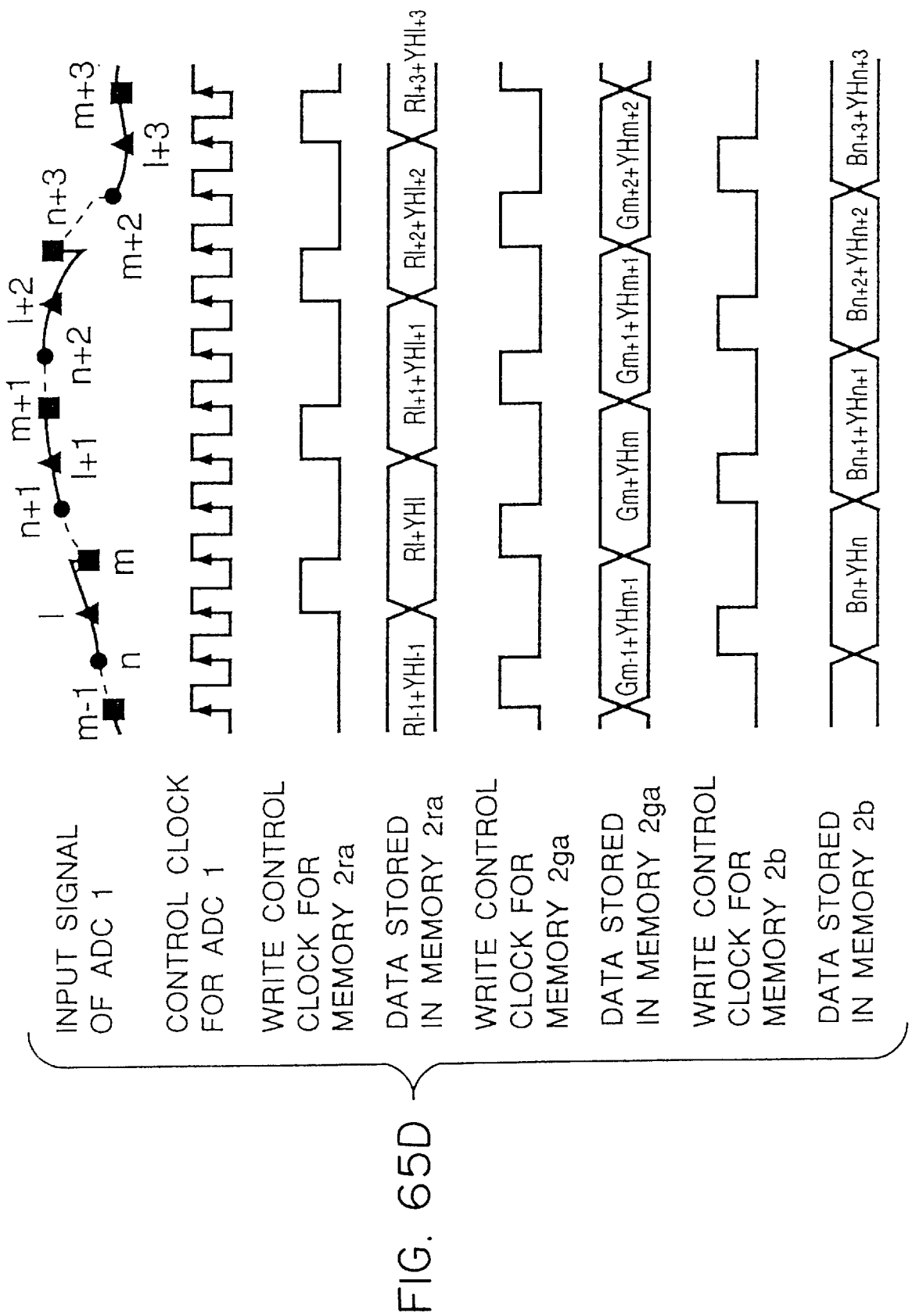

The delay circuits 39 and 40 may be formed of analog delay elements or sample-hold circuits. The switches 41r, 41g and 41b, being controlled by the first to third clocks, are closed in sequence in such a manner that only one of them is closed at at time. The switches 41r, 41g and 41g in combination sequentially and repeatedly select the outputs of the LPF 4r, and the delay circuits 39 and 40, and the signal output from the switches 41r, 41g and 41g to the A/D converter 1 is a R, G and B time-division multiplexed or synthetic signal obtained by time-division multiplexing the R, G and B signals or synthesizing the R, G and B signals along time axis, as shown in FIG. 65D.

Because of the delay introduced by the delay circuits 39 and 40, the R, G and B signals are synthesized in the sequence of R, G and B.

The A/D converter 1 samples and digitizes the inputs from the switches 41r, 41g and 41b at a frequency of the $3f_{A/D}$ to produce sequence of data corresponding to R, G and B signals.

The field memories 2ra, 2ga and 2b are controlled by the clocks output from the frequency divider 42 to store one out of every three data (samples). The timings at which the writing takes place in the respective field memories are shifted by 120° from each other. The R, G and B signals are therefore written in the field memories 2ra, 2ga and 2b, respectively. That is, the data stored in the field memory 2ra are a sequence of data corresponding to input R signal, the data stored in the field memory 2ga are a sequence of data corresponding to input G signal, and the data stored in the field memory 2b are a sequence of data corresponding to input B signal, as shown in FIG. 65D. Moreover, the data corresponding to the input R signal and the data corresponding to the input G signal are for the same sampling points, while the data corresponding to the B signal is for the sampling points having a phase difference of 180° from the sampling points of the R and B signals. Accordingly, the combination of data identical to those in the embodiments of FIG. 40 are obtained at the field memories, and by having the D/A converters 3a and 3, the LPFs 12, 14, the HPF 13, and the switches 9 to 11 operate in the same manner, the effects similar to those described with reference to the embodiment of FIG. 40 can be obtained.

An advantage of Embodiment B12 is that only one A/D converter suffices.

The concept described above as a modification of Embodiment B2 of FIG. 40 can be combined with other embodiments to reduce the number of the A/D converters (from three to one).

Embodiment B13

Figure 66:
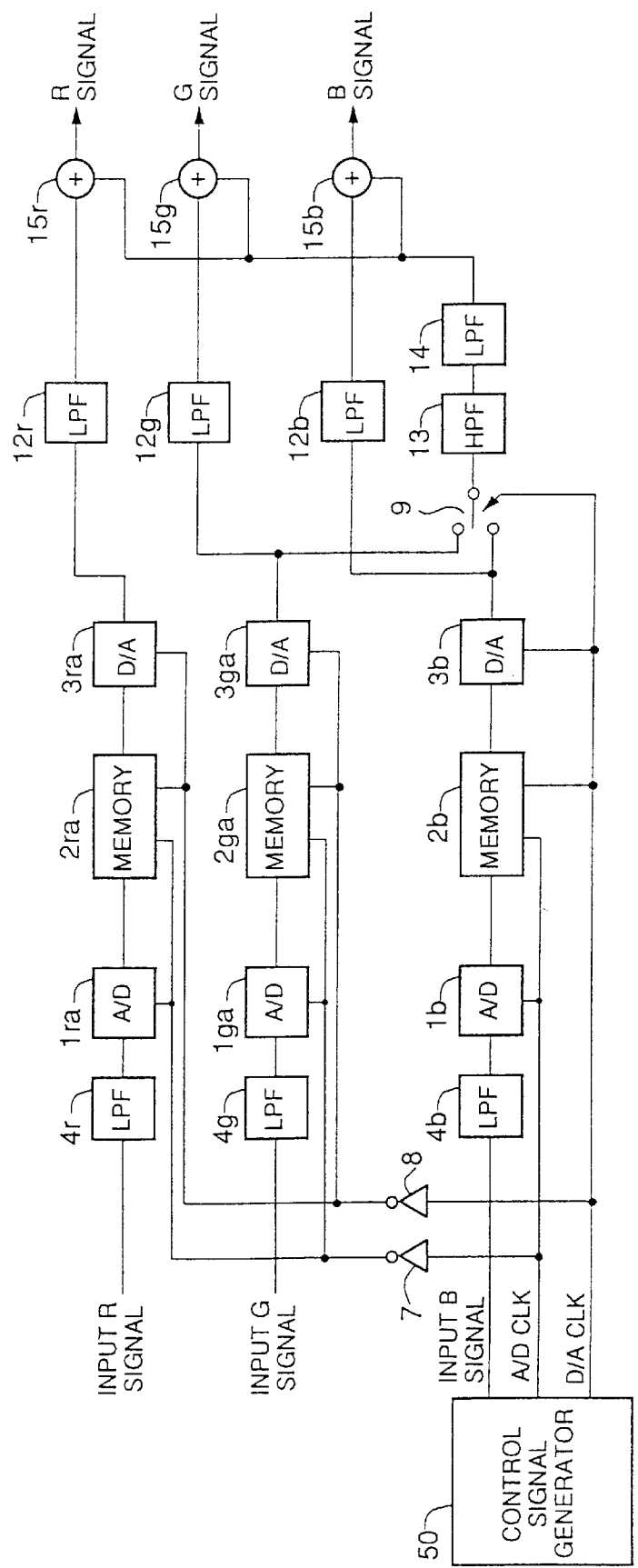
FIG. 66 is a block diagram showing a video signal processor of another embodiment of the invention.

FIG. 66 shows a video signal processor of another embodiment of the invention. The circuits identical or corresponding to those in the drawings previously referred to are denoted by identical reference numerals. It is similar to Embodiment B2 of FIG. 40. However, instead of the two D/A converters 3a and 3, three D/A converters 3ra, 3ga and 3b are provided. Instead of the single LPF 12, three LPFs 12r, 12g and 12b are provided. Instead of the single adder 15, three adders 15r, 15g and 15b are provided. The switches 10 and 11 are omitted.

The data from the field memories 2ra and 2ga are respectively D/A-converted by the D/A converters 3ra and 3ga.

The switch 9 is controlled in the same manner as in Embodiment B2 of FIG. 40. That is, it alternately selects the outputs of the D/A converters 3ga and 3b, in accordance with a control clock for the D/A converter 3b, thereby to double the bandwidth of the high-frequency component of the luminance signal.

The HPF 13 removes the chrominance signal components contained in the output of the switch 9. The LPF 14 removes the aliasing noise contained in the output of the HPF 13 to produce the high-frequency component of the luminance signal.

The LPFs 12r, 12r and 12b respectively extract the chrominance signal components from the D/A converters 3ra, 3ga and 3b.

The adders 15r, 15g and 15b respectively add the outputs of the LPFs 12r, 12g and 12b, which are chrominance signal components, to the output of the LPF 14, which is a high-frequency component of the luminance signal, thereby to produce R, G and B signals with expanded bandwidth.

Thus, the video signal processor of Embodiment B13 provides outputs of three colors separately and in parallel.

The concept described above as a modification of Embodiment B2 of FIG. 40 can be combined with other embodiments to provide signal of three colors separately and in parallel.

Embodiment B14

In the embodiments described, the input signals are the signals of three primary colors of R, G and B. However, the input signals may alternatively be video signals of complementary colors of cyan, magenta, and yellow.

Embodiment B15

In the above embodiments, the input signals of R, G and B may be exchanged from each other.

Embodiment B16

Figure 67:
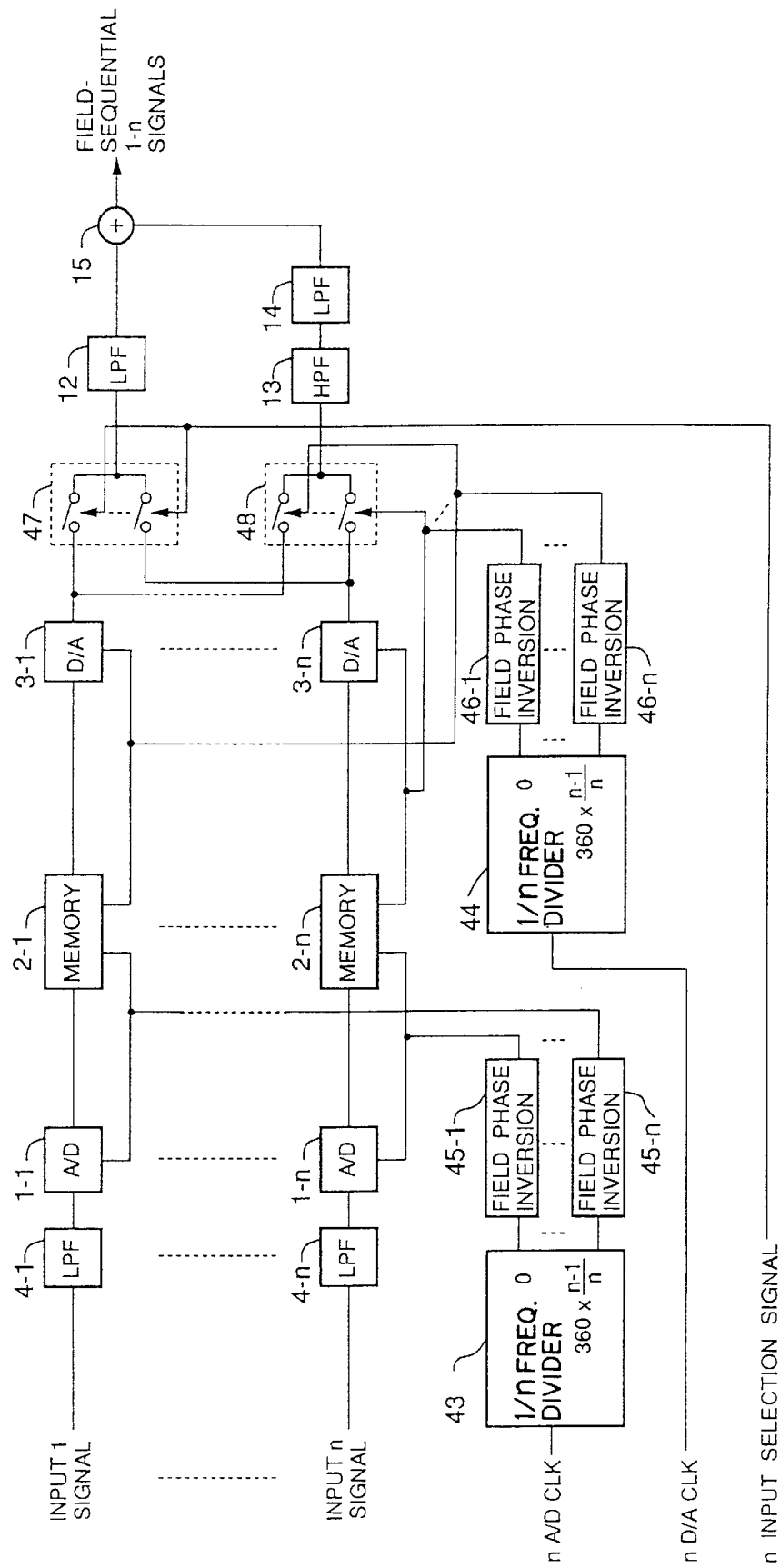
FIG. 67 is a block diagram showing a video signal processor of another embodiment of the invention.

FIG. 67 shows a video signal processor of another embodiment of the invention. The circuits identical or corresponding to those in the drawings previously referred to are denoted by identical reference numerals. It is similar to Embodiment B10 of FIG. 58. In Embodiment B10 of FIG. 58, the number of input signals is three. This embodiment illustrates that the concept described in Embodiment B10 can be expanded to any number (n) of input signals, by using control clocks having phase differences of 360°/n for controlling n D/A converters. The signal bandwidth of the video signal processor is expanded up to $nf_{A/D}/2$.

As illustrated in FIG. 67, instead of the three LPFs 4r, 4g, 4b, n (n being a positive integer) LPFs 4-1 to 4-n are provided. Instead of the three A/D converters 1r, 1g and 1b, n A/D converters 1-1 to 1-n are provided. Instead of the three field memories 2r, 2g and 2b, n field memories 2-1 to 2-n are provided. Instead of the three D/A converters 3r, 3g and 3b, n D/A converters 3-1 to 3-n are provided.

Instead of the frequency dividers 27 and 28 for frequency-division into one third, frequency dividers 43 and 44 for frequency-division into 1/n are provided. The frequency-divider 43 frequency-divides a clock nA/DCLK by n to produce n clocks having phase differences 360°/n from each other. The frequency-divider 44 frequency-divides a clock nD/ACLK by n to produce n clocks having phase differences 360°/n from each other.

Instead of the field phase inverter 31, a set of n field phase inverters 45-1 to 45-n are provided. Each of the field phase inverters 45-1 to 45-n receives the respective one of the n clocks, and outputs a clock whose phase is altered every field by 180°. Instead of the field phase inverter 32, a set of n field phase inverters 46-1 to 46-n are provided. Each of the field phase inverters 46-1 to 46-n receives the respective one of the n clocks, and outputs a clock whose phase is altered every field by 180°.

Instead of the switches 29 and 30, switches 47 and 48 each having n inputs and one output, and sequentially selecting the n inputs to sequentially output the selected inputs are provided. The switch 47 is controlled by an input selection signal. The switch 48 is controlled by the outputs of the field phase inverting circuits 46-1 to 46-n.

The LPF 12 removes the high-frequency component from the output signal of the switch 47. The HPF 13 removes the low-frequency component from the output signal of the switch 48. The LPF 15 removes the aliasing noise from the output signal of the HPF 13. The adder 15 adds the output signal of the LF 12 and the output signal of the LPF 14 to produce n field-sequential signals.

Embodiment B17

Figure 68:
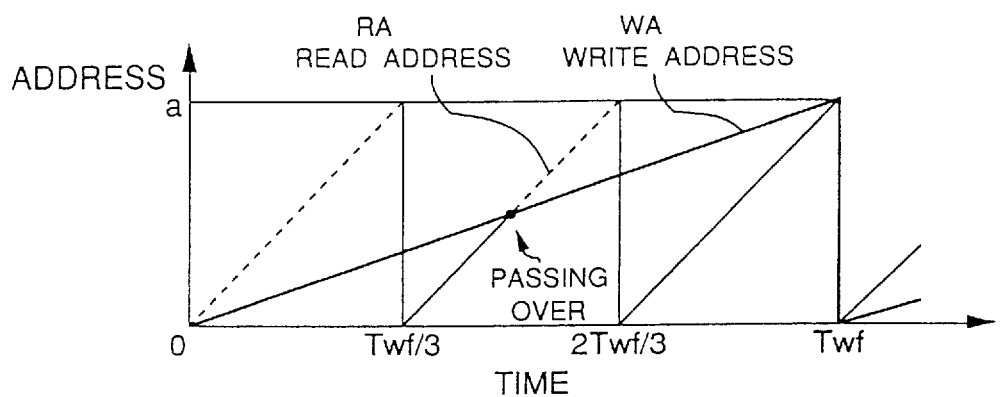
FIG. 68 is a time chart showing the successive change of the writing and reading addresses, and passing of the reading address over the writing address.
Figure 69:
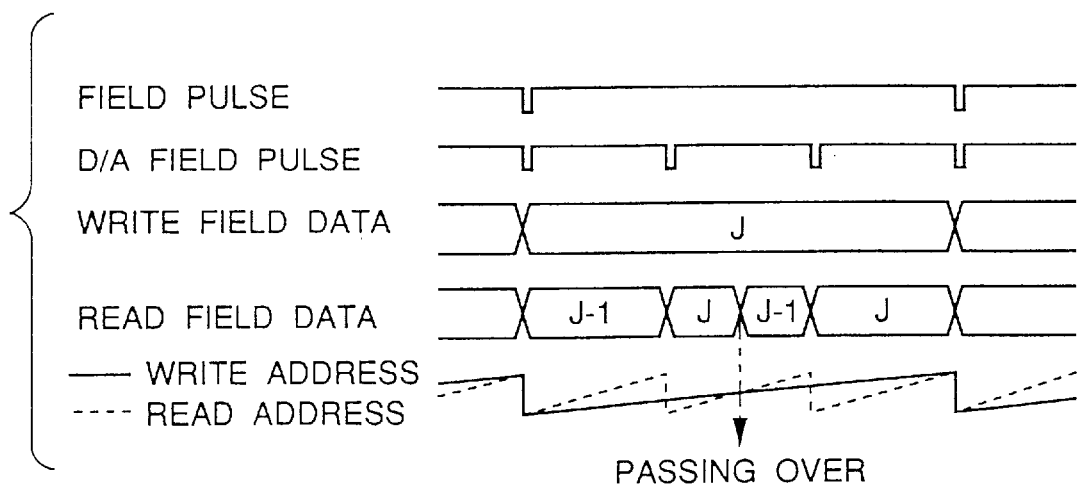
FIG. 69 is a time charts showing the alteration of data which is attendant to the passing of the reading address over the writing address.

FIG. 68 shows passing of reading address over writing address that occurs when a dual port DRAM permitting simultaneous writing and reading is used as the field memories, and reading is performed with a higher rate than writing, e.g., at a rate three times that of the writing. FIG. 69 shows the fields of data that are read when the reading is performed at a rate three times that of writing.

In FIG. 68, the horizontal axis represents time, the vertical axis represents address, "a" represents the number of addresses required for covering an entire field, and "t1" represents the time of one field. It is illustrated that writing one field takes a period Twf, while reading one field takes one third (Twf/3) of the period Twf. During the time Twf required for writing one field, the data in the memory is read three times, in other word, three cycles of reading operation are performed. The write address varies as indicated by the slope WA, while the read address RA varies as indicated by steeper lines RA (with the gradient three times that of the slope WA).

In FIG. 69, "J−1", and "J" represent the field numbers. In the period Twf, the data in the field memory is changed from (J−1)-th field to J-th field by the rewriting. Three cycles of reading operation are performed during this period. In FIG. 68, in part of the period Twf where the reading address is indicated by dotted lines, the reading address is ahead of the writing address. In the rest of the period Twf where the reading address is indicated the solid lines, the reading address is behind the writing address. Here, the expression "the reading address is ahead of the writing address" means that the rewriting with the new field of data has not proceeded to the address from which the data is being read. The expression "the reading address is behind the writing address" means that the rewriting with the new field of data has been completed at the address from which the data is being read.

Referring again to FIG. 69, during the first cycle of reading, the reading address is ahead of the writing address, so that the data read from the field memory are all of the (J−1)-th field.

During the second cycle of reading, the reading address is initially behind the writing address, but passes the writing address at the middle of the cycle, which also is the middle of the entire period Twf, and is thereafter ahead of the writing address. The data read in the first half of the second cycle are of the J-th field, while the data read in the second half of the second cycle are of the (J−1)-th field.

During the third cycle of reading, the reading address is kept behind the writing address. The data read in the third cycle are all of the J-th field.

In FIG. 68, the solid line indicates the region of which data of the respective samples (at the respective addresses) are of the J-th field. The dotted line indicates the region of which the data of the respective samples (at the respective addresses) are of the (J−1)-th field.

Because of the passing-over at the middle of the second cycle, if the data read in the second cycle are used for display, the upper half of the screen is the image of the J-th field and the lower half of the screen is the image of the J-th field. If there has been a change or motion between the (J−1)-th and J-th fields, the resultant discontinuity and discrepancy of the image is prominent.

Further problems are explained with reference to FIG. 70A to FIG. 70F and FIG. 71A to FIG. 71F.

In the video signal processor of Embodiment B3 shown in FIG. 41, the field phase inverters 16 and 17 are used to shift the phases of the control clocks by 180° every field for the purpose of visually canceling the aliasing noise from the $f_{D/A}$ of the control clock of the D/A converters 3ga and 3b, the aliasing noise being contained in the output signals of the D/A converters 3ga and 3b.

Figure 70:
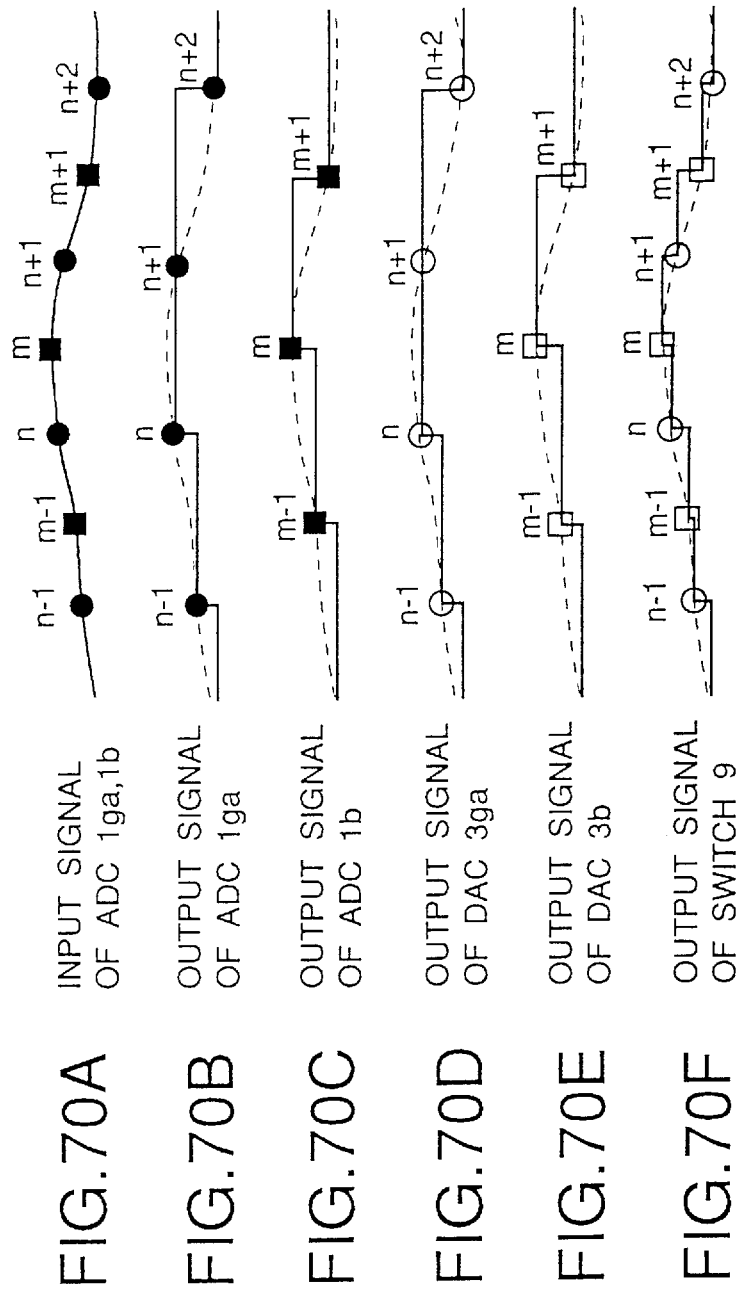
FIG. 70A to FIG. 70F and FIG. 71A to FIG. 71F are time charts showing the waveforms and the sampling points of the signals at various points in the video signal processor of FIG. 41.
Figure 71:
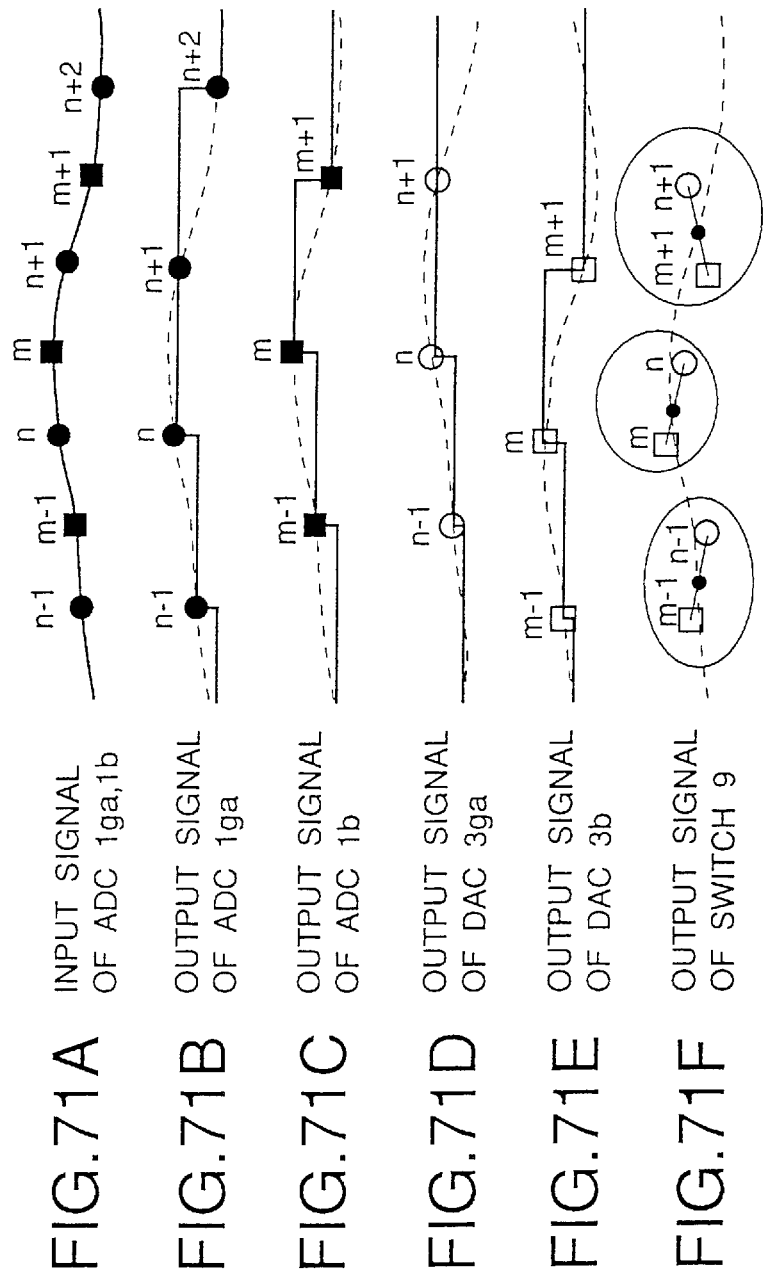

If the field memories 2ga and 2b are of the type with which reading and writing are not performed simultaneously, as in Embodiment B3, the timing at which the phase of the control clock is shifted by 180° by means of the field phase inverter 16 and the timing at which the phase of the control clock by 180° by means of the field phase inverter 17 are the same, so that as shown in FIG. 70A and FIG. 70F, the number of samples and the order of the samples of the output signal of the switch 9 are identical to those of the input signal of the A/D converters 1ga and 1b.

If the field memories 2ga and 2b are of the type with which reading and writing are performed simultaneously, the sampling points of the (J−1)-th field of data and J-th field of data that are read from the field memories 2g and 2b simultaneously with the writing of the J-th field of data are phase-shifted by 180° from each other, so that if the timing at which the phase of the control clock is shifted by 180° by means of the field phase inverter 16 and the timing at which the phase of the control clock by 180° by means of the field phase inverter 17 are the same, the data of the (J−1)-th field output from the D/A converters 3ga and 3b are at points phase-shifted by 180° from the points at which the data are sampled by the A/D converter 1ga or 1b, as illustrated in FIG. 71B to FIG. 71E.

If these signals are supplied to the switch 9, the output signal of the switch 9 do not concur with the input signals as sampled by the A/D converters 1ga and 1b, and visually the number of data samples is seen to be reduced to one half.

Figure 72:
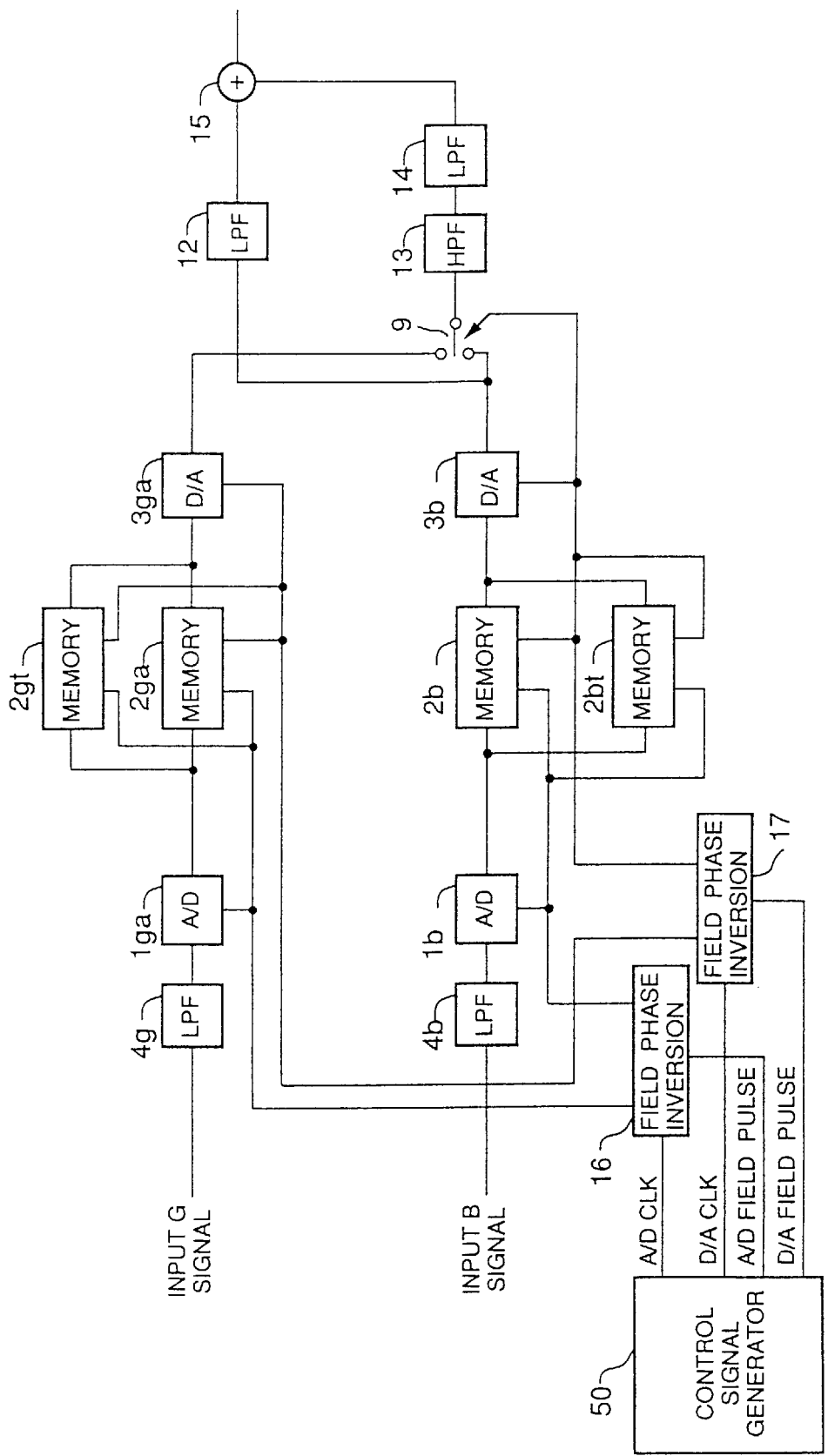
FIG. 72 is a block diagram sowing a part of a video signal processor according to another embodiment of the invention.

A video signal processor of Embodiment B17 shown in FIG. 72 has been devised to solve the above described problem. It is featured by the provision of an additional field memory to prevent the passing-over described above. FIG. 72 shows only such part of the video signal processor which relates to production of the decoded color signal, e.g., B signal, of a plurality of colors. The circuits identical or corresponding to those in the drawings previously referred to are denoted by identical reference numerals. It is similar to Embodiment B3 of FIG. 41. However, additionally provided are field memories 2gt and 2bt.

Successive fields of data corresponding to the input G signal are alternately written in the field memories 2ga and 2gt. During each period for writing one field of data into one of the field memories, data is read from said one or the other of the two field memories so as to avoid the passing-over.

Similarly, successive fields of data corresponding to the input B signal are alternately written in the field memories 2b and 2bt. During each period for writing one field of data into one of the field memories, data is read from said one or the other of the two field memories. so as to avoid the passing-over.

If for instance, when J-th field of data are written in the field memories 2ga and 2b, (J−1)-th field of data having been written previously into the field memories 2gt and 2bt are read out for the first cycle (first one-third write field period) and the second cycle (second one-third write field period), and for the last cycle (third one-third write field period) the J-th field of data having just been written are read out from the field memories 2ga and 2b. When the next (J+1)-th field of data are written in the field memories 2gt and 2bt, J-th field of data having been written into the field memories 2ga and 2b are read out for the first cycle (first one-third write field period) and the second cycle (second one-third write field period), and for the last cycle (third one-third write field period) the (J+1)-th field of data having Just been written are read out from the field memories 2gt and 2bt. Similar writing and reading operations repeated.

Figure 73:
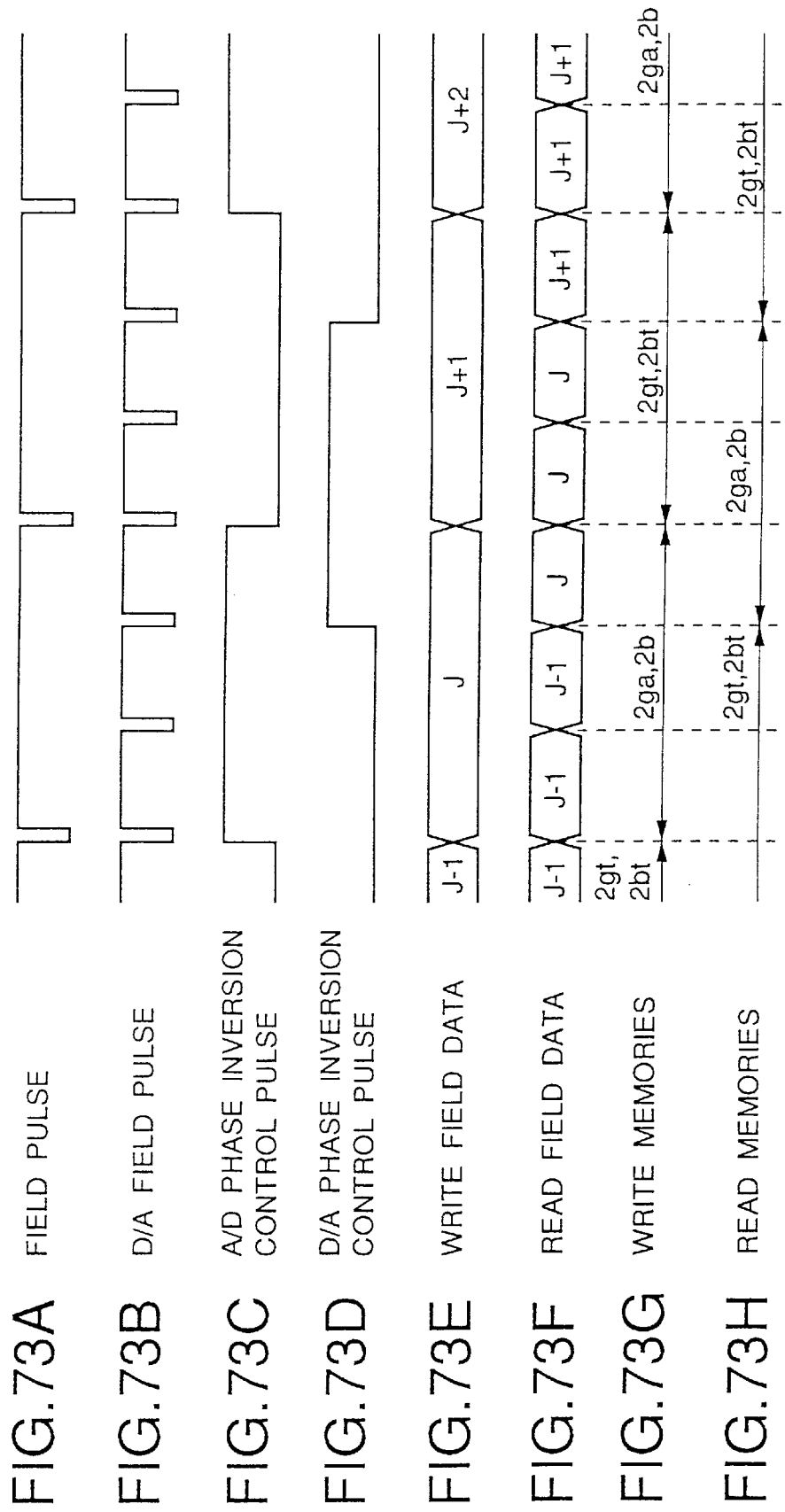
FIG. 73A to FIG. 73H are time charts showing the waveforms and the values of the signals at various points in the video signal processor of FIG. 72.

Thus, by the provision of the additional field memories 2gt and 2bt, the problem due to the passing over is eliminated. However, as the data which are read during the first two third of the write field period and the data which are read during the last one third of the write field period are of different fields, it is necessary to shift the timing at which the phase the control clock is shifted by means of the field phase inverter 17, as shown in FIG. 73D.

With such an arrangement, the data of the entire field are output from the D/A converters 3ga and 3b at points of the same phase as the points at which they are sampled by the A/D converters 1ga and 1b. The number and the order of the data samples of the signal output from the switch 9 are the same as the input signal sampled by the A/D converters 1ga and 1b.

The modification described above as being applied to Embodiment B3 of FIG. 41 can also be applied to other embodiments in which passing-over can occur when writing in and reading from the field memories are performed simultaneously, and the field phase inverters (16 and 17) are used.

In Embodiment B17, the phases of the control clocks are shifted by 180°. But where the number of input signals is n and when the control clocks are shifted every field by 360°/n as described with reference to Embodiment B7 and Embodiment B10, the timing at which the phase of the control clocks for reading is shifted may be shifted as described above in Embodiment B17.

Embodiment B18

Above described Embodiment B17 showed a solution to the problem of passing-over. The solution involved the addition of field memories 2gt and 2bt. Present Embodiment B18 provides an alternative solution wherein the number of the field memories or the total capacity of the field memories is not increased, and yet the visual resolution (resolution as seen to the human eyes).

Illustration of the circuit configuration of this Embodiment B18 may be identical to that of the video signal processor shown in FIG. 41, but the manner of control over the field phase inverter 17 is different. That is, where writing and reading are performed simultaneously, and when passing-over of the address occurs, the phase of the control clock output from the field phase inverter 17 is controlled depending on whether the data being read from the field memories are those of the (J−1)-th field or those of the J-th field (the field of data with which the rewriting is in progress).

Figure 74:
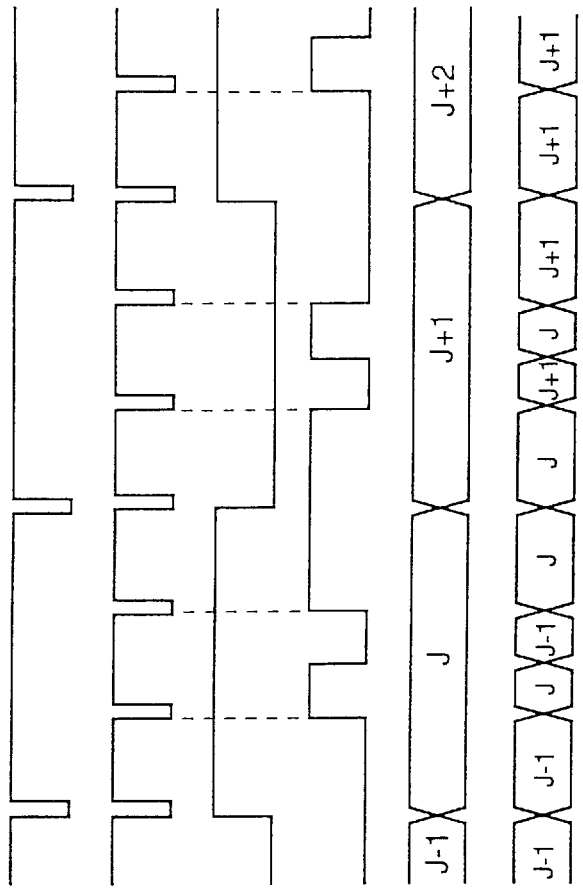
FIG. 74A to FIG. 74F are time charts showing the waveforms and values of the signals at various points in the video signal processor.

That is, the timing of the D/ACLK for shifting by 180° the phase of the control clock output from the field phase inverter 17, is set as shown in FIG. 74D, so that the phase of the read control clock is shifted by 180° for the period from the time point when the passing over occurs and the end of the two third of the write field period. The result is that with respect to all the data of the entire field, the points of the signals output from the D/A converters 3ga and 3b are of the same phase as the points at which the input signals are sampled by the A/D converters 1ga and 1b, so that the order and the number of the data of the signal output from the switch 9 are always identical to the input signal sampled by the A/D converters 1ga and 1b.

The concept described above in Embodiment B18 can be applied to the embodiments other than Embodiment B3 where writing and reading are performed simultaneously, and the passing-over occurs, and field phase inverters 16 and 17 are employed.

In Embodiment B18, the phases of the control clocks are shifted by 180°. But where the number of input signals is n and when the control clocks are shifted every field by 360°/n as described with reference to Embodiment B7 and Embodiment B10, the timing at which the phase of the control clocks for reading is shifted may be shifted as described above in Embodiment B18.

Embodiment B19

Embodiment B18 provided a solution to the problem of passing-over when the reading is performed at a rate three times the rate of writing. When reading is performed at other rate higher than the rate of writing, a similar problem is encountered.

Figure 75:
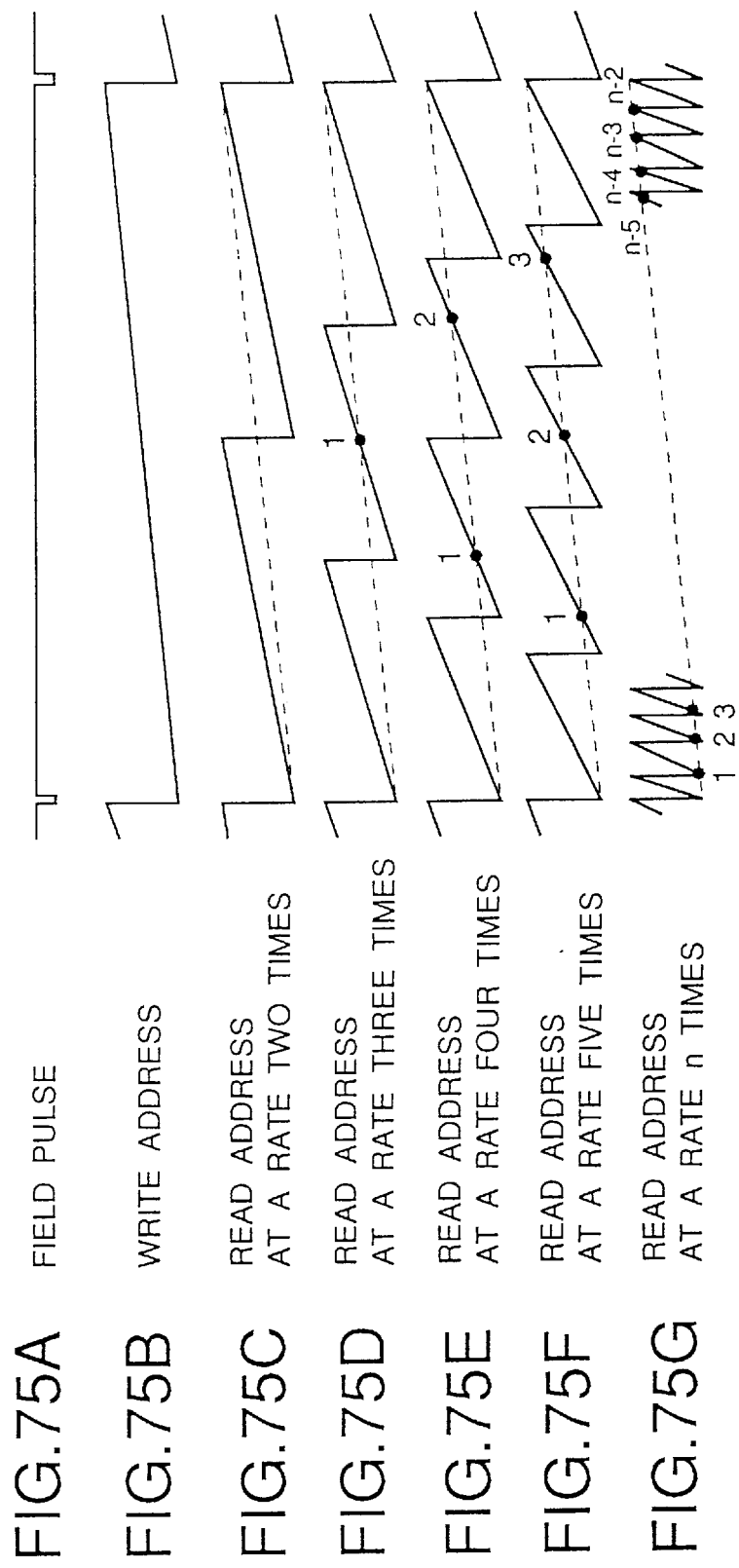
FIG. 75A to FIG. 75G are time charts showing change of address values with different number of input color signals.

FIG. 75A to FIG. 75G show the passing-over when the reading from field memories 2ga and 2b is performed at a rate n times the rate of writing. In FIG. 75B the write address for the field memories 2ga and 2b is shown to be increased (because of the incremental change of the address value), taking a period of one field, as indicated by field pulses shown in FIG. 75A. FIG. 75C to FIG. 75G respectively show the read addresses in solid lines, at a rate two times, three times, four times, five times, and n times the rate of writing. The write address is also shown in dotted lines.

Figure 76:
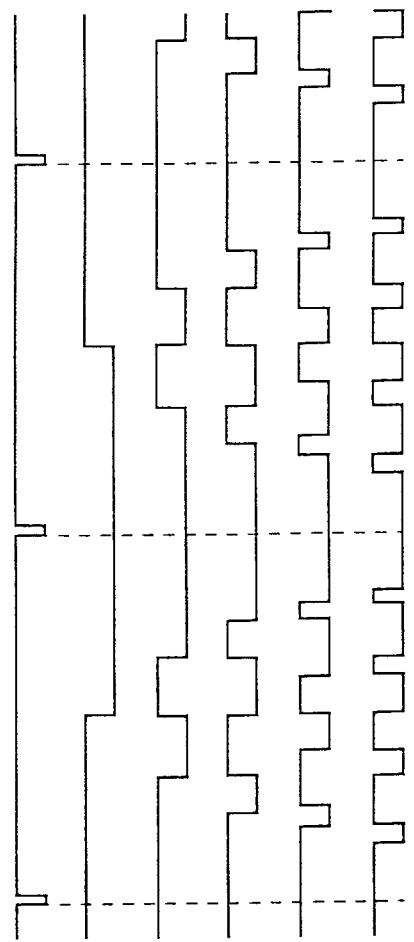
FIG. 76A to FIG. 76F are time charts showing phase inversion control pulses used for different numbers of input color signals.

FIG. 76A shows the field pulses, and FIG. 76B to FIG. 76F show the phase inversion control pulses from the field phase inverter 17 for shifting by 180° the phase of the output clocks used when the reading is performed at a rate 2 to 6 times, respectively, the rate of writing, and when the passing-over occurs.

In the video signal processor of FIG. 41, when writing and reading are performed simultaneously, passing over occurs (n−2) times: When n=2, no passing over occurs; when n=3, passing over occurs once per field, as has been described; when n=4, passing over occurs twice per field; when n=5, passing over occurs three times per field; and when n=6, passing over occurs four times per field.

Embodiment B19 takes account of the passing over in the same way as Embodiment B18, and control the phase of the control clocks output from the field phase inverter 17. The timing at which the control clock is shifted by 180° by means of the field phase inverter 17 is set as shown in FIG. 76B to FIG. 75F. The result is that the order and number of the data of the signal output from the switch 9 are always identical to those of the signal sampled by the A/D converters 1ga and 1b.

The concept described above in Embodiment B19 can be applied to the embodiments other than Embodiment B3 where writing and reading are performed simultaneously, and the passing-over occurs, and field phase inverters are employed.

In Embodiment B18, the phases of the control clocks are shifted by 180°. But where the number of input signals is n and when the control clocks are shifted every field by 360°/n as described with reference to Embodiment B7 and Embodiment B10, the timing at which the phase of the control clocks for reading is shifted may be shifted as described above in Embodiment B18.

Embodiment B20

Figure 77:
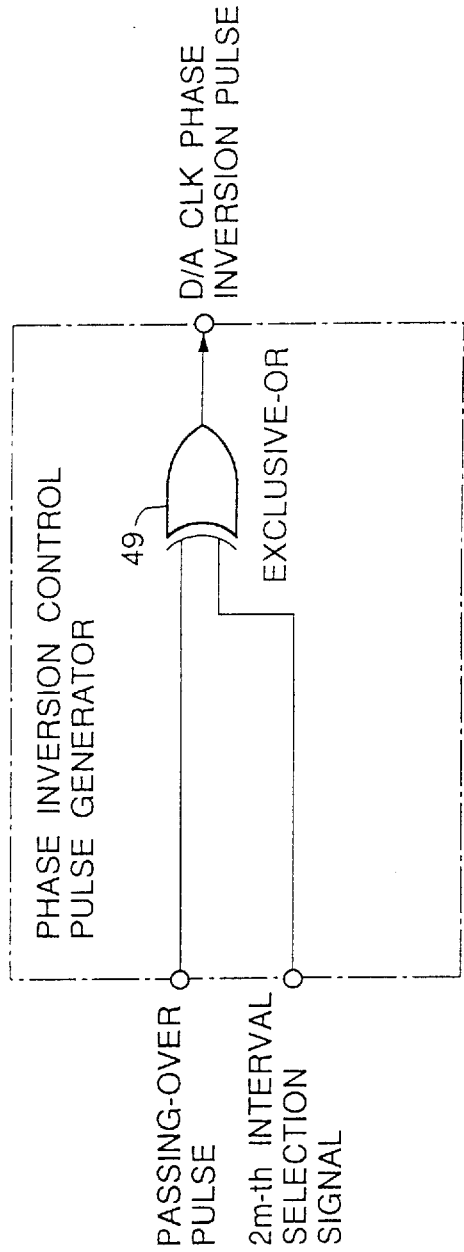
FIG. 77 is a block diagram showing a phase inversion control pulse generator of another embodiment of the invention.

FIG. 77 shows a circuit for generating a phase inversion control pulse determining the timing at which the control clock is shifted by 180° by means of the field phase inverter 17 in FIG. 41.

It comprises an exclusive-OR (exclusive logical sum) 49 receiving the a passing-over pulse and an even-numbered interval (2m-th interval) selection signal. The even interval selection signal is High, during the even-numbered ones (2m-th intervals) of the intervals into which the one write field is divided by n (the ratio between the reading rate and the writing rate) and is Low during the odd-numbered intervals ((2m−1)-th intervals). FIG. 78 to FIG. 78F are timing diagrams for the case where n=4. FIG. 79A to FIG. 79F are timing diagrams for the case where n=5.

The passing-over pulse is inverted each time the passing-over occurs, as shown in FIG. 78D or FIG. 79D. The passing-over is also inverted at the end of the field if n is an even number. The passing-over occurs each time writing of data proceeds by 1/(n−1) write field, and occurs (n−2) times during one write field.

The even-numbered interval selection signal is High during the even-numbered intervals (2nd, 4th, . . . ) as shown in FIG. 78C and FIG. 79C.

The result of the exclusive OR operation of the passing over pulse and the even-numbered interval selection signal is shown in FIG. 78E and FIG. 79E. The output of the exclusive OR gate 49 can be used as the field phase inversion pulse.

When n=2, 3, and 6, respectively, the field phase inversion pulses shown in FIG. 76B, FIG. 76C and FIG. 76F can be obtained.

Embodiment B1 to Embodiment B20 described above have the following advantages:

By shifting the phase of the sampling points of the respective input signals, and utilizing the different sampling points of the different input signals, the number of sampling points are effectively increased, and the signal bandwidth of the video signal processor can be expanded without increasing the frequency of the control clocks of the video signal processor.

By shifting the phase of the sampling points by 180° every field, the aliasing noises are canceled, and the sampling frequency to the human eyes is increased, so that the signal bandwidth of the video signal processor can be further expanded.

By using a plurality of control clocks having different phases for the A/D conversion of each signal processing circuit, the number of the sampling points can be increased and the signal bandwidth of the video signal processor can be further expanded.

By switching between a plurality of input signals using an A/D conversion control clock, and sequentially encoding the plurality of input signals using a single A/D converter, the number of the required A/D converters can be reduced.

By delaying a plurality of input signals by an amount different from each other, and sequentially encoding the input signals using a single A/D converter, the number of the required A/D converter can be reduced.

By field-sequentially reading data of a plurality of input signals from a memory, and decoding using a single D/A converter, the number of required D/A converters can be reduced.

By adopting the configuration in which the capacity of the memory with which writing and reading are performed simultaneously is so set that address passing-over does not occur, the reduction in the number of sampling points as seen to the human eyes, that accompanies the address passing-over, can be avoided.

Even if the capacity of the memory is such that the address passing-over occurs, by shifting by 180° the phase of the reading and D/A conversion control clock for the period in which the data of the field with which the rewriting is in progress is read, so that the phase of the data read out is identical to phase of the A/D conversion control clock of the preceding field, the order and the number of data are always identical to those of the A/D conversion, and it is possible to avoid reduction in the number of samples as seen to the human eyes.

By the use of the exclusive OR gate for producing the signal for shifting by 180° the reading and D/A conversion control clock, the phase inversion control pulses can be obtained using a simple circuit configuration.

What is claimed is:

1. A video signal processor having a plurality of signal processing circuits respectively receiving a plurality of input color signals, which represent respective color components of a video signal, and producing decoded signals of the respective color components, said video signal processor comprising:
    means for controlling operation of the signal processing circuits using control clocks having different phases; and
    means for adding a decoded signal of one of the signal processing circuits and only a high-frequency component of a decoded signal of another of the signal processing circuits.

2. A video signal processor according to claim 1, wherein said control means shifts the phases of said control clocks by 180° every field.

3. A video signal processor according to claim 1, wherein said control means uses a plurality of clocks for controlling over the operation of each of said signal processing circuits.

4. A video signal processors comprising:
    a common A/D converter for receiving and converting one of the input color signals, which represent respective color components of a video signal, into digital data;
    means for alternately or sequentially selecting the input color signals and supplying the selected input color signal to said common A/D converter;
    means for writing the digital data into one of a plurality of memories corresponding to the color component represented by the digital data;
    means for reading the digital data from the memories and supplying the digital data to D/A converters for the respective color components to produce corresponding decoded signals; and
    means for adding one of the decoded signals and only a high-frequency component of another of the decoded signals.

5. A video signal processor according to claim 4, wherein said selecting means selects said input color signals in accordance with A/D conversion clocks.

6. A video signal processor according to claim 4, further comprising:
    delay means for delaying at least one of the input color signals so that a phase difference exists between the input color signals; and wherein
    the selecting means selects one of the input color signals output from the delay means; and
    said writing means writes the digital data into the corresponding memories using control clocks having the same phase difference as the input color signals output from the delay means.

7. A video signal processor, comprising:
    A/D-converting means for sampling and A/D-converting input color signals, which represent respective color components of a video signal, to produce digital data corresponding to the input color signals;
    at least one memory for storing the digital data;
    D/A-converting means for D/A-converting digital data read from the memory to produce decoded signals of the respective component colors; and
    means for adding one of the decoded signals and only a high-frequency component of another of the decoded signals.

8. A video signal processor according to claim 7, wherein the A/D-converting means comprises a plurality of A/D converters.

9. A video signal processor according to claim 8, further comprising means for controllig the operation of the A/D converters using control clocks having different phases to vary phases of sampling points of the input color signals.

10. A video signal processor according to claim 9, wherein said control means shifts the phases of said control clocks by 180° every field.

11. A video signal processor according to claim 9, wherein said control means uses a plurality of clocks to control each of the A/D converters in order to increase a number of the sampling points.

12. A video signal processor according to claim 7, wherein said A/D-converting means comprises a single A/D converter.

13. A video signal processor according to claim 12, further comprising:
   means for alternately or sequentially selecting one of the input color signals and supplying the selected input color signal to said A/D converter to produce digital data.

14. A video signal processor according to claim 12, further comprising:
   means for delaying at least one of the input color signals so that a phase difference exists between the input color signals; and
   means for alternately or sequentially selecting the input color signals at least one of which having been delayed by said delay means, and supplying the selected input color signal to said A/D converter to produce the digital data.

15. A video signal processor according to claim 7, wherein said D/A-converting means comprises a single D/A converter for D/A-converting the input color signals of a plurality of colors.

16. A video signal processor according to claim 7, wherein the D/A-converting means comprises a single D/A converter for D/A-converting the digital data read from the memory in a field-sequential manner.

17. A video signal processor for A/D-converting an input color signal using a control clock, which is phase-shifted every field by a predetermined phase, to produce digital data, and writing the digital data into a memory, and reading the digital data from the memory at a rate n times (n>1) the rate of writing; the reading of one field being performed repeatedly while writing of one field is performed once; the memory for the input color signal has first and second areas, each having a capacity of one field of said digital data; said video signal processor comprising:
   means for writing the digital data of respective fields alternately into the first area and the second area; and
   means for controlling the reading from the memory such that the digital data read in one field of a reading operation consist of digital data written in one field of a writing operation.

18. A video signal processor according to claim 17, wherein said controlling means controls a timing of commencement of the reading of the digital data of each field such that the reading of the digital data of each field will not proceed to the end of the field until or concurrent with the end of the writing of the digital data of each field.

19. A video signal processor according to claim 1, wherein at least one of the video signal processing circuits comprises:
   an A/D converter for sampling and A/D converting one of the input color signals into digital data;
   a memory for storing the digital data; and
   a D/A converter for D/A converting the digital data stored in the memory to produce one of the decoded signals.

20. A video signal processor according to claim 19, further comprising:
   a low pass filter for low pass filtering one of the decoded signals; and wherein
   said adding means adds the one of the decoded signals filtered by the low pass filter to said high-frequency component of a decoded signal of another of the signal processing circuits.

21. A video signal processor according to claim 1, further comprising:
   a low pass filter for low pass filtering one of the decoded signals; and wherein
   said adding means adds the one of the decoded signals filtered by the low pass filter to said high-frequency components of a decoded signal of another of the signal processing circuits.

22. A video signal processor according to claim 1, further comprising:
   means for alternately or sequentially selecting the selected input color signals; and
   a common A/D converter for receiving and converting the selected input color signal into digital data.

23. A video signal processor according to claim 7, wherein the A/D-converting means comprises an A/D converter corresponding to each color component for A/D converting one of the input color signals associated with that color component.

24. A video signal processor according to claim 7, further comprising:
   a memory corresponding to each color component for storing the digital data associated with that color component.

25. A video signal processor according to claim 7, further comprising:
   a plurality of memories, each memory corresponding to one of the color components and storing the digital data associated with that color component;
   writing means for controlling writing of the digital data, output by the A/D-converting means, into the memories; and
   reading means for controlling reading out of the digital data from the memories to the D/A-converting means.

26. A video signal processor according to claim 13, further comprising:
   a plurality of memories, each memory corresponding to one of the color components and storing the digital data associated with that color component; and
   writing means for controlling writing of the digital data, output by the A/D-converting means, into the memories.

27. A video signal processor according to claim 14, further comprising:
   a plurality of memories, each memory corresponding to one of the color components and storing the digital data associated with that color component;
   writing means for controlling writing of the digital data, output by the A/D-converting means, into the memories based on control clocks having a same phase difference as the input color signals.

28. A video signal processor according to claim 16, further comprising:
   a plurality of memories, each memory corresponding to one of the color components and storing the digital data associated with that color component; and wherein
   the single D/A converter D/A converts the digital data read from the memories in a field-sequential manner.

29. A video signal processor, comprising:
   A/D converting means for receiving and converting input color signals, which each represent a color component of a video signal, into digital data based on a control clock, which is phase-shifted every field by a predetermined phase;
   a memory, corresponding to each color component, for storing the digital data corresponding to a same color component, the digital data being written into the memory at a first rate and being read from the memory at a second rate which is n times the first rate where n in an integer greater than one, the reading of one field being performed repeatedly while a field is written once, the memory including a first and second area, the first and second area having a capacity of one field of digital data;

means for controlling the writing of the digital data into each memory so that fields of the digital data are alternately written into the first and second areas, and for controlling the reading of the digital data from each memory such that each field of the digital data read from a memory is digital data written as one field.

30. A video signal processor according to claim 29, wherein the controlling means controls the reading and writing of the digital data from each memory such that an address for reading the digital data does not pass-over an address for writing the digital data.

31. A video signal processor according to claim 28, wherein the controlling means controls the reading and writing of the digital data from each memory such that a currently-read field of the digital data will be completely read before or concurrently with completion of writing the currently-read field of the digital data.

32. A video signal processor, comprising:

A/D converting means for receiving and converting input color signals, which each represent a color component of a video signal, into digital data based on a first control clock, which is phase-shifted every field by a predetermined phase;

a memory, corresponding to each color component, for storing the digital data corresponding to a same color component, the digital data being written into the memory at a first rate based on a writing control clock and being read from the memory at a second rate, which is n times the first rate where n in an integer greater than one, based on a reading control clock, the reading of one field being performed repeatedly while a field is written once;

D/A converting means for D/A converting the digital data read from each memory to produce decoded signals based on a second control clock; and means for shifting the phases of the second and reading control clocks so as to be identical to a phase of the first control clock during a period in which the digital data of one field is being read and in which the writing of the digital data of the same field is also written.

33. A video signal processor according to claim 31, wherein the writing control clock is the same as the first control clock.

34. A video signal processor according to claim 1, wherein the adding means adds only a low-frequency component of a decoded signal of one of the signal processing circuits and only a high-frequency component of a decoded signal of another of the signal processing circuits.

35. A video signal processor according to claim 4, wherein the adding means adds only a low-frequency component of one of the decoded signals and only a high-frequency component of another of the decoded signals.

36. A video signal processor according to claim 7, wherein the adding means adds only a low-frequency component of one of the decoded signals and only a high-frequency component of another of the decoded signals.

37. A video signal processor according to claim 21, further comprising:

a high pass filter for high pass filtering one of the decoded signals;

a switch means for alternately and sequentially supplying a first and second decoded signal to the high pass filter; and wherein the low pass filter low pass filters one of the first and second decoded signals; and the adding means adds output from the low pass and high pass filters.

38. A video signal processor according to claim 4, further comprising:

a low pass filter for low pass filtering one of the decoded signals; and wherein said adding means adds the one of the decoded signals filtered by the low pass filter and only a high-frequency component of a decoded signal of another of the signal processing circuits.

39. A video signal processor according to claim 38, further comprising:

a high pass filter for high pass filtering one of the decoded signals;

a switch means for alternately and sequentially supplying a first and second decoded signal to the high pass filter; and wherein the low pass filter low pass filters one of the first and second decoded signals; and the adding means adds output from the low pass and high pass filters.

40. A video signal processor according to claim 7, further comprising:

a low pass filter for low pass filtering one of the decoded signals; and wherein said adding means adds the one of the decoded signals filtered by the low pass filter and only a high-frequency component of a decoded signal of another of the signal processing circuits.

41. A video signal processor according to claim 40, further comprising:

a high pass filter for high pass filtering one of the decoded signals;

a switch means for alternately and sequentially supplying a first and second decoded signal to the high pass filter; and wherein the low pass filter low pass filters one of the first and second decoded signals; and the adding means adds output from the low pass and high pass filters.

42. A video signal processor according to claim 29, wherein the controlling means controls reading of the digital data from each memory such that the digital data of a field currently being written at least starts to be read prior to completion of the writing operation.

43. A video signal processor according to claim 17, wherein the controlling means controls reading of the digital data from each memory such that the digital data of a field currently being written at least starts to be read prior to completion of the writing operation.

* * * * *